(12) United States Patent
Baxter et al.

(10) Patent No.: US 11,828,400 B2
(45) Date of Patent: *Nov. 28, 2023

(54) METHODS, SYSTEMS, AND APPARATUS FOR USE IN MAIN PIPES CONNECTED TO BRANCH CONDUIT

(71) Applicant: INA Acquisition Corp., Wilmington, DE (US)

(72) Inventors: Rick Baxter, St. Louis, MO (US); Robert Kodadek, Hauppauge, NY (US); Hermann Herrlich, Hauppage, NY (US); Steven McKeefrey, Hauppauge, NY (US); John Webster, Hauppauge, NY (US)

(73) Assignee: INA Acquisition Corp., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,231

(22) Filed: Jul. 13, 2022

(65) Prior Publication Data
US 2022/0397224 A1 Dec. 15, 2022

Related U.S. Application Data

(63) Continuation of application No. 16/698,791, filed on Nov. 27, 2019, now Pat. No. 11,391,407.
(Continued)

(51) Int. Cl.
*F16L 55/18* (2006.01)
*F16L 41/00* (2006.01)
(Continued)

(52) U.S. Cl.
CPC .............. *F16L 55/18* (2013.01); *F16L 41/00* (2013.01); *F16L 41/04* (2013.01); *F16L 55/11* (2013.01);
(Continued)

(58) Field of Classification Search
CPC . F16L 55/18; F16L 55/11; F16L 55/12; F16L 55/1645; F16L 55/1656; F16L 55/40; F16L 55/48; F16L 41/00; F16L 41/04
(Continued)

(56) References Cited

U.S. PATENT DOCUMENTS 4,245,970 A 1/1981 St. Onge
4,713,870 A 12/1987 Szalvay
(Continued)

FOREIGN PATENT DOCUMENTS

DE 4024926 A1 3/1992
DE 202005004781 U1 6/2005
(Continued)

OTHER PUBLICATIONS

International Search Report and Written Opinion issued for PCT/US2019/063782 dated Mar. 2, 2020, 19 pages.
(Continued)

*Primary Examiner* — James F Hook
(74) *Attorney, Agent, or Firm* — Stinson LLP

(57) ABSTRACT

A pipe rehabilitation system and/or robot can be used inside a pipe to measure characteristics of branch conduits, install plugs into branch conduits before the pipe is lined with a liner, remove portions of plugs and liners after lining to restore fluid communication between the pipe and branch conduits, and/or install fittings into the branch conduits to connect the liner to the branch conduits. A probe can measure characteristics of a branch conduit. A tool can install plugs and/or fittings into the branch conduits. A linkage can connect a tool to a robotic tractor so that the connected elements can navigate through a main pipe. A visualization system can aid in aligning a robot with a branch conduit. Height-adjustable braces can support robotic tools in a pipe. A plug can include integrated locating
(Continued)

features and/or movable parts that enable expanding the plug to seal with the branch conduit.

20 Claims, 43 Drawing Sheets

Related U.S. Application Data

(60) Provisional application No. 62/816,660, filed on Mar. 11, 2019, provisional application No. 62/798,841, filed on Jan. 30, 2019, provisional application No. 62/773,844, filed on Nov. 30, 2018.

(51) Int. Cl.

| | | |
|---|---|---|
| *F16L 41/04* | (2006.01) | |
| *F16L 55/11* | (2006.01) | |
| *G21C 17/01* | (2006.01) | |
| *F16L 55/165* | (2006.01) | |
| *F16L 55/1645* | (2006.01) | |
| *F16L 55/40* | (2006.01) | |
| *F16L 55/48* | (2006.01) | |
| *F16L 55/12* | (2006.01) | |

(52) U.S. Cl.
CPC ........... *F16L 55/12* (2013.01); *F16L 55/1645* (2013.01); *F16L 55/1656* (2013.01); *F16L 55/40* (2013.01); *F16L 55/48* (2013.01); *G21C 17/01* (2013.01)

(58) Field of Classification Search
USPC .................................. 138/110, 97, 98, 92, 94
See application file for complete search history.

(56) References Cited

U.S. PATENT DOCUMENTS

| | | | |
|---|---|---|---|
| 4,951,758 A | | 8/1990 | Sonku et al. |
| 4,986,314 A | * | 1/1991 | Himmler ............ F16L 55/1645 166/55.7 |
| 4,986,951 A | | 1/1991 | Ledoux et al. |
| 5,150,056 A | | 9/1992 | Wilcock |
| 5,318,395 A | | 6/1994 | Driver |
| 5,333,649 A | | 8/1994 | Shimokawa et al. |
| 5,334,429 A | | 8/1994 | Imoto et al. |
| 5,368,423 A | | 11/1994 | Hanna |
| 5,384,086 A | | 1/1995 | Smith |
| 5,520,569 A | | 5/1996 | Endoh |
| 5,577,776 A | | 11/1996 | Welch |
| 5,778,937 A | | 7/1998 | Sundermann |
| 5,971,032 A | | 10/1999 | Ward |
| 6,056,017 A | | 5/2000 | Kamiyama et al. |
| 6,082,411 A | | 7/2000 | Ward |
| 6,299,803 B1 | | 10/2001 | Ledoux |
| 6,641,688 B1 | | 11/2003 | Gearhart |
| 6,651,699 B2 | | 11/2003 | Kweon |
| 7,094,308 B1 | | 8/2006 | Gearhart |
| 7,631,665 B2 | | 12/2009 | Muhlin |
| 7,707,704 B2 | | 5/2010 | Crocker et al. |
| 7,720,570 B2 | * | 5/2010 | Close .................... B25J 9/1617 405/184.2 |
| 7,878,220 B2 | | 2/2011 | Fierst et al. |
| 8,049,634 B2 | | 11/2011 | Smith et al. |
| 8,197,158 B2 | | 6/2012 | Sudano et al. |
| 8,272,406 B2 | | 9/2012 | McKaigue et al. |
| 8,272,808 B1 | | 9/2012 | Sudano et al. |
| 8,402,911 B1 | | 3/2013 | Weisenberg |
| 8,561,646 B2 | | 10/2013 | Cain |
| 8,864,418 B2 | | 10/2014 | Gagnon et al. |
| 9,016,322 B2 | | 4/2015 | Vogt et al. |
| 9,255,806 B2 | | 2/2016 | Spering |
| 9,347,212 B2 | | 5/2016 | Bichler |
| 9,410,654 B2 | | 8/2016 | Gagnon et al. |
| 9,446,455 B2 | | 9/2016 | Gagnon et al. |
| 9,494,270 B2 | | 11/2016 | Cain et al. |
| 9,581,280 B2 | | 2/2017 | Bichler |
| 9,719,621 B2 | | 8/2017 | Yoneda et al. |
| 11,391,407 B2 | * | 7/2022 | Baxter .................... F16L 41/04 |
| 2003/0116211 A1 | | 6/2003 | Ward |
| 2004/0089358 A1 | | 5/2004 | Burd et al. |
| 2005/0200037 A1 | | 9/2005 | Sanders |
| 2005/0241711 A1 | | 11/2005 | Sayers |
| 2009/0272452 A1 | | 11/2009 | Cain |
| 2009/0289451 A1 | | 11/2009 | Oxner et al. |
| 2010/0078895 A1 | | 4/2010 | Sudano et al. |
| 2011/0083766 A1 | | 4/2011 | Anders |
| 2011/0155273 A1 | | 6/2011 | Cain |
| 2011/0232793 A1 | | 9/2011 | Polivka et al. |
| 2011/0318099 A1 | | 12/2011 | Le Quere |
| 2012/0103514 A1 | | 5/2012 | Kamiyama et al. |
| 2012/0175872 A1 | | 7/2012 | Lindsey et al. |
| 2013/0233428 A1 | | 9/2013 | Cain et al. |
| 2015/0122364 A1 | * | 5/2015 | Cheatham, III ...... G01M 3/246 138/98 |
| 2015/0273776 A1 | | 10/2015 | Heuser |
| 2016/0178108 A1 | | 6/2016 | Ehsani |
| 2017/0108156 A1 | | 4/2017 | Penza et al. |

FOREIGN PATENT DOCUMENTS

| | | |
|---|---|---|
| EP | 0290184 B1 | 10/1991 |
| EP | 1488160 B1 | 8/2006 |
| GB | 1205170 A | 9/1970 |
| GB | 2041147 A | 9/1980 |
| GB | 2508215 A | 5/2014 |
| KR | 10-1313240 B1 | 9/2013 |
| WO | 90/03260 A1 | 4/1990 |
| WO | 99/45307 A1 | 9/1999 |
| WO | 99/47847 A1 | 9/1999 |
| WO | 00/55539 A1 | 9/2000 |
| WO | 2010/115290 A1 | 10/2010 |
| WO | 2013/095155 A1 | 6/2013 |

OTHER PUBLICATIONS

International Search Report and Written Opinion issued for PCT/US2019/058856 dated Jan. 21, 2020, 11 pages.

* cited by examiner

Prior Art

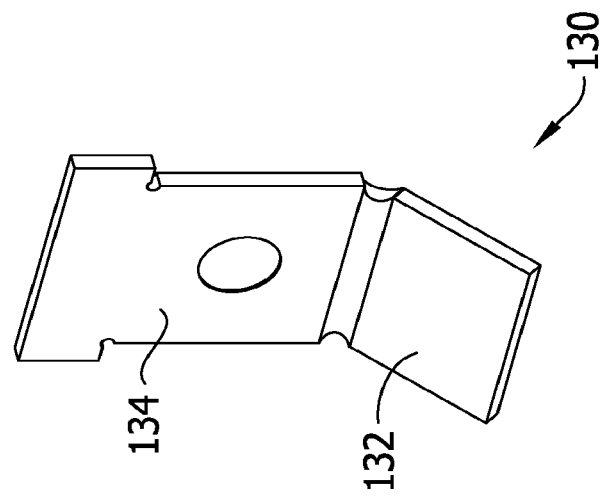
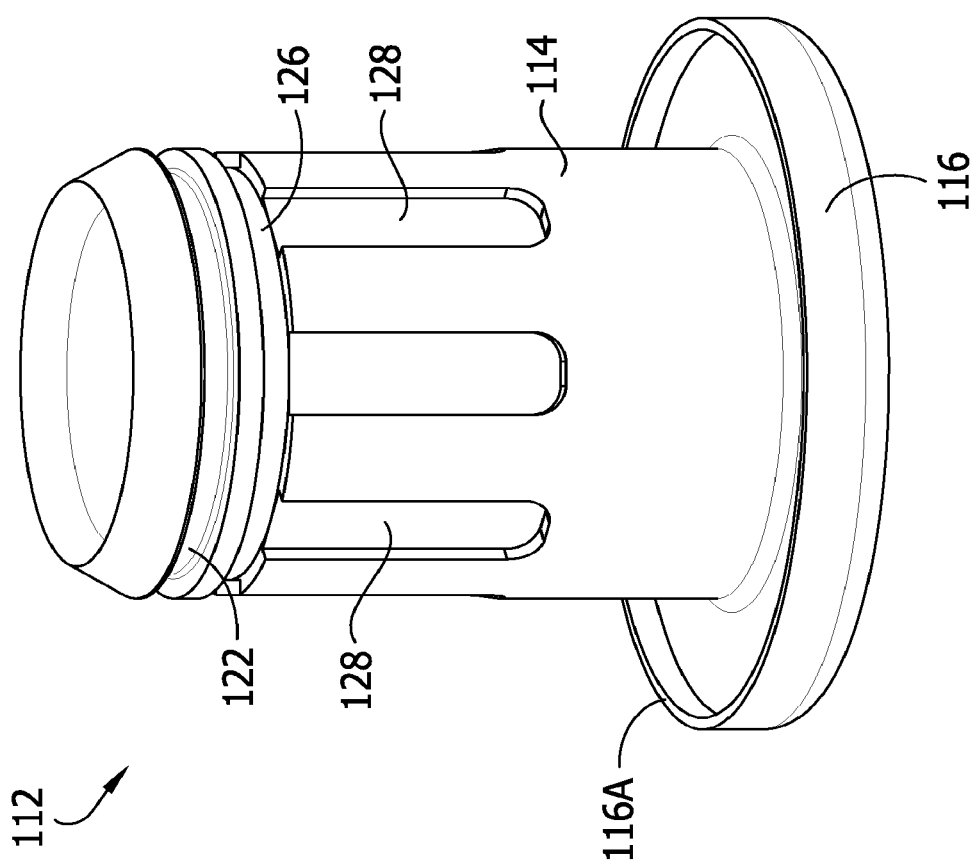

METHODS, SYSTEMS, AND APPARATUS FOR USE IN MAIN PIPES CONNECTED TO BRANCH CONDUIT

CROSS-REFERENCE TO RELATED APPLICATIONS

This application claims priority to: U.S. Provisional Patent Application No. 62/773,844, filed Nov. 30, 2018, and entitled Robot, Tool, and System for Installing a Fitting in a Branch Conduit; U.S. Provisional Patent Application No. 62/798,841, filed Jan. 30, 2019, and entitled Locating a Branch Conduit from Within a Lined Main Pipe; and U.S. Provisional Patent Application No. 62/816,660, filed Mar. 11, 2019, and entitled Measuring a Branch Conduit from Within a Lined Main Pipe. Each of these applications is hereby incorporated by reference in its entirety.

FIELD

The present disclosure generally relates to methods, systems, and apparatus related for use in pipes connected to branch conduits. More specifically, aspects of the disclosure pertain to a system, method, robot, and probe for measuring a branch conduit from inside a main pipe; to methods of lining a main pipe and connecting branch conduits to the liner that employ certain locating techniques; to a system, method, robot, tool, and plug for locating a branch conduit from inside a main pipe; to a fitting for connecting a branch conduit and a liner installed in a main pipe; and to a robot, tool, and system for installing a fitting in a branch conduit.

BACKGROUND

Referring to FIG. 1A, in various pipe systems that carry fluid under pressure (e.g., municipal water systems, service water systems, industrial processes, etc.), it is common for a main pipe M to be fluidly coupled to one or more branch conduits C (e.g., user connections) at respective junctions J. For example, in a water distribution system, a water main M can be coupled to a plurality of corporation stops C that provide connections to water service lines. Over the life of a pipe system, it may become necessary to rehabilitate or repair the main pipe M.

One technique for rehabilitating the main pipe M comprises installing a cured-in-place pipe (CIPP) liner L (FIGS. 1C and 1D). A conventional sequence of steps for lining a main pipe M with a CIPP liner L is illustrated schematically in FIGS. 1B-1D. Before positioning the liner L in the main pipe M, the openings to the corporation stops C are sealed with plugs P (FIG. 1B). The plugs P comprise fittings that are installed in the corporation stops C from within the main pipe M. Subsequently, a CIPP liner is installed in the main pipe M (FIG. 1C). The plugs P prevent resin in the liner L from entering the corporation stops C as the liner is pressed outwardly against the wall of the main pipe M and cured. After installation of the liner L is complete, holes are formed in the liner and portions of the plugs P are removed to restore fluid communication between the rehabilitated main pipe M and the corporation stops C. For example, fluid communication can be established by a robot that travels through the interior of the main pipe M carrying a tool for forming holes in the liner L.

If the pipe system is designed to carry fluids under pressure, it may be desirable to connect the liner L to the corporation stop C so that the pressurized fluid does not cause the liner to delaminate from the main pipe M and/or to prevent exfiltration of the pressurized fluid through the interfaces of the junction J. Various ways of connecting a liner L to a corporation stop C are known. In examples described in U.S. Pat. No. 8,015,695 and U.S. Patent Application Publication No. 2009/0289451, each of which is hereby incorporated by reference in its entirety for all purposes, a threaded fitting is configured to self-tap into the corporation stop C. The fitting can be installed by a robot that carries the fitting through the liner L to position the fitting in the interior of the liner at the junction J and then rotates the fitting to threadably connect the fitting to the corporation stop C. When the fitting is threaded into the corporation stop C, a flange of the fitting compresses a gasket against the liner L to form a fluid seal about the junction J.

SUMMARY

In one aspect, a plug for sealing a branch conduit while a main pipe is lined with a cured in place liner to form a lined pipe comprises a plug body having an inner end portion and an outer end portion. The plug body is configured for being inserted from inside the main pipe into the branch conduit to an installed position and for being sealingly received in the branch conduit at the installed position to block fluid communication between the branch conduit and the main pipe. The plug body comprises a removable section configured to be removed from the branch conduit after the main pipe is lined with the liner to restore fluid communication between the branch conduit and the main pipe and a durable section that is configured to remain connected to the lined pipe after the removable section of the plug body is removed. At least one locating element is configured to transmit or receive a locating signal used by a robot to locate the branch conduit from inside the lined pipe. The at least one locating element is mounted on the durable section of the plug body at a location spaced apart from the removable section such that the locating element is configured to remain connected to the lined pipe and transmit or receive the locating signal after the removable portion of the plug body is removed.

In another aspect, a method of lining a main pipe with a liner comprises installing a plug into a branch conduit from inside the main pipe to block fluid communication between the branch conduit and the main pipe. The plug includes at least one locating element. The main pipe is lined with the liner over the installed plug. The locating element of the installed plug is used to align a plug removal tool with the branch conduit. A section of the plug is removed using the aligned plug removal tool to restore fluid communication between the branch conduit and the main pipe without removing a remnant of the plug that includes the locating element. The locating element of the remnant of the plug is used to align a fitting installation tool with the branch conduit. A fitting is installed in the branch conduit using the aligned fitting installation tool to connect the liner to the branch conduit.

In still another aspect, a tool for installing a plurality of fittings into respective branch conduits extending from a main pipe comprises a base configured for being received in the interior of the main pipe for movement along the main pipe. A plurality of fitting mounts are movably connected to the base. Each mount is configured to be connected to a respective one of the plurality of fittings. Each fitting mount is configured to be extended relative to the base. At least one tool locating element is supported on the base and configured to communicate with plug locating elements positioned on plugs at each of the branch conduits, whereby each of the fitting mounts is moved into operative alignment with a respective one of the branch conduits so that the respective fitting is installed in the branch conduit when the fitting mount is extended relative to the base.

In yet another aspect, a robot for use inside a main pipe with at least one branch conduit extending therefrom comprises a tractor configured for movement along an axis of the main pipe. A tool is connected to the tractor such that the tool is movable with the tractor along the axis of the main pipe. The tool is selectively rotatable with respect to the tractor generally angularly about the axis of the main pipe. At least three locating sensors are configured to detect a locating signal associated with the branch conduit. The at least three locating sensors are arranged on the tool such that the at least three sensors are spaced apart in a grid that has a first dimension extending generally longitudinally along the axis and a second dimension extending generally transverse to the axis when the robot is received in the main pipe.

In another aspect, a plug for sealing a branch conduit while a main pipe is lined with a cured in place liner to form a lined pipe comprises a plug body having an inner end portion and an outer end portion spaced apart along a plug axis. The plug body is configured for being inserted from inside the main pipe into the branch conduit and for being sealingly received in the branch conduit to block fluid communication between the branch conduit and the main pipe. The plug body comprises an expandable fitting member comprising an annular shaft section that extends along the plug axis and having an interior surface defining an opening. The shaft section is expandable radially with respect to the plug axis. A plunger member is configured to be received in the opening of the shaft section. The plunger member is movable relative to the expandable fitting member along the plug axis from a first position to a second position. The plunger member is configured, by moving from the first position to the second position, to radially expand the shaft section such that the plug body sealingly engages the branch conduit.

In still another aspect, a method of lining a main pipe with a liner comprises positioning a plug so that at least portion of the plug is received inside a branch conduit connected to the main pipe. The plug is expanded after positioning the plug to form a fluid seal between the plug and the branch conduit. The main pipe is lined with the liner over the installed plug.

In another aspect, a robot for use inside a main pipe with at least one branch conduit extending therefrom comprises a tractor configured for movement along an axis of the main pipe. The tractor has a first end portion and a second end portion spaced apart along a tractor axis. A tool positioning mechanism at the first end portion of the tractor comprises a linkage configured to connect a pipe rehabilitation tool to the tractor such that the pipe rehabilitation tool has at least three degrees of freedom with respect to the tractor.

In yet another aspect, a robot for use inside a main pipe comprises a tractor configured for movement along an axis of the main pipe. The tractor has a first end portion and a second end portion spaced apart along a tractor axis. A pipe rehabilitation tool is connected to the first end portion of the tractor. The pipe rehabilitation tool comprises a tool body and a brace connected to the tool body for supporting the tool body in radially spaced apart relationship with an interior surface of the main pipe. The brace comprises an arm and a roller connected to the arm for rotation with respect to the arm about a first axis of rotation and a second axis of rotation transverse to the first axis of rotation. The roller is configured to roll along the interior surface of the main pipe as the tool moves along the axis of the main pipe and as the tool moves such that the angular orientation of the tool with respect to the axis of the main pipe changes.

In another aspect, a method of rehabilitating a main pipe connected to a branch conduit comprises determining cross-sectional dimension of the pipe. One interchangeable brace from a set of interchangeable braces is selected based on the determined cross-sectional dimension. The selected interchangeable brace is attached to a tool body of a pipe rehabilitation tool of a pipe rehabilitation robot. The pipe rehabilitation robot is moved along the pipe as the selected interchangeable brace supports the tool body in spaced apart relationship with an interior surface of the pipe. The pipe rehabilitation tool is used to one of: remove a portion of a plug received in the branch conduit and a portion of a liner that is installed in the pipe across the plug to restore fluid communication between the pipe and the branch conduit after the liner is installed and install a fitting in the branch conduit after a liner is installed in the main pipe to connect the liner to the branch conduit.

In still another aspect, a method of rehabilitating a pipe comprises positioning a pipe rehabilitation tool of a pipe rehabilitation robot in a main pipe relative to a branch conduit connected to the main pipe. The pipe rehabilitation tool has a tool body. A radial distance between the tool body and the branch conduit with respect to an axis of the main pipe is adjusted by one of extending and retracting a brace that braces a tool body of the pipe rehabilitation tool against an interior surface of the main pipe. The pipe rehabilitation tool is used to one of: remove a portion of a plug received in the branch conduit and a portion of a liner that is installed in the pipe to restore fluid communication between the pipe and the branch conduit after the liner is installed and install a fitting in the branch conduit after a liner is installed in the main pipe to connect the liner to the branch conduit.

In another aspect, a method of rehabilitating a pipe comprises positioning a pipe rehabilitation tool of a pipe rehabilitation robot in a main pipe relative to a branch conduit connected to the main pipe. The pipe rehabilitation tool has a tool body. After positioning the pipe rehabilitation tool, a brace of the pipe rehabilitation tool is extended to contact an interior surface of the main pipe and thereby brace the pipe rehabilitation tool against the main pipe.

In yet another aspect, a robot for use inside a main pipe comprises a pipe rehabilitation tool having a tool body. A linkage is configured to support the pipe rehabilitation tool on an interior surface of the main pipe. The linkage has a point of contact with the interior surface when the linkage supports the pipe rehabilitation tool on an interior surface of the main pipe. The point of contact is spaced apart from the tool body by a spacing distance. The linkage comprises a rocker connected to the tool body for rotation with respect to the tool body about an axis. The linkage is configured to rotate the rocker about the axis in a first rotational direction from a first rotational position to a second rotational position. The rocker is prevented from rotating past the second rotational position in the first rotational direction. Rotation of the rocker about the axis adjusts the spacing distance between the point of contact and the tool body such that the spacing distance is a first dimension when the rocker is in the first rotational position, the spacing distance is a second dimension when the rocker is in the second rotational position, and the spacing distance is a third dimension when the rocker is in a third rotational position spaced apart between the first rotational position and the second rotational position about the axis. The first dimension is less than the second dimension and the second dimension is less than the third dimension.

In another aspect, a robot for use inside a pipe system comprises a tractor configured for movement along a main pipe of the pipe system. A pipe rehabilitation tool is connected to the tractor for movement with the tractor along the main pipe. The pipe rehabilitation tool comprises a pipe visualization system. The pipe visualization system comprises a projector configured to project a projected image onto an internal surface of the pipe system and a camera configured to form a captured image of the internal surface of the pipe system that includes the projected image. The pipe rehabilitation tool has a working element having an axis. The projected image is generally centered on the axis of the working element.

In still another aspect, a method of rehabilitating a main pipe comprises positioning a pipe rehabilitation robot inside the pipe so that the pipe rehabilitation robot is located near a branch conduit. A projected image is projected onto an interior surface of the main pipe. A captured image of the interior surface of the main pipe that includes the projected image is formed. The position of the pipe rehabilitation robot inside the pipe is adjusted based at least in part on the captured image until the pipe rehabilitation robot is operatively aligned with the branch conduit.

In another aspect, a robot for use inside a pipe system comprises a pipe rehabilitation tool, the pipe rehabilitation tool comprises a plurality of working elements. Each working element has a respective axis. A pipe visualization system comprises a projector configured to project a respective projected image onto an internal surface of the pipe system for each of the plurality of working elements and at least one camera configured to form one or more captured images of the internal surface of the pipe system that includes the projected images for each of the working element. The respective projected image for each working element intersects the axis of the working element.

In another aspect, a tool for installing a fitting into a branch conduit from a main pipe comprises a cylinder block configured for being received in an interior of the main pipe for movement along the main pipe. The cylinder block defines a cylinder having an axis. The cylinder block is positionable in the main pipe at an installation position in which the cylinder is generally aligned with the branch conduit. The cylinder is selectively connectable to a source of pressurized fluid. A piston is slidably received in the cylinder and is sealingly engaged with the cylinder block such that pressurized fluid imparted into the cylinder from the source drives movement of the piston outward along the axis of the cylinder with respect to the cylinder block. The piston is configured to support the fitting such that the fitting is inserted from the interior of the main pipe outwardly into the branch conduit as the piston moves outwardly when the cylinder block is in the installation position.

In yet another aspect, a tool for installing a fitting in a branch conduit from an interior of a main pipe comprises a base configured for being received in the interior of the main pipe for movement along the main pipe. A fitting mount is extendable and retractable relative to the base. The fitting mount is configured to be connected to the fitting such that the fitting is extendable with the fitting mount relative to the base. When the fitting mount is connected to the fitting and the base is operatively aligned with the branch conduit in the interior of the main pipe, extension of the fitting mount moves the fitting mount toward the branch conduit and inserts the fitting into the branch conduit. Subsequent retraction of the fitting mount moves the fitting mount away from the branch conduit. The fitting mount is configured to be connected to the fitting such that, during said subsequent retraction, the fitting is retracted with the fitting mount and withdrawn from the branch conduit unless a connection is established between the fitting and the branch conduit.

In another aspect, a tool for installing a fitting in a branch conduit from an interior of a main pipe comprises a base configured for being received in the interior of the main pipe for movement along the main pipe. A fitting mount is movably connected to the base and configured to be connected to the fitting such that the fitting is movable with the fitting mount relative to the base. The fitting mount is configured to be extended relative to the base in an insertion direction, and the fitting mount is pivotable about pivot point with respect to the base as the fitting mount is extended. When the fitting mount is connected to the fitting and the base is operatively aligned with the branch conduit in the interior of the main pipe, the fitting mount being extended relative to the base moves the fitting toward the branch conduit and pivoting of the fitting mount about the pivot point can align the fitting with the branch conduit as the fitting mount is extended.

In still another aspect, a system for measuring one or more characteristics of a branch conduit extending from a main pipe comprises a probe body configured to be moved through an interior of a main pipe to which the branch conduit is connected. The probe body is configured to be aligned with the branch conduit from inside the main pipe. At least one sensor is supported on the probe body and configured to generate one or more measurement signals related to the branch conduit when the probe body is aligned with the branch conduit. A measurement processor is operatively connected to the senor to receive the one or more measurement signals. The measurement processor is configured to determine based on the one or more measurement signals at least one of: an internal dimension of the branch conduit, an angular position of the branch conduit about an axis of the main pipe, and an orientation of an axis of the branch conduit.

Other aspects will be in part apparent and in part pointed out hereinafter.

BRIEF DESCRIPTION OF THE DRAWINGS

FIG. 11 is a perspective of a fitting body of the fitting;

FIG. 12 is a perspective of a fastener of the fitting;

Corresponding reference numbers indicate corresponding parts throughout the drawings.

DETAILED DESCRIPTION

Figure 1A:
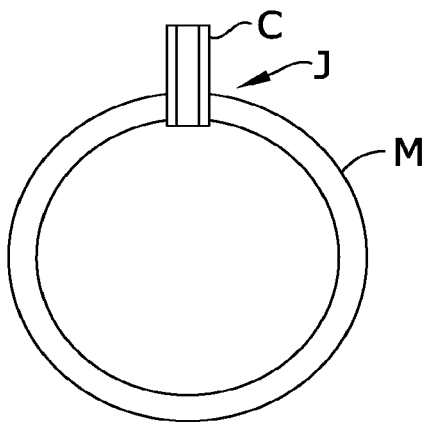
FIGS. 1A-1D are a series of schematic illustrations that show a conventional method of lining a main pipe that is connected to a corporation stop.
Figure 1B:
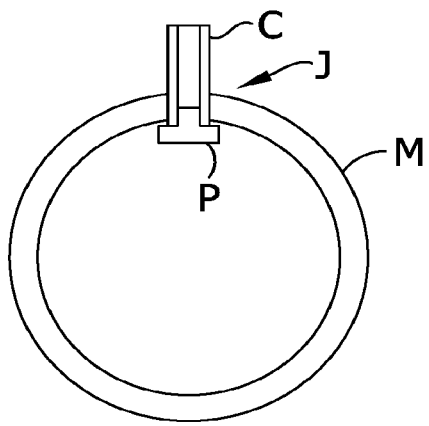
Figure 1C:
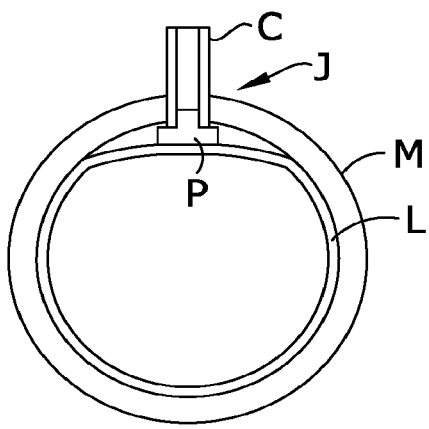
Figure 1D:
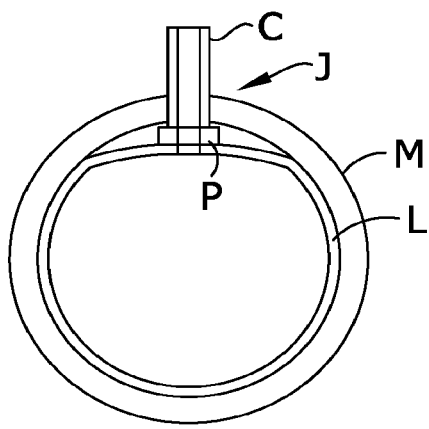
Figure 2:
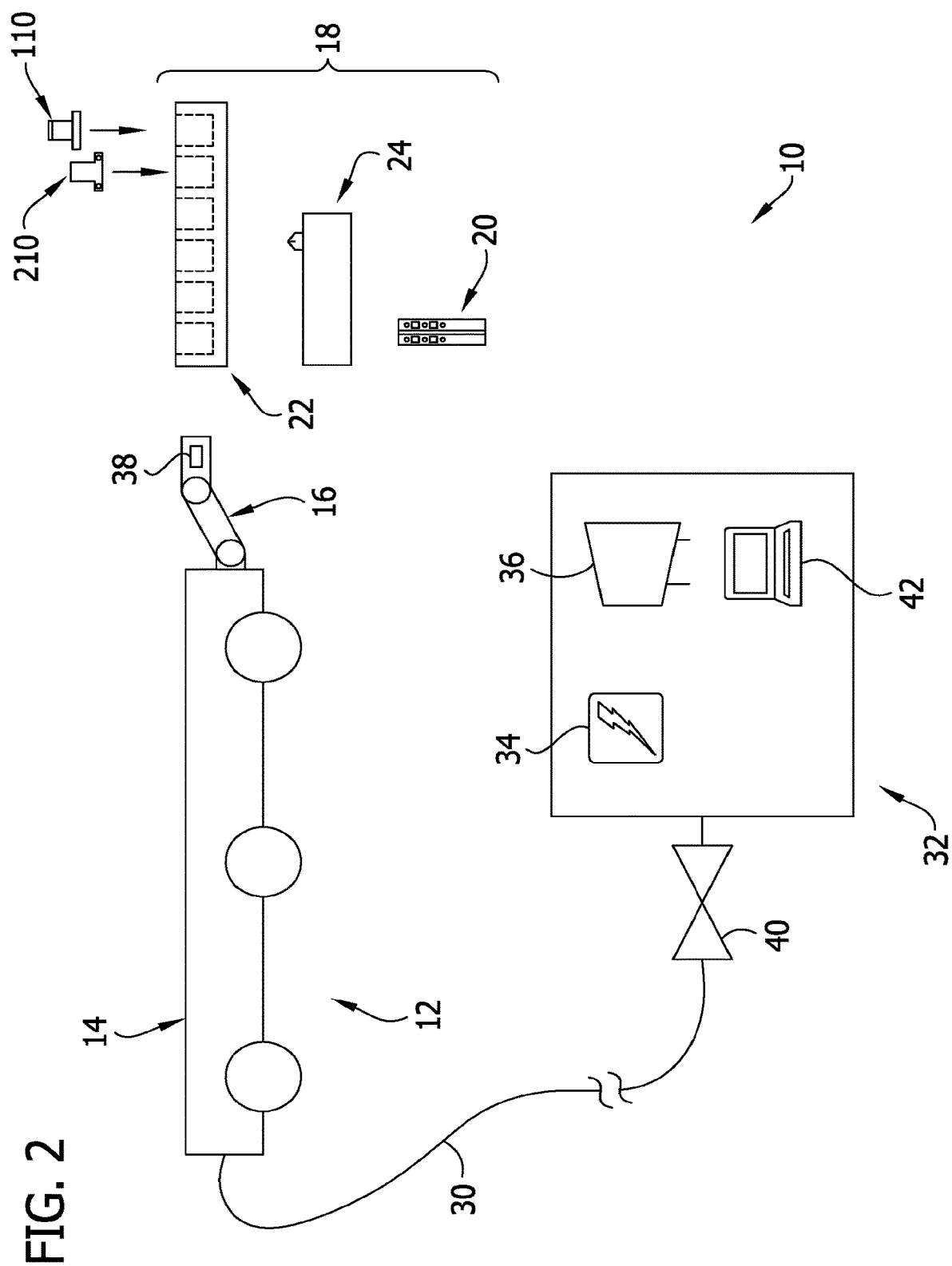
FIG. 2 is a schematic illustration of a pipe rehabilitation system.

Referring to FIG. 2, one embodiment of a system for rehabilitating a main pipe M that is connected to one or more corporation stops C (broadly, branch conduits) is shown schematically and generally indicated at reference number 10. Before describing exemplary embodiments of various aspects of the rehabilitation system 10 in detail, this disclosure provides a general overview of the system by reference to the schematic illustration of FIG. 2 and then provides a general description of an exemplary process in which the rehabilitation system is used to rehabilitate the main pipe M by reference to the schematic illustrations in FIGS. 3-6. As will be apparent, the inventors have developed an overarching system and process for rehabilitating the host pipe and also specific aspects of the system and process that are believed to enhance the art of pipe rehabilitation in different and complementary ways. Thus, while the overarching system 10 and process described in the next section encompass an exemplary embodiment, it will be apparent that discrete aspects of the system and/or the process can be used alone, or in combination with other pipe rehabilitation systems or processes, without departing from the scope of this disclosure.

I. Overview of Rehabilitation System and Process

Referring to FIG. 2, the rehabilitation system 10 generally comprises a robot 12 that is configured for movement along the main pipe M through the interior of the main pipe. The robot 12 comprises a tractor 14 and a tool positioning mechanism 16 at a leading end of the tractor. The tool positioning mechanism 16 is configured to operatively connect a set 18 of interchangeable robotic tools 20, 22, 24 to the tractor 14. The tool positioning mechanism 16 is configured to adjust a position of an attached tool with respect to the tractor 14. For example, in one or more embodiments, the tool positioning mechanism 16 is configured to adjust the position of the tool with respect to an axis AM of the main pipe M.

In the illustrated embodiment, the interchangeable robotic tool set 18 includes a branch conduit measurement probe 20, a fitting installation tool 22, and a plug removal tool 24. The illustrated tool positioning mechanism 16 mounts a selected one of the tools 20, 22, 24 on the leading end of the tractor 14. Thus, in the illustrated embodiment, the tool positioning mechanism 16 mounts any of the tools 20, 22, 24 as a head on the robot 12. Accordingly, the tools 20, 22, 24 may be respectively called a measurement probe head, a fitting installation head, and a plug removal head. Generally, the branch conduit measurement probe 20 is configured to measure the size, position, and orientation of each of the corporation stops C. The fitting installation tool 22 is generally configured to install fittings in the corporation stop from inside the main pipe M. Referring now also to FIGS. 3-6, illustrated fitting installation tool 22 is configured to install both (i) plugs 210 for sealing the corporation stops C prior to the main pipe M being lined and (ii) connection fittings 110 for connecting the liner L to the corporation stops after the liner is installed and service is restored. (In other embodiments, different fitting installation tools can be used for the plugs and the connection fittings.) The plug removal tool 24 is generally configured to remove a portion of a plug P and the liner L after the liner is installed to reinstate fluid communication between the main pipe M and the corporation stops C. Additional details regarding each of the tools 20, 22, 24, as well as the plugs 210 and the connection fittings 110 are provided in the sections that follow.

It will be appreciated that the robot 12 can be configured for interchangeable use with other types or robotic tools in one or more embodiments. For example, it is expressly contemplated that the set of interchangeable tools could comprise a pipe surface preparation tool (e.g., a pressure washer, a rotary brush, etc.), a pipe liner installation tool (e.g., a pull head, a curing device such as a UV curing device, etc.), a surface condition or structural inspection tool, or any other robotic tool that is useful in a pipe rehabilitation process. In one or more embodiments, it is contemplated that a robot may comprise a plurality of tools connected together in a robotic train. Still further, in certain embodiments, the rehabilitation system can comprise dedicated robots for each of the functions performed instead of a set of interchangeable or linkable tools used with a common tractor.

An umbilical cord 30 is configured to connect the robot 12 to a control skid 32 located outside of the pipe M while the robot is being used inside the pipe. In the illustrated embodiment, the control skid 32 comprises one or more power sources, such as an electrical power source 34 (e.g., a gas-powered electric generator), and an air compressor 36. The umbilical cord 30 operatively connects the power sources 34, 36 to the robot 12. As will be explained in further detail below, some of the tools 20, 22, 24 can have features that are pneumatically powered by compressed air and vacuum supplied from the air compressor 36 and through the umbilical cord. Suitably, the rehabilitation system 10 comprises one or more control valves 40 for selectively controlling fluid communication between the skid 32 (e.g., the air compressor 36) and the robot 12. In the illustrated embodiment, the robot 12 also comprises an onboard vacuum source 38 that may be used to control one or more pneumatically powered robotic tools. Although, the illustrated robot 12 includes an onboard vacuum source 38, it will be understood that the vacuum source could be located remotely (e.g., on the skid 32) and coupled to the robotic tools via the umbilical cord and control valves, in one or more embodiments. Tools can also be powered electrically or by a combination of electric and pneumatic power in one or more embodiments. It is also contemplated that one or more aspects of the robot could be powered hydraulically without departing from the scope of the disclosure.

In one or more embodiments, the umbilical cord 30 comprises a data line for conveying data between the robot 12 (e.g., when located inside the pipe M) and a control processor 42 located outside of the pipe M. It will be understood that the robot could communicate with a control processor by a wireless connection in certain embodiments. The control processor 42 can be configured to execute processor-executable instructions stored in memory (not shown) for controlling the robot 12. The processor 42 is shown in FIG. 2 as a single schematic element located at the worksite on the skid 32. But it will be understood that any number of processors located at any suitable location(s) can be used without departing from the scope of the disclosure. For example, in one or more embodiments, some or all of the processing functions are performed in one or more processors onboard the robot 12. In certain embodiments, some or all of the processing functions can be performed in one or more processors located remote from the worksite.

Referring to FIGS. 3-6, a process for rehabilitating the main pipe M using the rehabilitation system 10 generally involves lining the main pipe with a CIPP liner L, reinstating the fluid communication between the main pipe and the corporation stops C, and connecting the liner to the corporation stops. Accordingly, it will be appreciated that, in one or more embodiments, the rehabilitation system 10 can comprise a CIPP liner installation equipment (e.g., eversion equipment, liner inflation equipment, curing equipment, etc.) and CIPP liner materials. As is known in the art, prior to lining the main pipe M with the liner L, a technician cuts off flow to the main pipe. If needed, the interior surface of the main pipe can be suitably prepared (e.g., cleaned, abraded, primed, etc.) for receiving a CIPP liner. Any suitable techniques for preparing the surface of the main pipe M for CIPP lining can be used within the scope of this disclosure.

Figure 3:
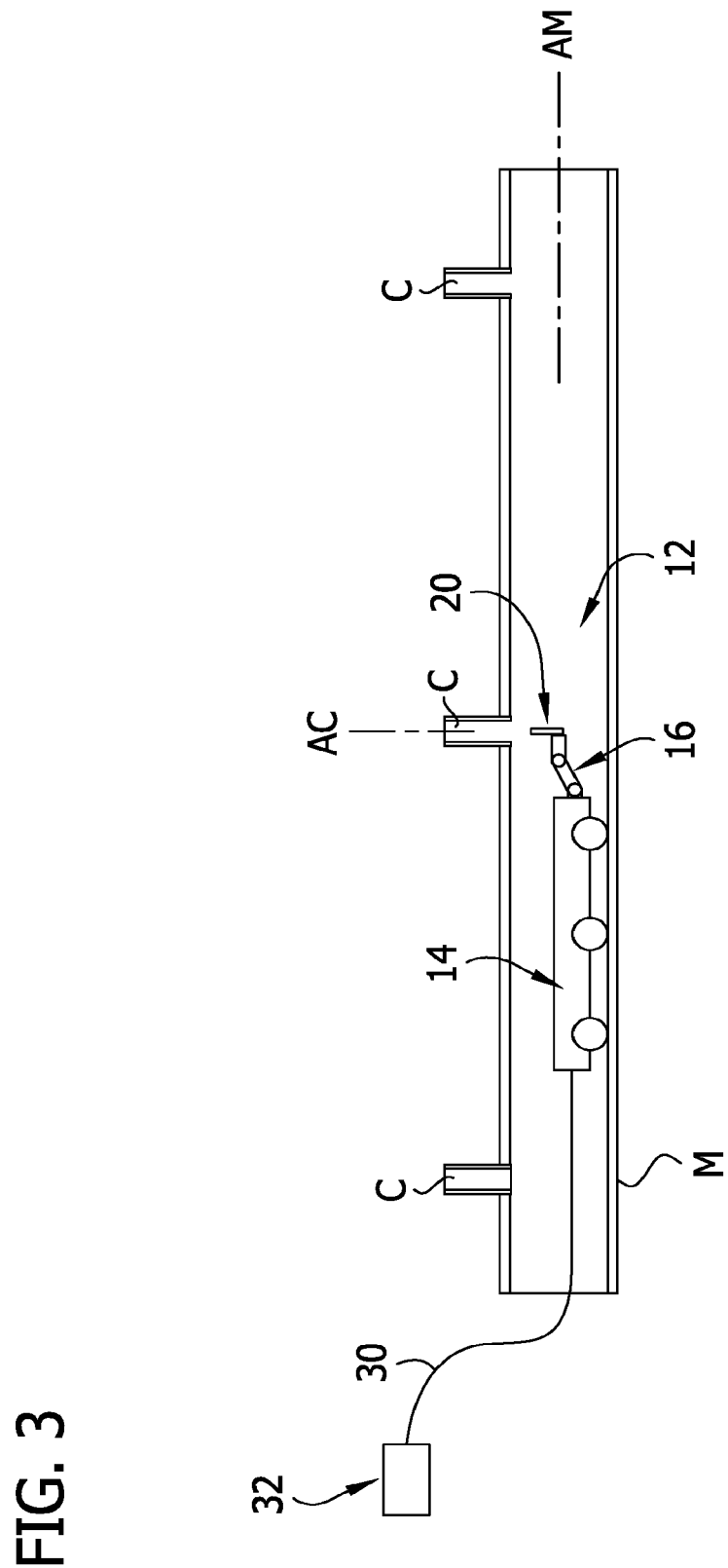
FIG. 3 is a schematic illustration of a robot of the pipe rehabilitation system being used in a main pipe to measure a branch conduit.

Referring to FIG. 3, in one or more embodiments, before installing the liner L, the system 10 is used to measure the locations and orientations of the corporation stops C. Initially, a technician connects the branch conduit measurement probe 20 to the tool positioning mechanism 16 of the robot 12. As will be described in further detail in Section V, the measurement probe 20 is generally configured to measure the size, position, and orientation of each of the corporation stops C. Thus, In one or more embodiments of a process of rehabilitating the main pipe M, before lining the main pipe M with the liner L, the robot 12 drives along the main pipe and uses the attached measurement probe 20 to measure one or more of the size, position, and orientation of each of the corporation stops C. The robot 12 stores the measurement data (e.g., the robot transmits data via the umbilical cord 30 to a memory (not shown) on the measurement skid 32 or stores the data in onboard memory) for use in later steps of the rehabilitation process.

Figure 4:
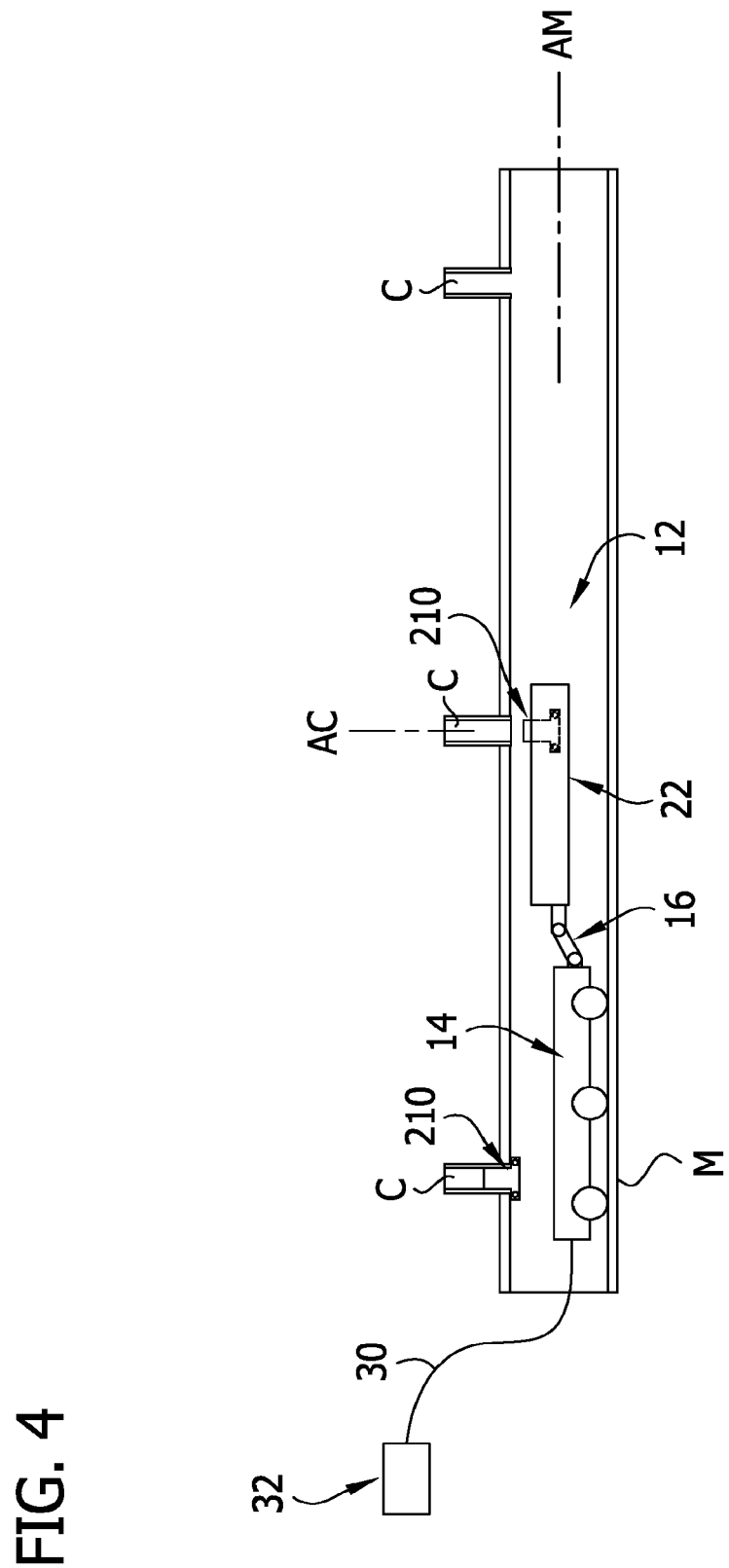
FIG. 4 is a schematic illustration of the robot being used to install a plug in the branch conduit.

After measuring each of the corporation stops C, the robot 12 is temporarily removed from the main pipe M. The technician removes the measurement probe 20 and attaches the fitting installation tool 22 to the tool positioning mechanism 16. As will be explained in further detail below, the illustrated fitting installation tool 22 is configured to hold a plurality of fittings for installation in multiple corporation stops. At this stage in the process, multiple plugs 210 (e.g., one plug per corporation stop C) are loaded into the fitting installation tool 22. As shown in FIG. 4, the installation tool-equipped robot 12 is then used to install the plugs 210 into each of the corporation stops C. In certain embodiments, measurement data from the measurement probe 20 can be used to properly align the plugs 210 for being installed. In one or more embodiments, the installation tool 22 also includes visualization features that are used to properly align the robot 12 with the corporation stops for installing the plugs. How the robot 12 locates the corporation stops C and installs the plugs 210 using the installation tool 22 will be described in greater detail below in Sections III and VII. The plugs 210 also comprise onboard locating features that are used to properly align the robot during later steps of the process (discussed in detail below in Sections VI and VII).

Figure 5:
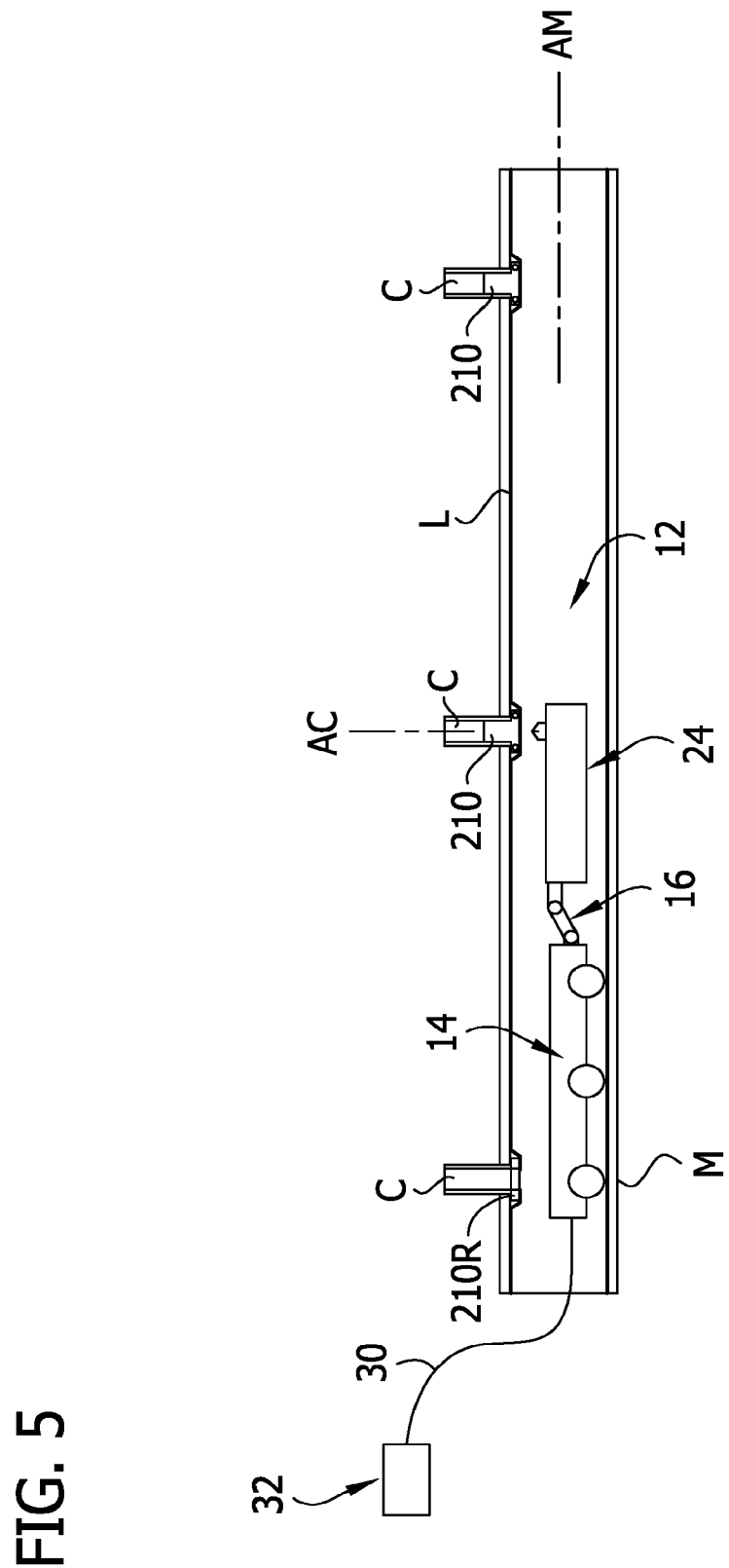
FIG. 5 is a schematic illustration of the robot being used to remove a portion of the plug after the main pipe is lined with a CIPP liner.

After installing the plugs 210 into the corporation stops C, the robot 12 is removed from the main pipe M and a CIPP liner L is installed. Any suitable technique for installing a CIPP liner can be used without departing from the scope of this disclosure. Likewise, any suitable CIPP liner material may be used. Before the technician positions the robot 12 in the lined main pipe M, the fitting installation tool 22 is removed and the plug removal tool 24 is connected to the tool positioning mechanism 16. As shown in FIG. 5, the technician places the removal tool-equipped robot 12 into the lined main pipe M and the robot drives along the pipe and removes portions of the plugs 210 using the plug removal tool 24. In certain embodiments, measurement data taken by the measurement probe 20 and/or visualization features of the plug removal tool 24 can be used to position the robot 12 for properly removing the portions of the plugs 210 and liner L required for restoring fluid communication to the corporation stops C. In addition, the onboard locating features of the plugs 210 can be used to properly align the removal tool-equipped robot with the corporation stops C. In one or more embodiments, the plug removal tool 24 is configured to leave a portion of the plug 210 as a remnant 210R between the liner L and the main pipe M. As will be explained in further detail below in Section III, the plugs 210 are suitably configured so that the locating features are positioned on the remnant 210R, allowing the locating features to be used even after the portions of the plugs have been removed as required to restore fluid communication.

Figure 6:
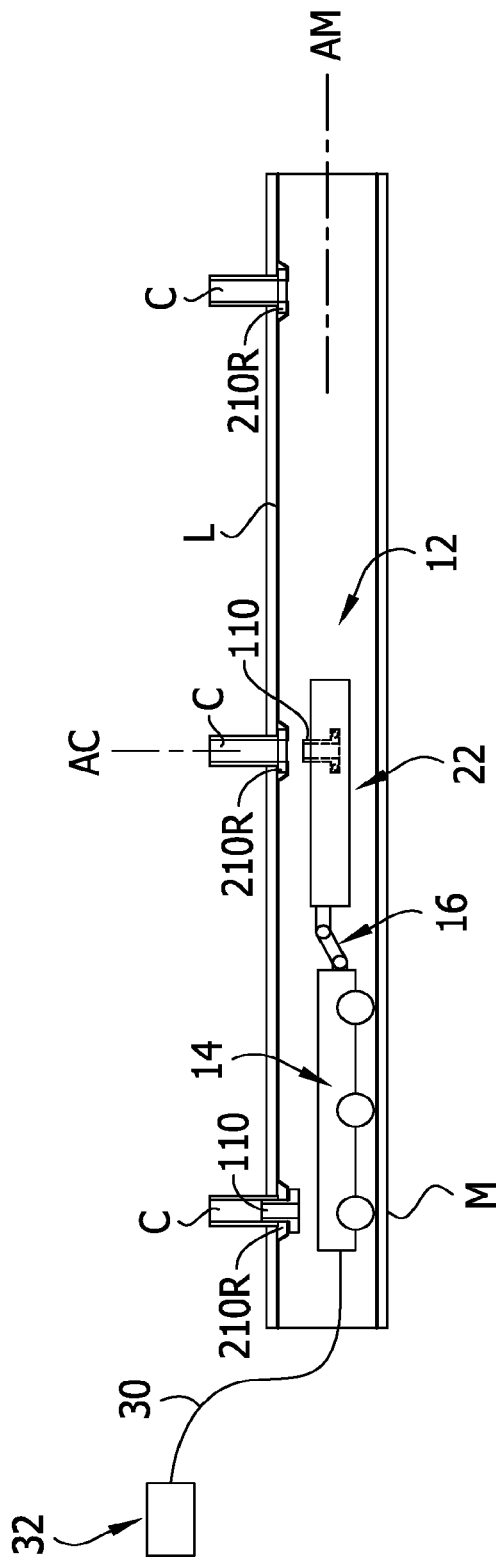
FIG. 6 is a schematic illustration of the robot being used to install into the branch conduit a fitting for connecting the branch conduit to the liner.

After restoring fluid communication, the robot 12 is again temporarily removed from the main pipe M. The technician replaces the plug removal tool 24 with the fitting installation tool 22. Instead of plugs 210, at this stage in the pipe rehabilitation process, a plurality of connection fittings 110 (e.g., one connection fitting per corporation stop C) are loaded into the fitting installation tool 22. As shown in FIG. 6, the installation tool-equipped robot 12 is then used to install the fittings 110 into each of the corporation stops C. In certain embodiments, measurement data taken by the measurement probe 20 and/or visualization features of the installation tool 22 can be used to position the robot 12 for installing the fittings 110. In addition, the locating features remaining on the plug remnants 210R can be used to properly align the fitting installation tool-equipped robot with the corporation stops C. As will be explained in further detail below in Sections II and VII, the robot 12 aligns one of the fittings 110 loaded in the installation tool 22 with a corporation stop C and then inserts the fitting into the corporation stop to connect the corporation stop to the liner L and fluidly seal the junction between the corporation stop and the liner. In one or more embodiments, once connection fittings 110 have been installed in all corporation stops C, the technician removes the robot and restores flow to the main pipe.

Having provided a general overview of an exemplary embodiment of a pipe rehabilitation system 10 and corresponding pipe rehabilitation process, specific aspects of the system will now be described in detail. Immediately after this section, the disclosure provides a more detailed description of the fitting 110 and the plug 210, before provided a detailed description of the robot 12 and each of its tools 20, 22, 24.

II. Fitting for Connecting Branch Conduit to Liner

Figure 8:
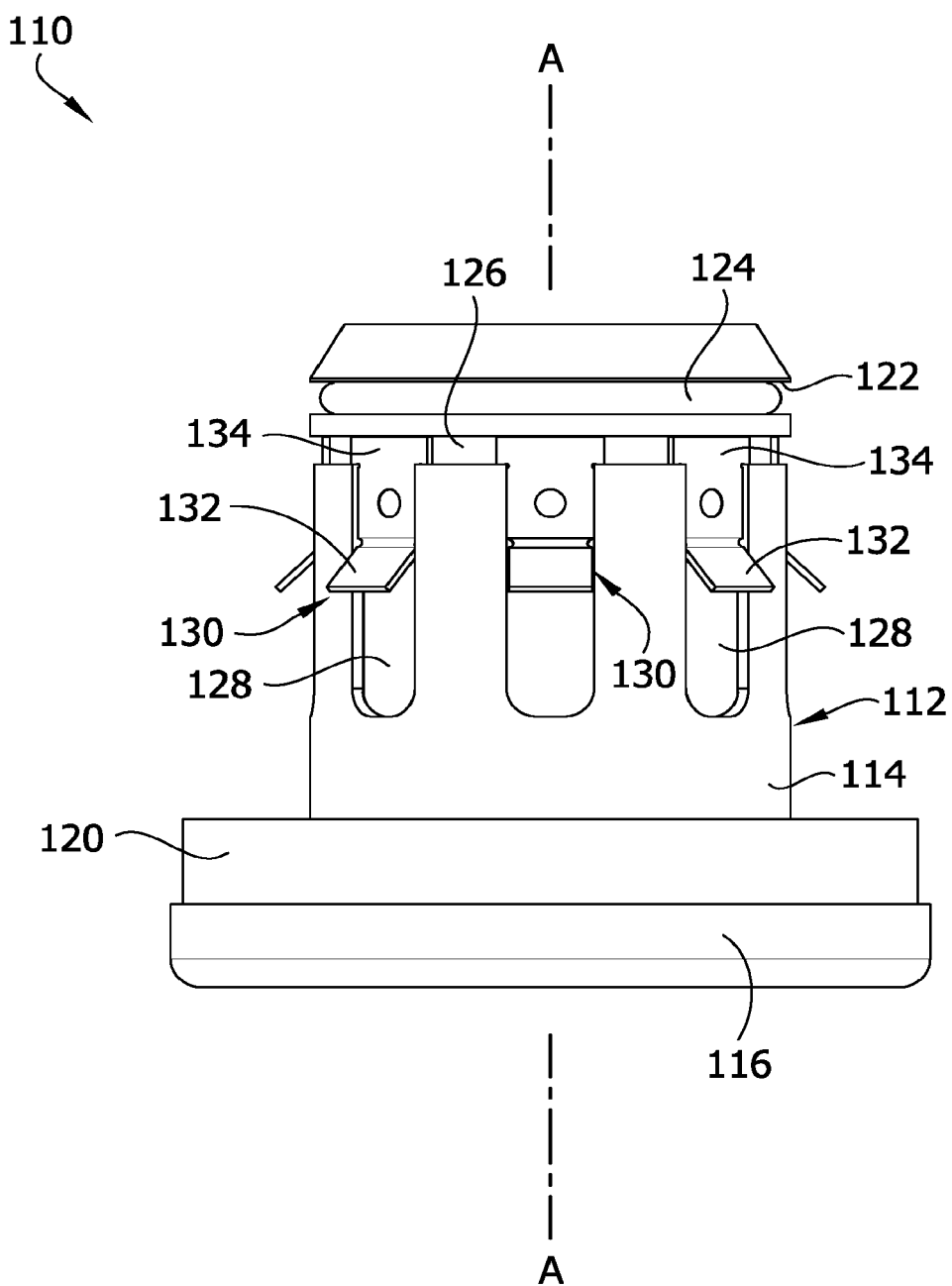
FIG. 8 is an elevation of the fitting.
Figure 9:
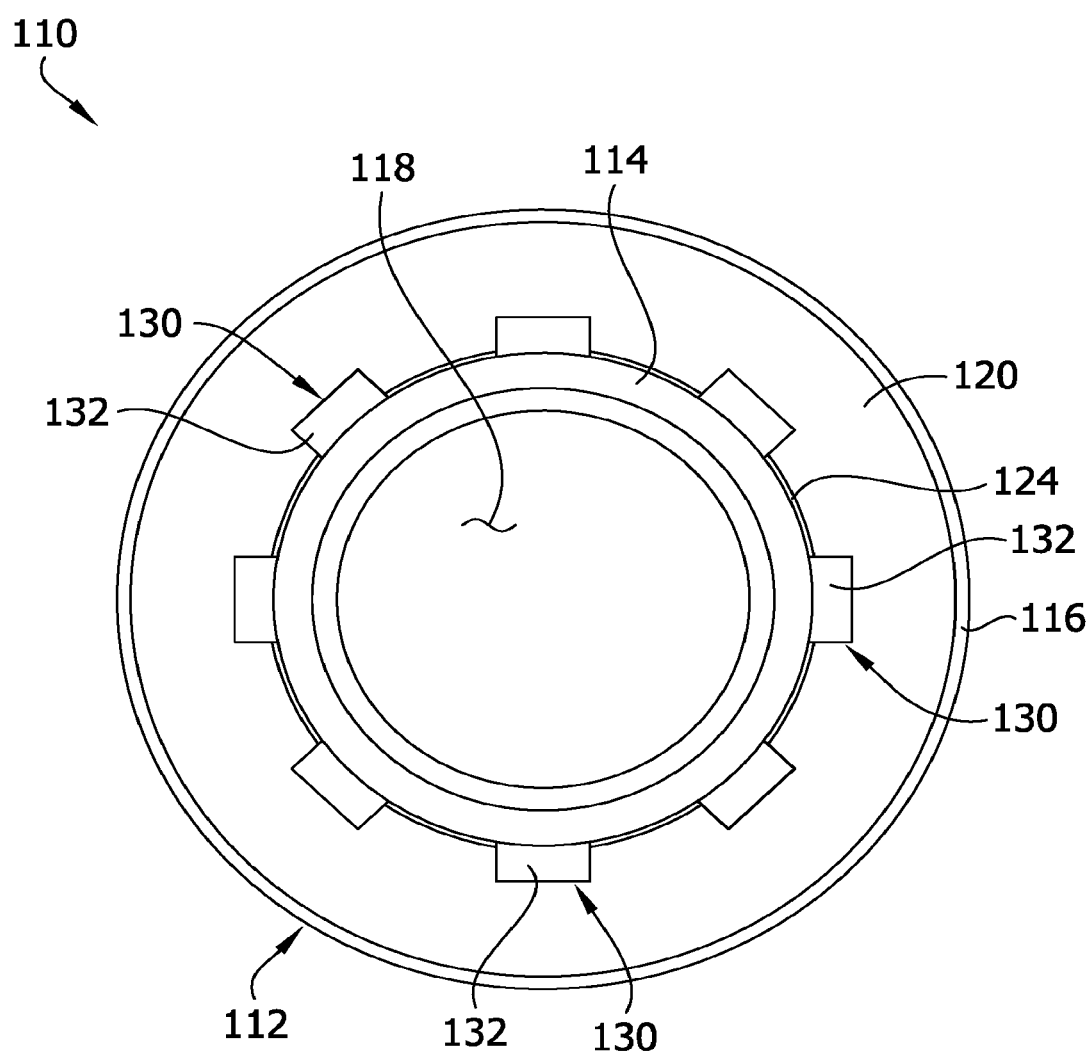
FIG. 9 is a top plan view of the fitting.
Figure 10:
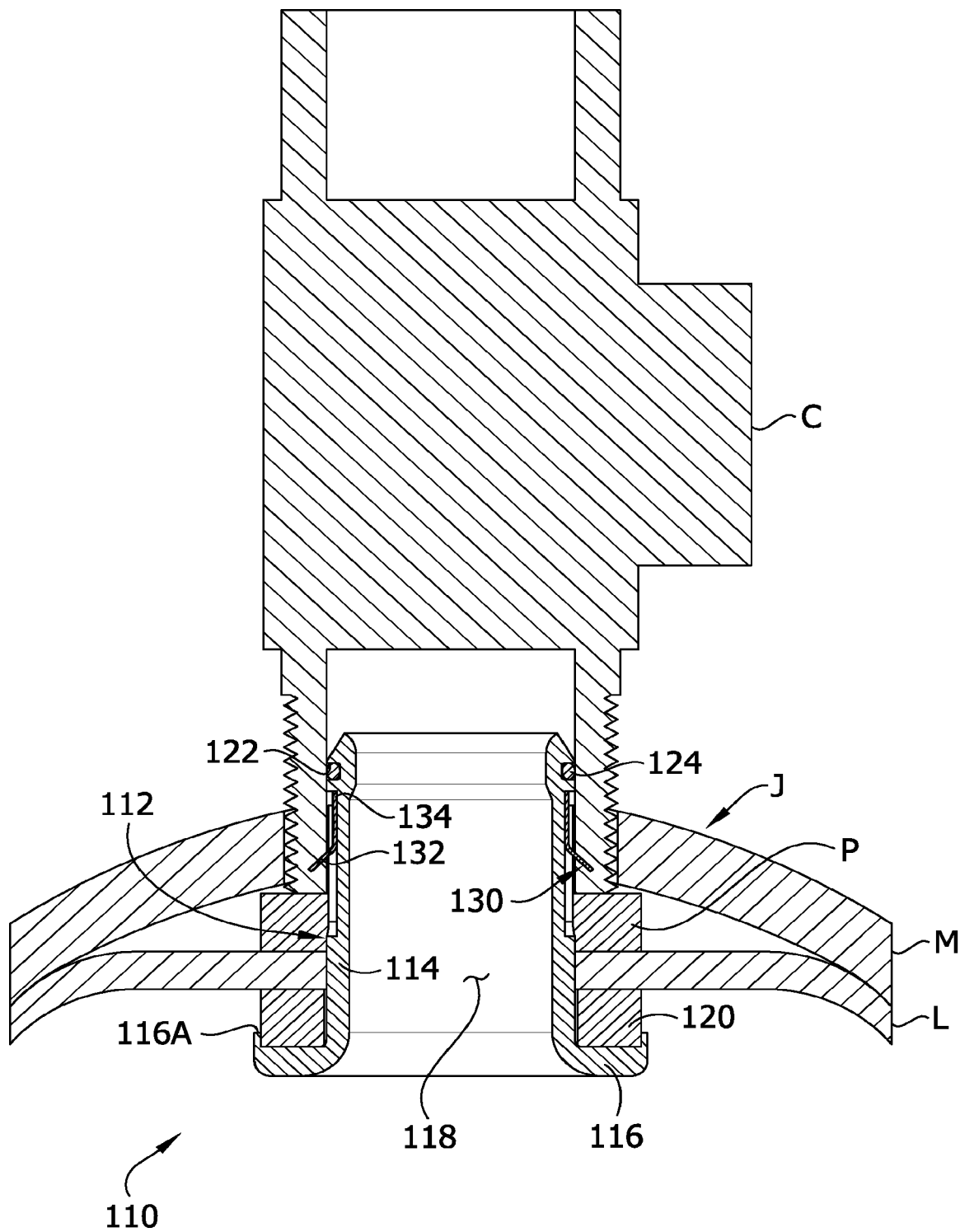
FIG. 10 is a longitudinal section of the fitting at an installed position at a junction between the main pipe and the corporation stop.

Referring to FIGS. 7-10, one embodiment of a fitting for connecting a branch conduit C to a liner L installed in a main pipe M is generally indicated at reference number 110. In the exemplary embodiment shown in FIG. 10, the branch conduit C comprises a corporation stop made of, for example, brass. In certain embodiments, the fitting 110 can be used to establish a connection between the liner L and a corporation stop C that is directly tapped into the wall of the main pipe as shown in FIG. 10. As will be explained in further detail below, a differently sized fitting of similar construction can also be used to connect a liner to corporation stop that is connected to the main pipe by a pipe saddle. Fittings can also be used to connect liners L to other types of branch conduits C without departing from the scope of the invention.

The fitting 110 comprises a fitting body, generally indicated at 112. In one or more embodiments, the fitting body 112 is formed from stainless steel or another material of sufficient strength that is resistant to corrosion. The illustrated fitting body 112 comprises a tube that extends along an axis A and includes a generally cylindrical shaft section 114 (in this instance, the term cylindrical is being used in the geometric sense) and an annular flange section 116. The flange section 116 defines an inner axial end portion of the fitting body 112 and the shaft section 114 defines an outer axial end portion of the fitting body. The inner end portion and the outer end portion of the fitting body 112 are spaced apart from one another along an axis A. The outer axial end portion of the fitting body 112 is configured to be inserted from the main pipe M radially outward with respect to the axis AM of the main pipe into the branch conduit C. Thus the outer axial end portion of the fitting body 12 is located radially (broadly, laterally) outward of the inner end portion when the fitting 110 is in use. The fitting body 112 has a passage 118 that extends through the fitting body from the inner axial end portion through the outer axial end portion.

As will be explained in further detail below, the fitting body 112 is configured to be inserted into the corporation stop C from inside the main pipe M (e.g., using the installation-tool equipped robot 12) to an installed position. At the installed position shown in FIG. 10, the shaft section 114 of the fitting body 112 is received in the corporation stop C and the flange section 116 is received in the interior of the liner L. The passage 118 provides fluid communication between the interior of the liner L and the corporation stop C when the fitting 110 is installed. Suitably, the outer diameter of the shaft section 114 is about the same as the inner diameter of the corporation stop C such that the shaft section has a relatively close tolerance fit with the corporation stop in the installed position (e.g., the outer diameter of the shaft section is less than 2 mm less than the inner diameter of the corporation stop, such as less than 1 mm, less than 0.75 mm, or about 0.5 mm).

An annular resiliently compressible gasket 120 (broadly, a seal) extends circumferentially around the shaft section 114 and is seated on the flange section 116 (broadly, is connected to the fitting body 112). When the fitting 10 is in the installed position, the flange section 116 compresses the gasket 120 against the liner L to form a fluid seal about the junction J between the fitting body 112 and the liner. In the illustrated embodiment, the flange section 116 comprises a raised collar or rim portion 116A, which extends circumferentially around the gasket 120. The rim portion 116A comprises an annular wall that extends axially from the perimeter of the flange section 16 toward the outer end of the fitting body. The rim portion 116A overlaps a radially outward facing surface of the annular compressible gasket 120 with respect to the axis A of the fitting body 112. Suitably, the rim portion 116A has a height along the axis A of the fitting body 112 that is less than the height of the gasket 120 along the axis of the fitting body. As such, the gasket 120 can contact the liner L and be compressed; the edge of the rim portion 116A does not interfere with compression of the gasket. When the gasket is compressed, the rim portion 116A prevents the gasket 120 from expanding or shifting irregularly so that a seal is maintained with the full circumference of the fitting body 112 after the gasket is compressed. The rim portion 116A thus radially contains the gasket 120 so that it remains seated on the flange section 116 at an operative position for forming a seal between fitting body 112 and the liner L. For example, the rim portion 116A is configured to contain the gasket 120 so that an entirety of the gasket is radially inboard of the perimeter of the flange section 116 when the gasket is compressed, e.g., no portion of the gasket moves radially outward beyond the outer perimeter of the flange section. As will be explained in further detail below, the resilient gasket 120 imparts a spring force on the flange section 14 that urges the fitting body 112 in an inward direction along the axis A, toward the interior of the liner L.

Figure 7:
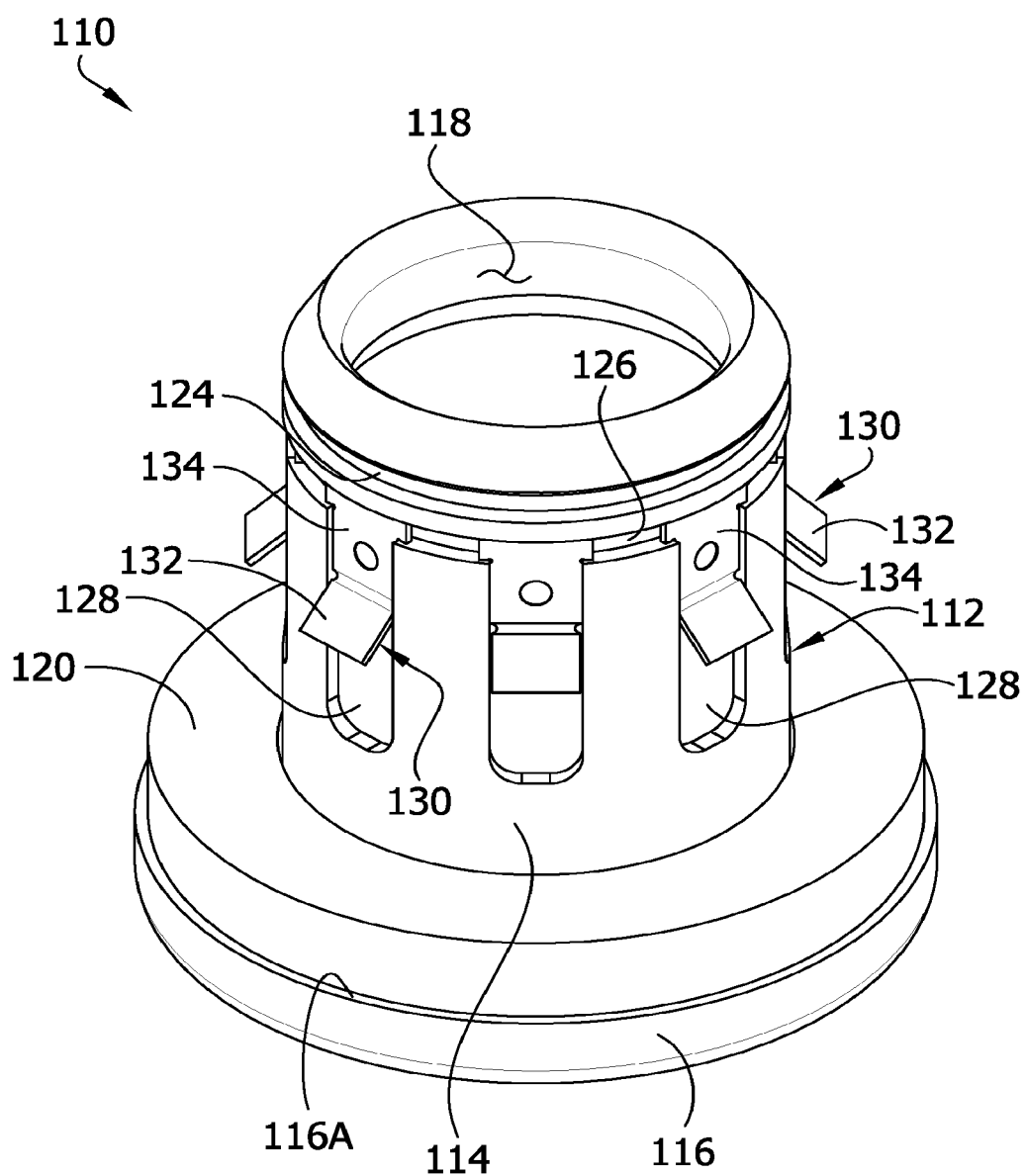
FIG. 7 is a perspective of the fitting.

The shaft section 114 of the fitting body 112 is configured for being installed in the corporation stop C. In the illustrated embodiment, the shaft section 114 comprises a tapered tip that aids in centering the outer end portion of the fitting body 112 in the opening of the junction J when inserting the fitting 110. As shown in FIG. 11, the shaft section 114 includes an annular groove 122 adjacent the tapered tip. As shown in FIGS. 7, 8, and 10, the groove 122 is configured to receive a gasket 124 (e.g., an O-ring). Suitably, the gasket 124 is sized to radially protrude slightly from the exterior surface of the shaft section 114 before the gasket is compressed. Thus when the fitting 110 is installed and the shaft section 114 is received in the corporation stop C in a close tolerance fit, the gasket 124 is compressed and forms a fluid seal between the shaft section 114 and the corporation stop C. The groove 122 is positioned along the length of the shaft section 114 adjacent the outer end portion of the fitting body such that, when the fitting 110 is installed, the gasket 124 engages the corporation stop C at a location spaced apart outwardly along the length of corporation stop from the junction J. Thus, the gaskets 120, 124 are configured to establish a sealed fluid connection between the liner L and the corporation stop C that isolates the junction J (and the interfaces between the corporation stop, the main pipe M, the liner L, and the remnant 210R of the plug 210) from fluid flowing through the pipe system.

Referring to FIG. 11, the exterior surface of the shaft section 114 defines an annular fastener-mounting groove 126 and a plurality of longitudinal fastener-mounting grooves 128. The longitudinal fastener-mounting grooves are located at spaced apart positions about the circumference of the fitting body 112 and extend from the annular fastener-mounting groove 126 parallel to the axis A toward the flanged section 116 of the fitting body 112. The fastener-mounting grooves 126, 128 are configured to receive fasteners, generally indicated at 130, therein. As will be explained in further detail below, when the fasteners 130 are mounted on the fitting body 112 in the grooves 126, 128, they form teeth configured to establish a mechanical connection between the fitting body 112 and the corporation stop C that secures the fitting 110 at the installed position. As will be explained in further detail below, unlike the helical thread of the fittings disclosed in U.S. Pat. No. 8,015,695 and U.S. Patent Application Publication No. 2009/0289451, the teeth 130 are configured to establish a secure mechanical connection between the fitting and the corporation stop C, merely by inserting the fitting 110 axially into the corporation stop. So for example, the teeth 130 are configured to establish the mechanical connection as the fitting body is inserted to the corporation stop C to the installed position without rotating a tooth a complete revolution about the axis A (e.g., without rotating a tooth one-half of a revolution about the axis A, without rotating a tooth one-quarter of a revolution about the axis, etc.). In a preferred embodiment, the fitting 110 is inserted without any rotation.

Referring to FIGS. 7-9, in the illustrated embodiment, the fitting 110 comprises eight fasteners 130 that are mounted on fitting body 112 to form eight teeth at equally spaced positions about the axis A. Other embodiments could include other numbers (e.g., one or more) or arrangements of fasteners or teeth without departing from the scope of the invention. In one or more embodiments, each of the fasteners 130 is formed from a corrosion resistant metal, such as stainless steel, which has a hardness that is greater than the hardness of the material defining the interior surface of the corporation stop C. As will be explained in further detail below, using fasteners 130 that are harder than the corporation stop C allows the fasteners to deform (e.g., gouge) the corporation stop C if the fitting 110 is urged out of the corporation stop from the installed position. This enhances the strength of the mechanical connection between the fitting 110 and the corporation stop C. It will be appreciated that the fasteners can be formed from other metals and non-metals without departing from the scope of the invention.

Figure 13:
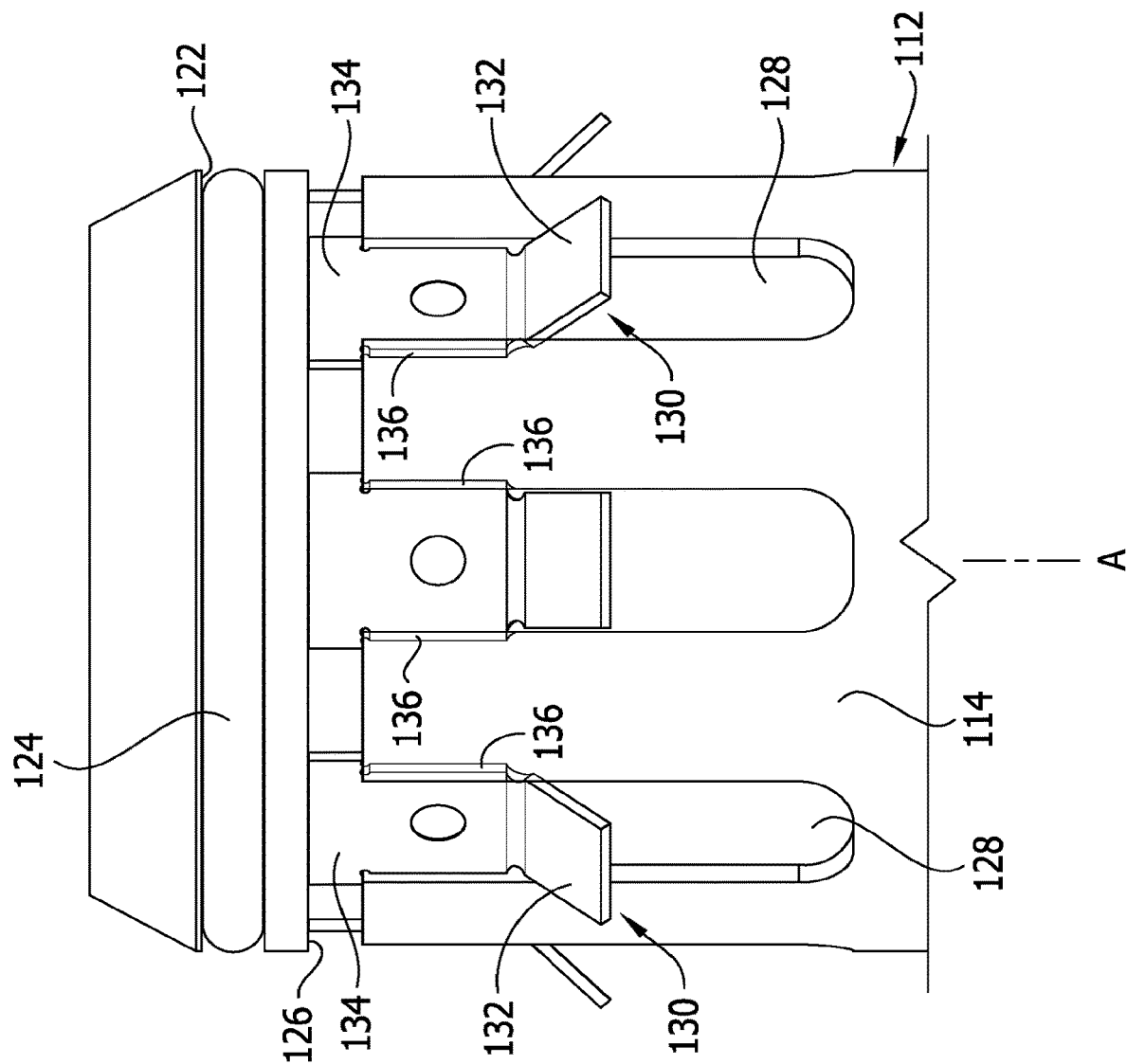
FIG. 13 is an enlarged fragmentary elevation of an outer end portion of the fitting.

As shown in FIG. 12, each of the fasteners 130 includes a tooth 132 and a mounting portion 134 oriented transverse to (e.g., at an oblique angle with respect to) the tooth. When the fasteners 130 are mounted on the fitting body as shown in FIGS. 7, 8, and 13, the mounting portions 134 are received in the fastener-mounting grooves 126, 128 and extend generally parallel to the axis A. The fasteners 130 are mounted on the fitting body 112 at a location adjacent the outer end of the fitting body but are spaced inward along the axis A from the gasket 124. In one or more embodiments, the fasteners 130 are mounted on the fitting body 112 at a location closer to the outer end portion of the fitting body than the inner end of the fitting body. More specifically, a bottom segment of each mounting portion 134 is received in a respective longitudinal fastener-mounting groove 128 and a top segment of the mounting portion, which is wider than the bottom segment, is received in the annular fastener-mounting groove 126. The top segment of each mounting portion 134 opposes the top and bottom edges of the annular fastener-mounting groove 126 to prevent the fastener 130 from moving relative to the fitting body 112 along the axis A. The bottom segment of each mounting portion 134 opposes the longitudinal side edges of the respective longitudinal fastener-mounting groove 128 to prevent the fastener 130 from moving transverse to the longitudinal groove relative to the fitting body 112, e.g., circumferentially about the axis A.

In one or more embodiments, each fastener 130 is secured to the fitting body 112 without a discrete mechanical fastener, an adhesive bond, or a thermal bond such as a welded bond, a soldered bond, a brazed bond, or the like. Referring to FIG. 13, the illustrated fitting body 112 comprises swaged regions 136 along the longitudinal side edges of each longitudinal fastener-mounting groove 128 that secure the mounting portion 134 of the respective fastener to the fitting body. The swaged regions 136 are pressed against the outer surface of each mounting portion 134 to clamp each fastener 130 firmly in position. Using swaging to secure the fasteners 130 to the fitting body 112, in contrast to discrete mechanical fasteners, adhesives, or thermal bonds, introduces no openings or foreign materials into the fitting 110 and moreover allows the wall thickness of the shaft section of the fitting body to be minimized, thereby minimizing the extent to which the installed fitting obstructs fluid flow through the junction J. In one or more embodiments, the shaft section has a wall thickness in an inclusive range of from about 1 mm to about 3 mm.

The tooth 132 of each fastener 130 extends radially outward from the outer end portion of the fitting body 112 with respect to the axis A. In the illustrated embodiment, each tooth 132 slopes inward toward the flanged section 116 of the fitting body 112 as it extends radially outward. In one or more embodiments, each tooth 132 extends at an angle of about 45° with respect to the axis A. It can be seen in FIG. 10 that the teeth 132, which protrude radially outward from the shaft section 114, extend radially outward past the inner diameter of the corporation stop C. Thus, as the shaft section 114 of the fitting body 112 is inserted into the corporation stop, the teeth 132 of the fasteners 130 will engage the interior surface of the corporation stop. The teeth 132 are configured to resiliently bend radially inward toward the axis A as the shaft section 114 is inserted into the corporation stop C. The longitudinal fastener-mounting grooves 128 provide clearance for the teeth 130 to bend inwardly. The inwardly bent fasteners 130 tend to resiliently rebound radially outwardly. Thus, after the teeth 130 are bent inwardly during installation, they impart a radially outward force (e.g., press outwardly) against the corporation stop C and thereby mechanically connect the fitting 110 to the corporation stop.

The radially protruding teeth 132 are also configured to deform the corporation stop C when forces are imparted on the fitting 110 after it is installed which tend to forcibly remove the fitting from the corporation stop (e.g., forces along the axis A directed inward toward the main pipe M). Each tooth 132 has a radially outward edge and first and second side edges that are angularly spaced apart about the circumference of the fitting body 112. In one or more embodiments, the radially outer edge of the tooth 132 is ground to define a sharp angle (e.g., a sharp right angle) with one or both of the inner and outer major surfaces of the tooth. After the fitting 110 is installed, forces imparted on the fitting 110 tending to urge shaft section 114 out of the corporation stop C into the interior of the liner L (e.g., the spring force of the gasket 120) will cause the ground outer edge of each fastener 130 to bear against and dig into the interior surface of the corporation stop. As a result, the ground edges of the fasteners 130 resist and may slightly gouge the corporation stop C and thus protrude slightly into the wall thickness of the corporation stop. This enhances the strength of the mechanical connection between the fitting 110 and the corporation stop C and prevents the fitting body 112 from being pulled out of the corporation stop.

During installation of the fitting 110, as the fitting body 112 is inserted along its axis A into the corporation stop C from inside the main pipe M, the fasteners 130 engage the interior surface of the corporation stop C to establish a mechanical connection between the fitting 110 and the corporation stop. The teeth 132 of the fasteners 130 resiliently bend inwardly as the fitting 110 is advanced along the corporation stop. The flange section 116 compresses the gasket 120 against the liner L to form a fluid seal between the fitting body 112 and the liner about the junction J when the fitting body reaches the installed position. After the fitting 110 reaches the installed position, it is released. The teeth 132 resiliently rebound, pressing outward against the wall of the corporation stop C and thereby establishing a mechanical connection. The resiliently compressible gasket 120 also imparts a spring force between the flange section 116 and the liner L that urges the fitting body 112 in an inward direction along the axis A. The spring force causes the ground outer edges of the fasteners 130 to bear against the corporation stop C and strengthen the mechanical connection. With the fitting body 112 secured in place by the mechanical connection, the flange section 116 holds the portion of the liner L adjacent the junction J against the main pipe to prevent delamination of the liner.

In the installed position, the gasket 120 provides an inner fluid seal between the liner L and the fitting body 112 and the gasket 124 provides an outer fluid seal between the corporation stop C and the fitting body. The inner and outer fluid seals provide a sealed connection between the liner L and the corporation stop and fluidly isolate the interfaces at the junction J between the main pipe M, the liner, the corporation stop C, and/or the plug remnant 210R from the fluid flowing through the liner and the corporation stop. The mechanical connection provided by the teeth 130 holds the fitting 110 in the installed position against the spring force of the gasket 110 such that the inner and outer fluid seals are maintained. If additional forces are imparted on the fitting 110 that urge the fitting inwardly along the axis A into the lined main pipe M, the outer edges of the fasteners 130 further bear against the corporation stop with still greater force to maintain the mechanical connection. If forces are imparted on the fitting 110 that urge the fitting in the opposite direction, the flange section 116 compresses the gasket 120 to enhance the strength of the inner fluid seal while maintaining the outer fluid seal.

In an exemplary method of making the fitting 110, the fitting body is formed by machining a single piece of, for example, stainless steel. Each of the fasteners 130 is likewise formed from a single piece of, for example, stainless steel. The mounting portions 134 of the fasteners are placed into the fastener-mounting grooves 126, 128 and then the longitudinal edges of each longitudinal fastener-mounting groove (broadly, a mounting region of the fitting body) is deformed (e.g., swaged) against the respective fastener. The deformed regions 136 thereby clamp the mounting portions 134 in place on the fitting body 112 to mount the fasteners 130 on the fitting body.

Figure 14:
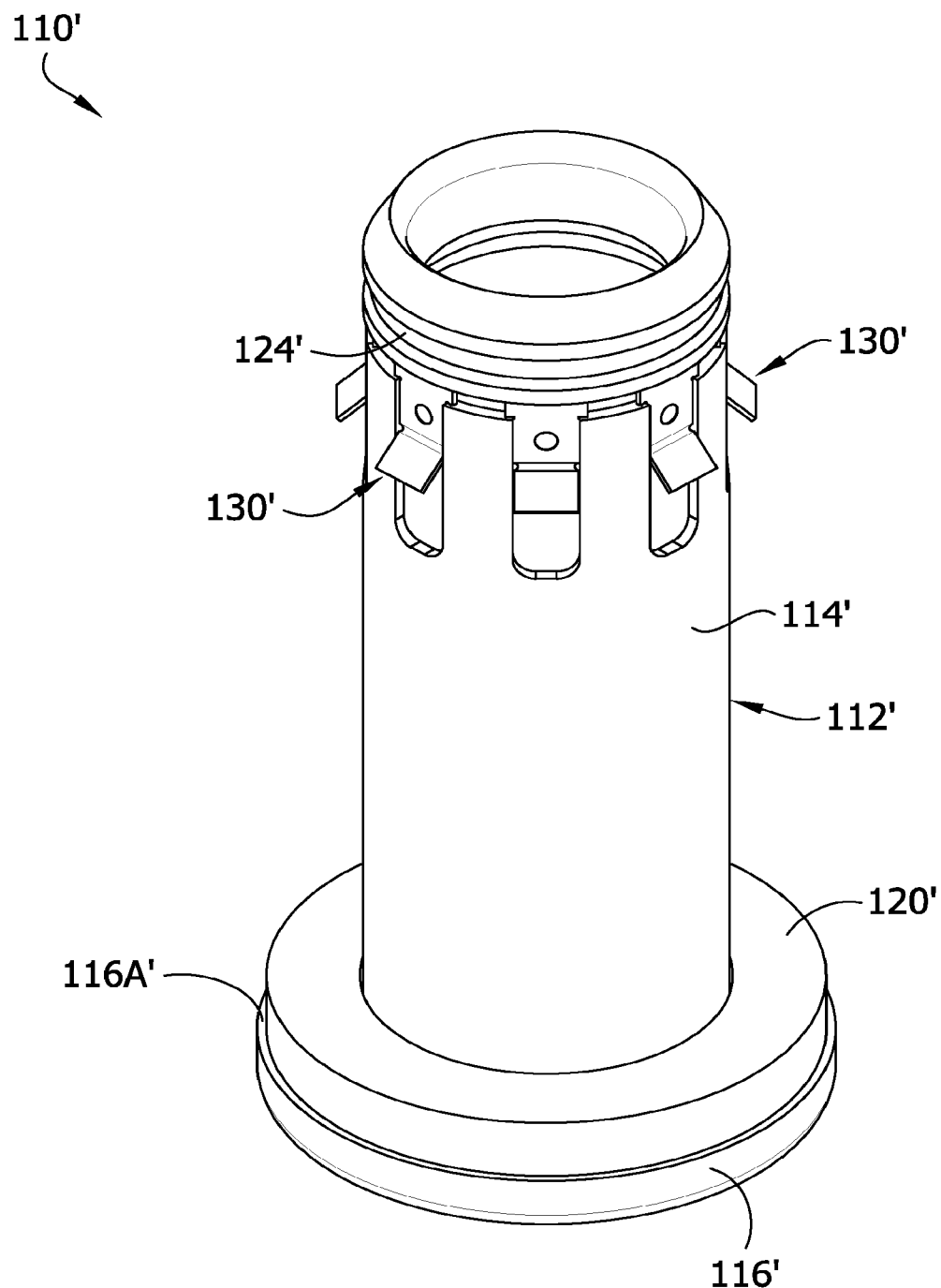
FIG. 14 is a perspective of another embodiment of a fitting.
Figure 15:
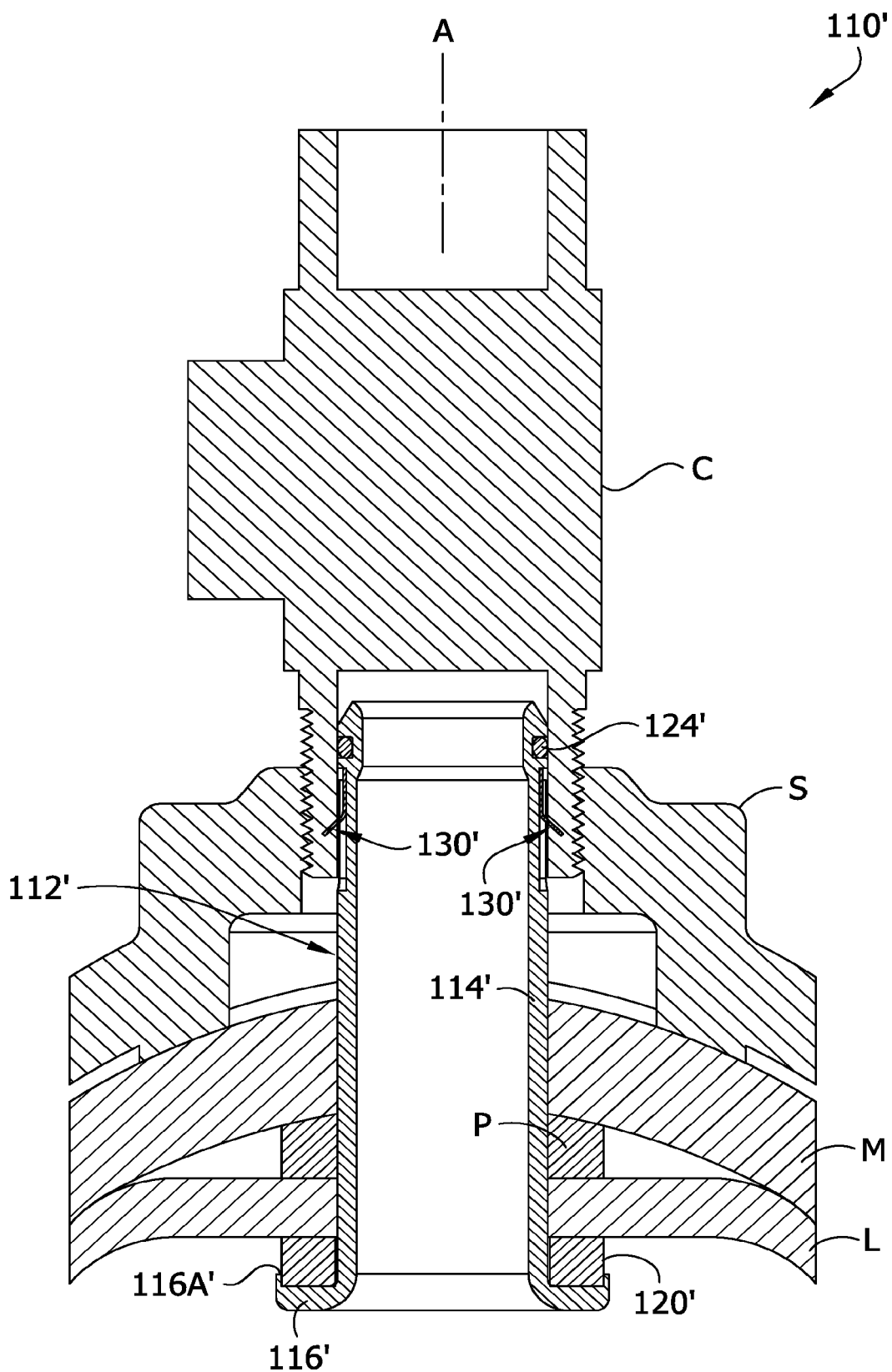
FIG. 15 is a longitudinal section of the fitting of FIG. 14 at an installed position at a junction comprising a corporation stop received in a pipe saddle mounted on the main pipe.
Figure 16:
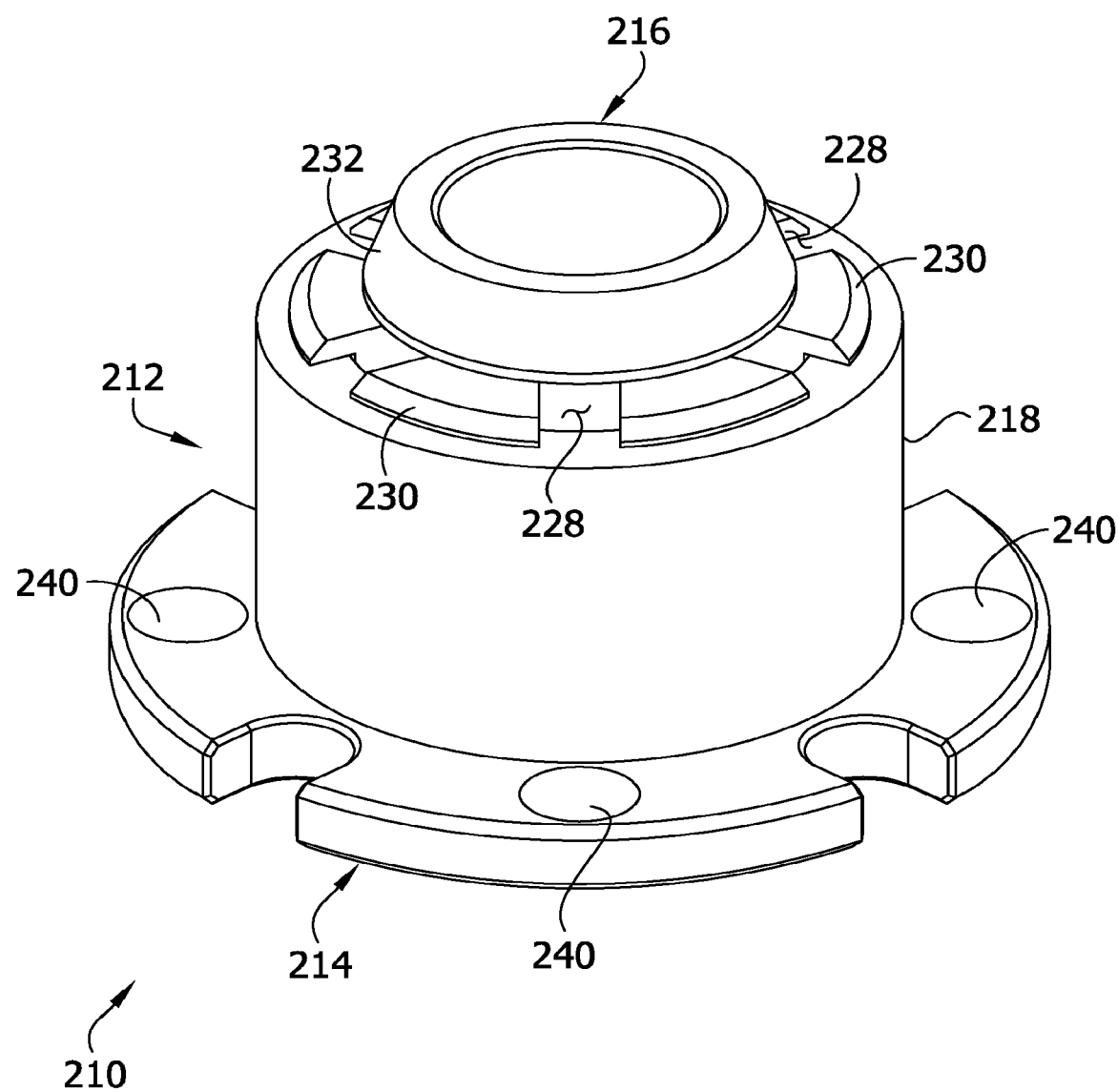
FIG. 16 is a perspective of a plug for sealing a branch conduit while the main pipe is lined with a liner.

Fittings of the type described herein can be used at various junctions J between lined main pipes M and branch conduits C. For example, referring to FIGS. 14 and 15, one embodiment of a fitting 110' is identical to the fitting 110 in every respect except that it is sized and arranged for being installed in a branch conduit C comprising a pipe saddle S that connects the corporation stop to the main pipe M. In comparison with the fitting 110, the shaft section 114' of the fitting 110' has a greater length along the axis A. The gasket 124' and the fasteners 130' are spaced from the outer end of the fitting body 112' by the same distances as the gasket 124 and the fasteners 130 are spaced from the outer end of the fitting body 112. However the gasket 124' and the fasteners 130' are spaced apart from the flange section 116' by a greater distance than the gasket 124 and the fasteners 130 are spaced from the flange section 116. The greater length of the shaft section 114' allows the gasket 124' to provide a fluid seal between the shaft section 114' and the saddle-mounted corporation stop C and likewise allows the fasteners 130' to establish a mechanical connection between the fitting 110' and the saddle-mounted corporation stop. As above the mechanical connection maintains the fitting 110' in the installed position and the gaskets 120', 124' provide a complete seal of the junction J.

III. Plug

Referring to FIGS. 16-19, an exemplary embodiment of the plug 210 will now be described. The plug 210 comprises a plug body 212 that is configured to seal a corporation stop C to block fluid communication between the main pipe M and the corporation stop. The illustrated plug body 212 is configured to be inserted into a corporation stop C as a bung seal. Before a main pipe M is lined with a liner L, a plug 210 is inserted into each corporation stop C from the interior of the main pipe. Although the illustrated plug body 212 has a bung-type configuration, in other embodiments it is contemplated that the plug body could be configured to function as cover that extends across the inner end of a corporation stop C to seal the corporation stop without protruding into the corporation stop. Still other configurations of plug bodies for sealing a corporation stop could be used in certain embodiments.

Figure 17:
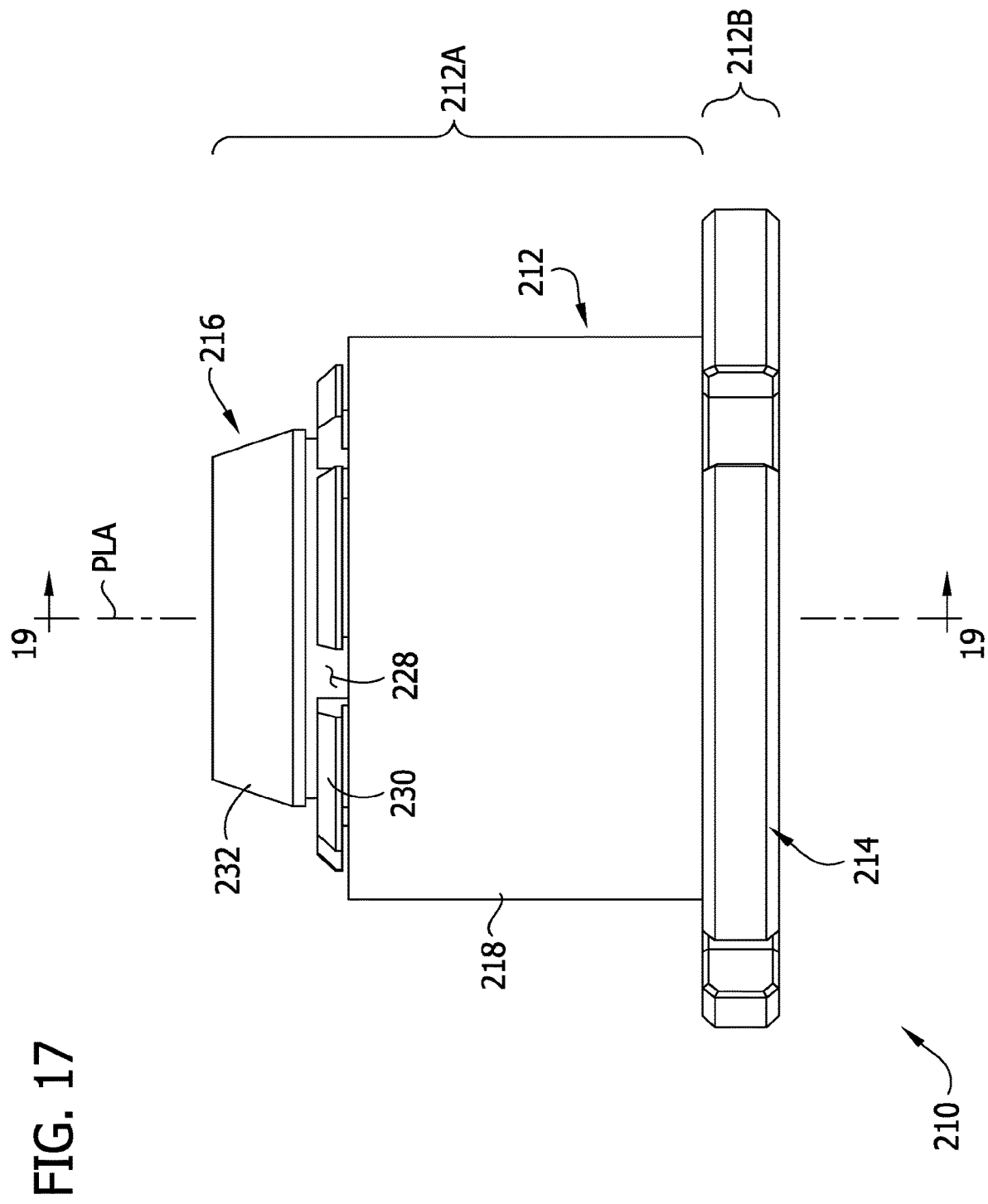
FIG. 17 is an elevation of the plug.

The illustrated plug body 212 is a multi-part assembly, but in other embodiments a plug body can have other configurations. The multi-part assembly includes an expandable fitting member 214, a plunger member 216, an annular gasket 218, and a plunger gasket 219. As shown in FIG. 17, the multi-part assembly forms a plug body 212 that has a shaft section 212A and a flange section 212B. The shaft section 212A defines an outer end portion of the plug body 212 and the flange section 212B defines an inner end portion. The inner and outer end portions of the plug body 212 are spaced apart along a plug axis PLA.

Figure 18:
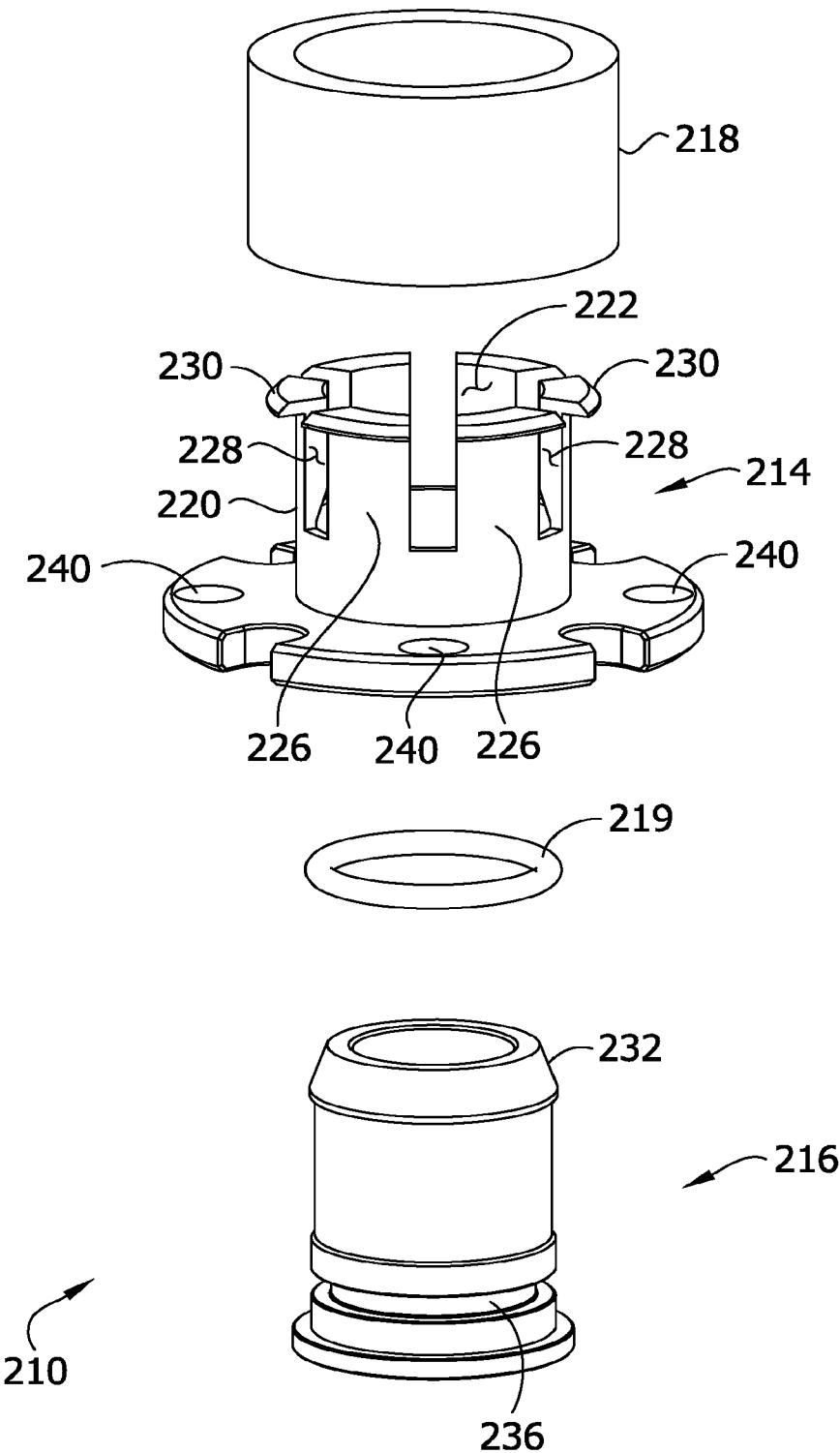
FIG. 18 is an exploded perspective of the plug.
Figure 19:
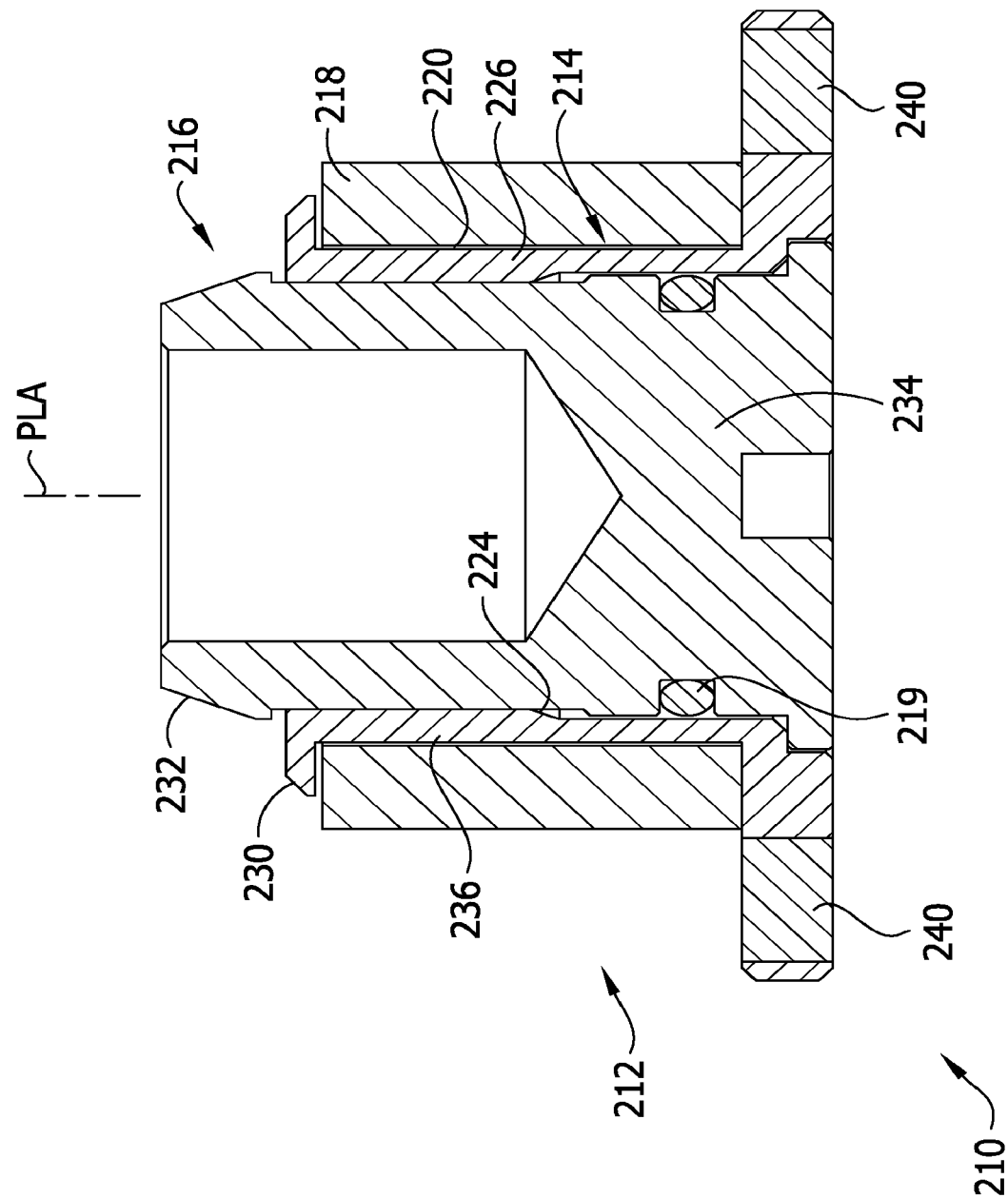
FIG. 19 is a cross section taken in the plane of line 19-19 of FIG. 17.

Referring to FIGS. 18 and 19, the expandable fitting member 214 forms the flange section 212B of the plug body and also comprises a shaft section element 220 that extends outward from the flange section along the axis PLA. As explained in greater detail below, the shaft section element 220 is expandable radially with respect to the plug axis PLA. The shaft section 212B is generally hollow and has an interior surface that defines an opening 222. In the illustrated embodiment, the opening 222 forms a through passage that extends from the inner end portion of the expandable fitting member 214 through the outer end portion. The inner surface of the expandable fitting member 214 includes a tapered segment 224 (see also FIG. 20). The tapered segment 224 comprises an axial segment of the interior surface that tapers radially inwardly as it extends along the axis PLA in the outward direction. In one or more embodiments, the plunger member 216 is configured to bear against the tapered segment 224 to expand the shaft section element 220 radially with respect to the plug axis PLA.

The shaft section element 220 comprises a plurality of axially extending fingers 226 that are separated by a plurality of axially extending slots 228 such that the fingers are circumferentially spaced apart about the axis PLA. The fingers 226 define the outer end portion of the expandable fitting member 214. In the illustrated embodiment each of the fingers 226 defines a respective circumferential portion of the outer end portion of the expandable fitting member 214. The slots 228 are open-ended, extending along the axis PLA through the outer end of the expandable fitting member 214. In the illustrated embodiment, an inner end portion of each finger 226 defines a respective circumferential portion of the tapered segment 224 of the inner surface of the expandable fitting member 214. The fingers 226 are generally configured to bend radially outwardly, whereby the shaft section element 220 expands radially with respect to the axis PLA. In one or more embodiments, the fingers 226 bend radially outwardly when the plunger bears against the tapered segment 224.

Each finger has a radially outwardly extending flange segment 230 at the outer end portion of the finger (broadly, at least one finger comprises a radially outwardly extending flange segment 230). The flange segments 230 are configured to retain the annular gasket 218 on the expandable fitting member 214 such that the annular gasket is axially constrained between the flange section 212B and the finger flange segments. The annular gasket 218 extends circumferentially around the exterior of the shaft section element 220. Thus, when the shaft section element 220 expands radially outwardly, it presses outwardly against the annular gasket 218. Suitably, the annular gasket 218 is formed from a resiliently compressible material such as a rubber for forming a fluid seal when compressed. As will be explained in further detail below, the annular gasket 218 is configured to provide a fluid seal between the corporation stop C and the plug body 212 when the plug 210 is installed in the corporation stop.

The plunger member 216 is generally configured to be received in the opening 222 of the shaft section element 220. The plunger member 216 comprises a generally cylindrical exterior surface (in this instance, 'cylindrical' is being used in the geometric sense) that includes a tapered segment 232. In one or more embodiments, the tapered segment 232 comprises an axial end segment of the exterior surface that tapers radially inwardly as it extends along the axis PLA in the outward direction. During use, the tapered exterior segment 232 of the plunger member 216 is configured to bear against the tapered interior segment 224 of the expandable fitting member 214 to bend the fingers 226 radially outward and thereby expand the shaft section element 220 radially with respect to the plug axis PLA.

Suitably, the plunger member 216 comprises a radial body 234 (FIG. 19) that extends contiguously across an entire radial cross-section of plunger member. The radial body 234 is thus configured to block fluid flow through the interior 222 of the expandable fitting member 214 during use. In the illustrated embodiment, the plunger member 216 comprises an annular groove 236 (FIG. 18) that receives the plunger gasket 219 (e.g., an O-ring). The plunger gasket 219 is generally configured to form a fluid seal between the plunger member 216 and the expandable fitting member 214 during use.

Figure 20:
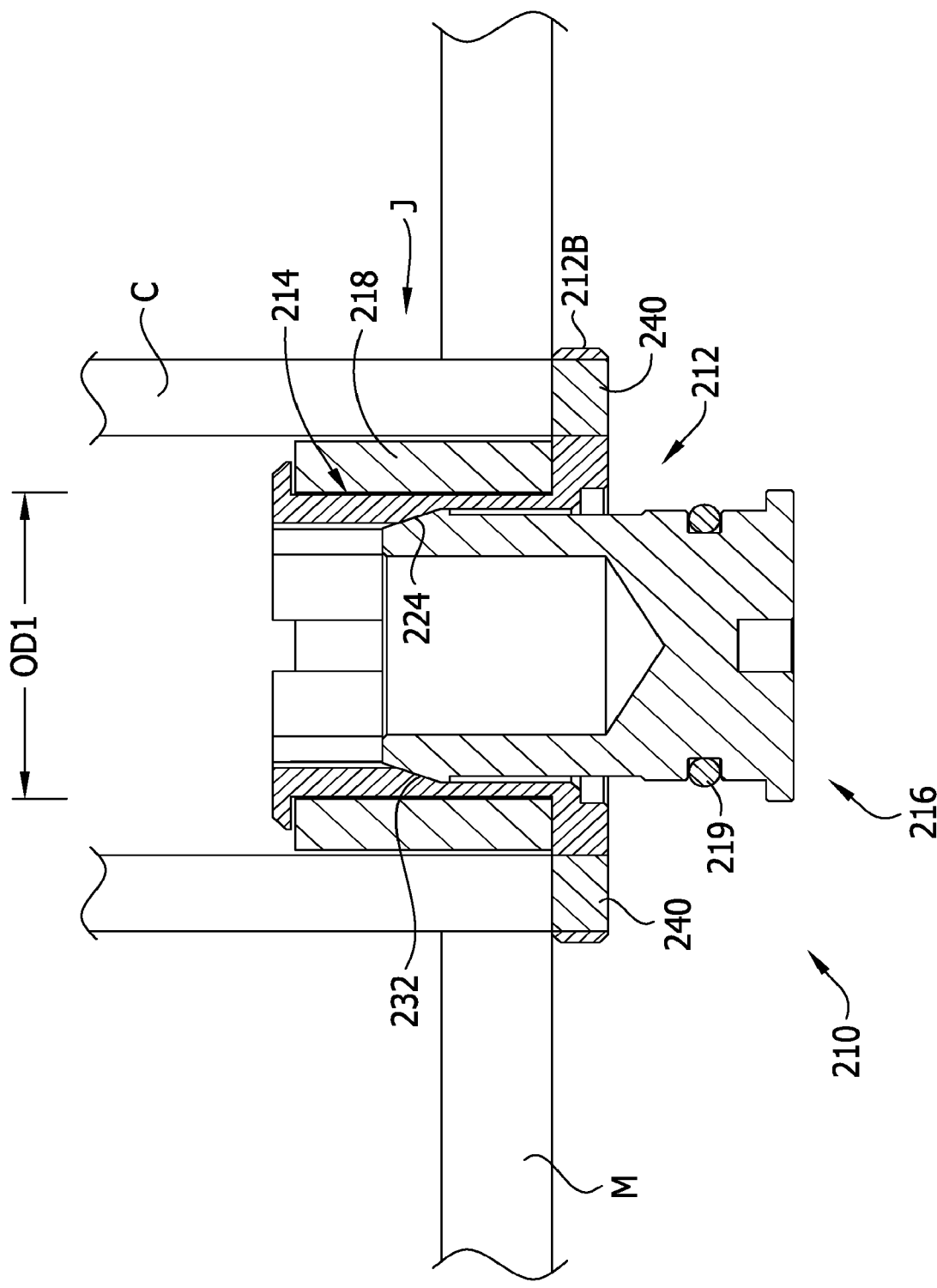
FIG. 20 is a cross section illustrating the plug positioned in a corporation stop before being expanded.
Figure 21:
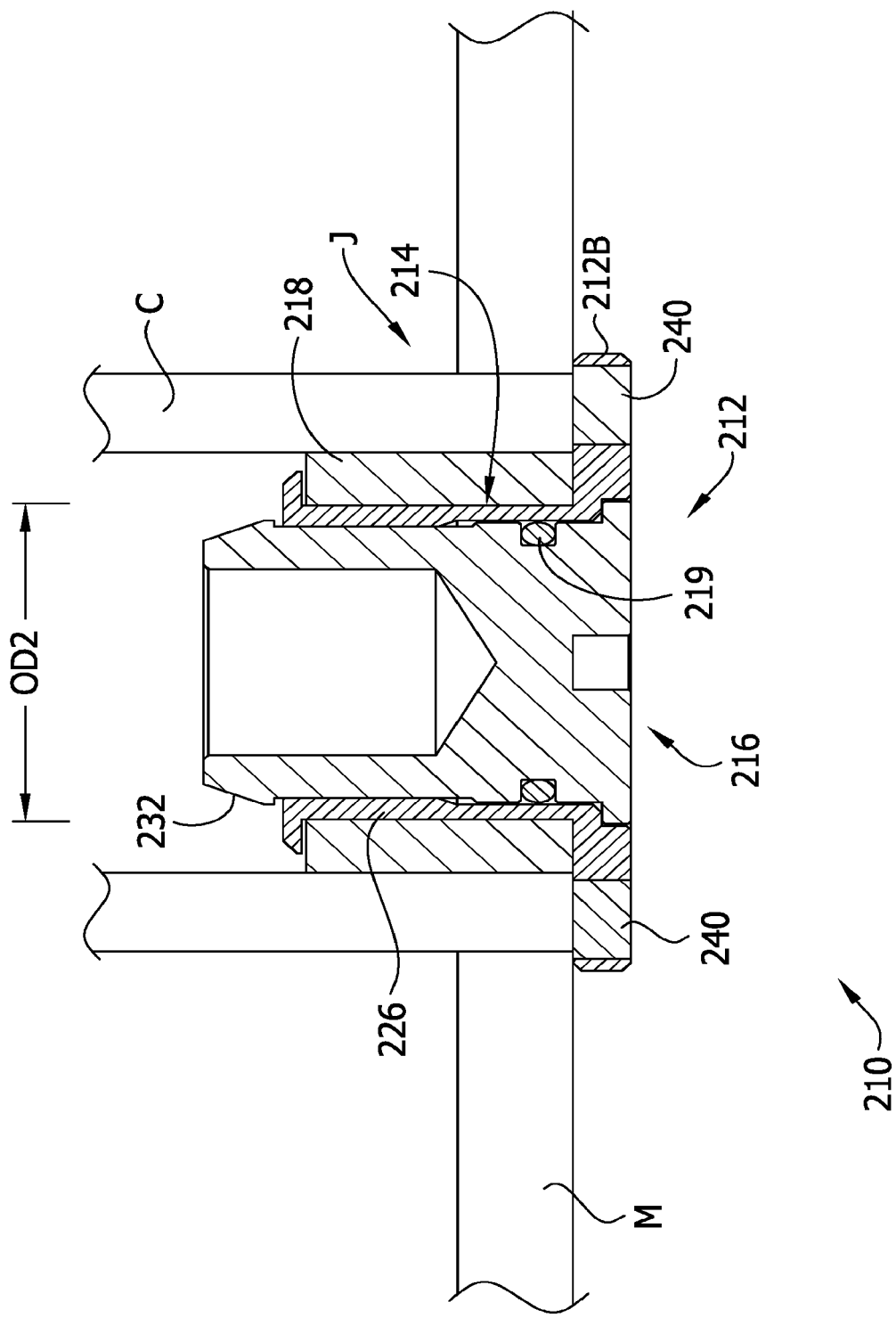
FIG. 21 is a cross section similar to FIG. 20 illustrating the plug installed in the corporation stop after being expanded.

Referring to FIGS. 20 and 21, the plunger member 216 is movable relative to the fitting member 214 along the axis PLA between a first position (FIG. 20) and a second position (FIG. 21). In the first position, the tapered exterior surface 232 of the plunger member 216 is seated against the tapered interior surface 224 of the expandable fitting member 214. The outer end portion of the plunger member 216 is spaced apart inwardly along the axis PLA from the outer end portion of the expandable fitting member 214. The shaft section element 220 has a first maximum outer cross-sectional dimension OD1 when the plunger member 216 is in the first position with respect to the expandable fitting member 214. As the plug member 216 moves from the first position to the second position with respect to the expandable fitting member 214, the tapered exterior surface 232 bears against the tapered interior surface 224 and bends the fingers 226 radially outward. Bending the fingers 226 outward causes the shaft section element 220 to press radially outwardly against the annular gasket 218. In the second position, the outer end portion plunger member 216 protrudes outwardly along the axis PLA from the outer end portion of the expandable fitting member 214. The shaft section element 220 has a second maximum outer cross-sectional dimension OD2 when the plunger member 216 is in the second position with respect to the expandable fitting member 214. The second maximum outer cross-sectional dimension OD2 is greater than the first maximum outer cross-sectional dimension OD1.

The movable plunger member 216 facilitates installation of a plug 210 into a corporation stop C by a two-step process. First, the plug 210 is positioned or set into the corporation stop C. Then after completing the first step, in a discrete second step, and the shaft section 212A of the plug body 212 is radially expanded to form a fluid seal between the plug body and the corporation stop C. The first step of positioning the plug 210 into the corporation stop is performed while the plunger member 216 is in the first position with respect to the expandable fitting member 214. Thus, the shaft section element 220 of the expandable fitting member 214 has the first maximum outer cross-sectional dimension OD1 while performing the first step. Suitably, when the shaft section element 220 has the first maximum outer cross-sectional dimension OD1, the annular gasket 218 has an outer cross-sectional dimension that provides clearance between the shaft section 212A of the plug body 212 and the interior of the corporation stop C. In comparison with a plug body that is sized and arranged for sealing engagement with the interior of the corporation stop while being positioned into the corporation stop, the illustrated plug body 212 can be significantly easier to position into a corporation stop C.

After positioning the plug body 212, the plunger member 216 is forced outwardly along the axis PLA relative to the expandable fitting member 218, thereby bending the fingers 226 and expanding the maximum outer cross-sectional dimension of the shaft section element 220 to the second maximum outer cross-sectional dimension. The expansion of the shaft section element 220 presses the annular gasket 218 into sealing engagement with the interior perimeter of the corporation stop C. Thus, advancement of the plunger member 216 relative to the expandable fitting member 214 forms a fluid seal between the plug body 212 and the corporation stop.

In one or more embodiments, both steps of the two-step process for installing the plug 210 can be performed by a single stroke of a linear actuator. As will be described in further detail below, the fitting installation tool 22 suitably comprises one or more linear actuators configured to move a fitting such as the plug 210 outward along an axis. In one or more embodiments, the tool directly engages the inner end portion of the plunger member 216 as it moves the plug 210 along an axis of movement generally parallel with the plug axis PLA. After properly aligning the plug 210 with the corporation stop C (e.g., so that the plug axis PLA is coaxial with the axis of the corporation stop), the linear actuator is actuated to move the plug body 212 in a single stroke. As the mount moves axially outward, the plug body 212 initially moves in unitary fashion outward along the axis until the flange section 212B engages the junction J. This stops movement of the expandable fitting member and the annular gasket 218. Further outward movement of the tool moves the plunger member 216 and plunger gasket 219 relative to the expandable fitting member 214, thereby expanding the shaft section element 220 and forming a fluid seal as explained above.

In the illustrated embodiment, the shaft section 212A comprises a removable section of the plug body 212 that is configured to be removed after the main pipe M is lined with the liner L to restore fluid communication between the corporation stop C and the main pipe M. For example, the shaft section element 220 of the expandable fitting member 214, the plunger member 216, the plunger gasket 219, and the annular gasket 218 form a removable section of the plug body 212 in one embodiment. In contrast, the flange section 212B comprises a durable section of the plug body 212 that remains connected to the lined pipe M when the shaft section is removed. After the shaft section 212A of the plug is removed, the flange section 212B defines the plug remnant 210R as shown in FIGS. 5 and 6. The liner L holds the flange section 212B in place against the main pipe M, about the corporation stop C, thus maintaining the connection between the plug remnant and the pipe.

Although the robot 12, when equipped with the installation tool 22, provides an exemplary mechanism for installing the plug 210 in the corporation stop, various mechanisms (e.g., robots) for installing the plug from inside the main pipe M are known in the art. Any suitable mechanism can be used to install the plugs 210 in the corporation stops C prior to lining the main pipe M with the liner L.

In one or more embodiments, the removable section 212A of the plug 210 can be removed by forming an opening in the plug body 212 (e.g., using the plug removal tool 24) that extends along the axis PLA of the plug body from the inner end through the outer end thereof. Suitably, the opening has a cross-sectional size that is less than the cross sectional size of the durable section 212B of the plug 210. For example, in the illustrated embodiment, the removable shaft section 212A can be removed by drilling a hole along the plug axis PLA that has a diameter that is about the same as the diameter of shaft section (or about the same size as the inner diameter of the corporation stop C). After drilling is complete, the durable section 212B (e.g., the flange) will remain connected to the lined pipe M, intact between the main pipe and the liner L. That is, the liner L holds the flange section 212B in place against the main pipe M, about the corporation stop C, thus maintaining the connection between the plug remnant and the pipe. The hole formed in center of the durable section 212B when the removable section is removed provides fluid communication between the corporation stop C and the main pipe M.

The plug 210 comprises one or more tool locating elements 240 that are configured to transmit or receive a locating signal used to locate the corporation stop C after the main pipe M is lined with a liner L. Suitably, the locating elements 240 are positioned in the durable section 212B of the plug body 212, spaced apart from the removable shaft section 212A, so that the locating elements remain connected to the lined pipe M as part of the plug remnant 210R after the removable section 212A is removed. In the illustrated embodiment, the durable flange section 212B has a generally annular volume and the locating elements 240 are positioned within the boundaries of the annular volume.

The locating elements 240 can be configured to transmit and/or receive various types of locating signals without departing from the scope of the invention. Thus, in one or more embodiments, the locating elements function as sensors that are configured to detect a locating signal transmitted by a robot (e.g., RFID elements). In the illustrated embodiment, however, the locating elements 240 comprise beacons or signal generators that are configured to transmit a locating signal that can be detected by the robot 12 to guide the robot into operative alignment with the corporation stop C. In an exemplary embodiment, the locating elements 240 comprise magnets that are configured to generate a magnetic field that functions as the locating signal.

Figure 22:
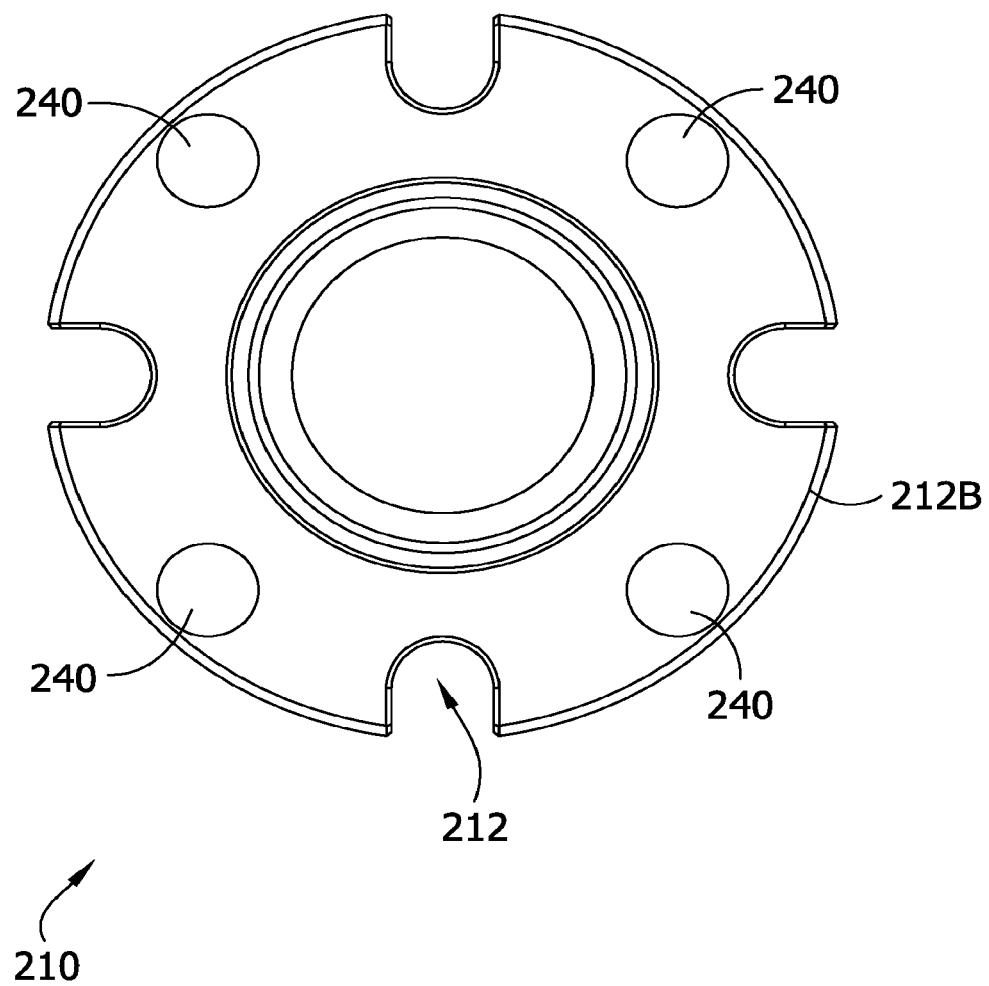
FIG. 22 is an inner end plan view of the plug.

Suitably, the plug 210 comprises one or more magnets 240 that are arranged so that the magnetic field is centered relative to the plug. Moreover, the magnetic field produced by the magnets 240 should be sufficiently strong so that it is detectable over the earth's magnetic field, ferrous materials in the plumbing system, and other magnetic transients. Referring to FIG. 22, in one or more embodiments, the plug 210 comprises a plurality of (e.g., 4) magnets 240 that are positioned in the flange section 212B at equally spaced positions about the center axis PLA of the plug. In certain embodiments, the magnets 240 each have the same polar orientation on the plug. For example, the north pole of each magnet 240 can face outward toward the outer end of the plug 210 and the south pole of each magnet can face inward toward the inner end of the plug (e.g., the north-south axis of the magnets 240 can be parallel to the axis PLA of the plug). In combination, the spaced magnets 240 generate a magnetic field that is centered on the center of the plug 210. Moreover, after the plug 210 is installed in a corporation stop C the magnetic field is centered on the center axis of the corporation stop (which is coaxial with the plug axis PLA), which allows a robotic tools 22, 24 to be aligned with the corporation stop C using the magnetic field. Although the illustrated embodiment, uses a plurality of spaced apart magnets 240 to generate the centered magnetic field, other embodiments can use other magnet arrangements. For example, it is contemplated that a single ring magnet (not shown) could be is centered about the center of the plug body and extend circumferentially about a shaft section within a flange section.

IV. Robot Tractor and Tool Positioning Mechanism

Figure 23:
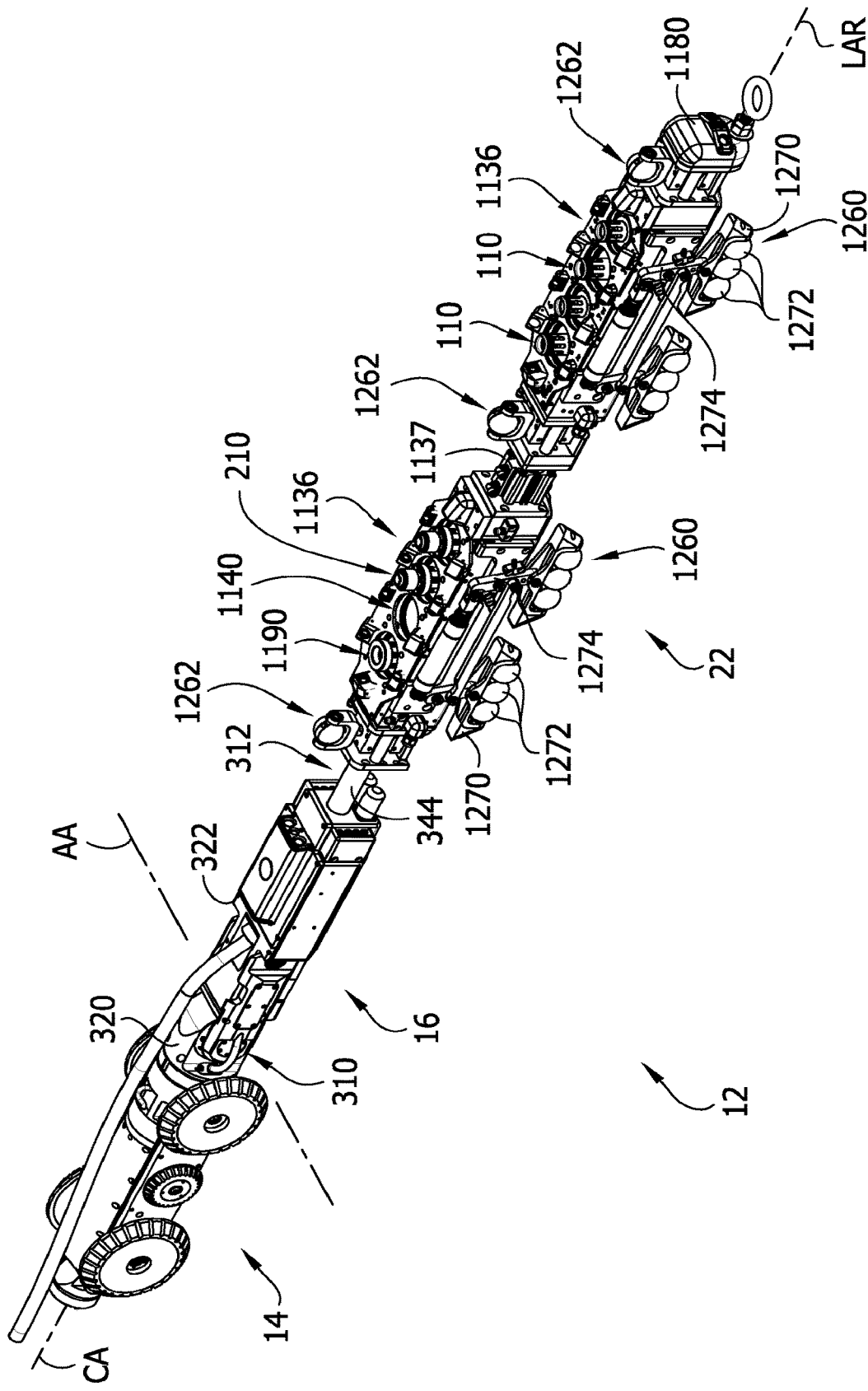
FIG. 23 is a perspective of the robot with a fitting installation tool attached.

Referring to FIG. 23, the robot 12 will now be described in greater detail. The robot 12 comprises the tractor 14 (broadly, a carriage), which is configured for being received in the main pipe M for movement along the main pipe. The tractor 14 generally comprises a front end portion (broadly, a first end portion) and a rear end portion (broadly, a second end portion) spaced apart along a tractor axis CA. The illustrated tractor 14 comprises a frame and wheels mounted on the frame for rolling along the interior surface of the main pipe M (which, during the steps of the pipe rehabilitation process shown schematically in FIGS. 5 and 6 is defined by the liner L; whereas during the steps shown schematically in FIGS. 3 and 4 is defined by the bare surface of the main pipe). Suitably, the tractor 12 comprises an onboard driver (e.g., a motor; not shown) that is configured to drive rotation of the wheels and thereby drive movement of the robot 12 along the main pipe M. It is also contemplated that the tractor could be rolled along the main pipe M using a pull cable that is pulled from an access point external to the main pipe, in certain embodiments.

The tool positioning mechanism 16 is mounted on the front end portion of the tractor 14 for positioning any tool 20, 22, 24 in the robotic tool set 18 with respect to the tractor. In FIG. 23, the fitting installation tool 22 is shown connected to the tool positioning mechanism 16. The tool positioning mechanism 16 is configured to adjust a position of any attached tool 20, 22, 24 with respect to the tractor 14. Referring to FIGS. 2 and 3, in one or more embodiments, the tool positioning mechanism 16 is configured to adjust the angular position of the attached tool 20, 22, 24 with respect to an axis AM of the main pipe M. In certain embodiments, the tool positioning mechanism 16 can also adjust a radial position of the attached tool 20, 22, 24 with respect to the axis AM of the main pipe and/or adjust a pitch of the tool with respect to the tractor 14 (wherein the pitch of the tool is an included angle between the front-to-back axis of the tool and the tractor axis CA). Furthermore, the tool positioning mechanism 16 is configured to allow the attached tool 20, 22, 24 to move freely relative to the tractor 14 in a limited range of motion so that the tool can follow bends and curves in the pipe M as the tractor 14 drives the tool along the pipe. As will be explained in further detail below, the tool positioning mechanism 16 allows the robot 12 to move the connected tool 20, 22, 24 inside the main pipe M to operatively align the tool for performing a respective operation at each corporation stop C.

Various tool positioning mechanisms can be used without departing the scope of the invention. In the illustrated embodiment, the tool positioning mechanism 16 comprises an active drive linkage 310 and a passive positioning linkage 312. The active drive linkage 310 comprises a rotor 320 connected to the front end portion of the tractor 14. A driver (e.g., a motor; not shown) is configured to drive rotation of the rotor 320 about the tractor axis CA. As will be explained in further detail below, the active and passive linkages 310, 312 connect a selected tool 20, 22, 24 to the rotor 320 such that the tool rotates about an axis in response to the rotor 320 being rotated about the tractor axis CA. This rotation of the attached tool 20, 22, 24 changes the angular orientation of the tool with respect to the axis AM of the main pipe.

The active drive linkage 310 further comprises a pivot arm 322 connected to the rotor 320 for rotation with respect to the rotor about a pivot axis AA. A driver (e.g., a motor; not shown) is configured to selectively drive rotation of the pivot arm 322 with respect to the rotor 320 to adjust the pitch of the pivot arm with respect to the tractor 14. Adjusting the pitch of the pivot arm 322 can, in certain circumstances, adjust the pitch of the attached tool 20, 22, 24 and/or adjust the radial position of the tool with respect to the axis AM of the main pipe M. In some circumstances, attached tool 20, 22, 24 does not move conjointly about the pivot axis AA with the pivot arm 322 because the passive drive linkage 312 allows the arm to pivot without pivoting the tool. Thus, when fine control over the pitch of a tool is required, the tool can be attached directly to the pivot arm 322 without using the passive drive linkage 312.

In the illustrated embodiment the pivot arm 322 has a length that is greater than the length of the tractor 14 along the tractor axis CA. The pivot arm 322 allows various control devices such as one or more sensors (e.g., a camera), one or more pneumatic control valves (broadly, an input device), and/or the vacuum source 38 (FIG. 2) to be supported on the pivot arm. This way, as the pivot arm 322 moves relative to the tractor 314 to adjust the position of the attached tool 20, 22, 24, these control devices move with it. Thus, the movement of the control devices located on the pivot arm 322 has a degree of correspondence with the attached tool 20, 22, 24. This minimizes the range of motion that must be accommodated by the hoses and cables that connect the control devices to the tools 20, 22, 24.

Thus, it can be seen that the active drive linkage 310 can actively position the tools 20, 22, 24 with respect to the tractor and provides two degrees of freedom between the tractor and the attached tool: a first degree of freedom in rotation about the tractor axis CA and a second degree of freedom in rotation about the pivot axis AA. Movement with respect to the two degrees of freedom provided by the active drive linkage 310 must be actuated by one or more drivers, typically controlled by the control processor 42.

Figure 24:
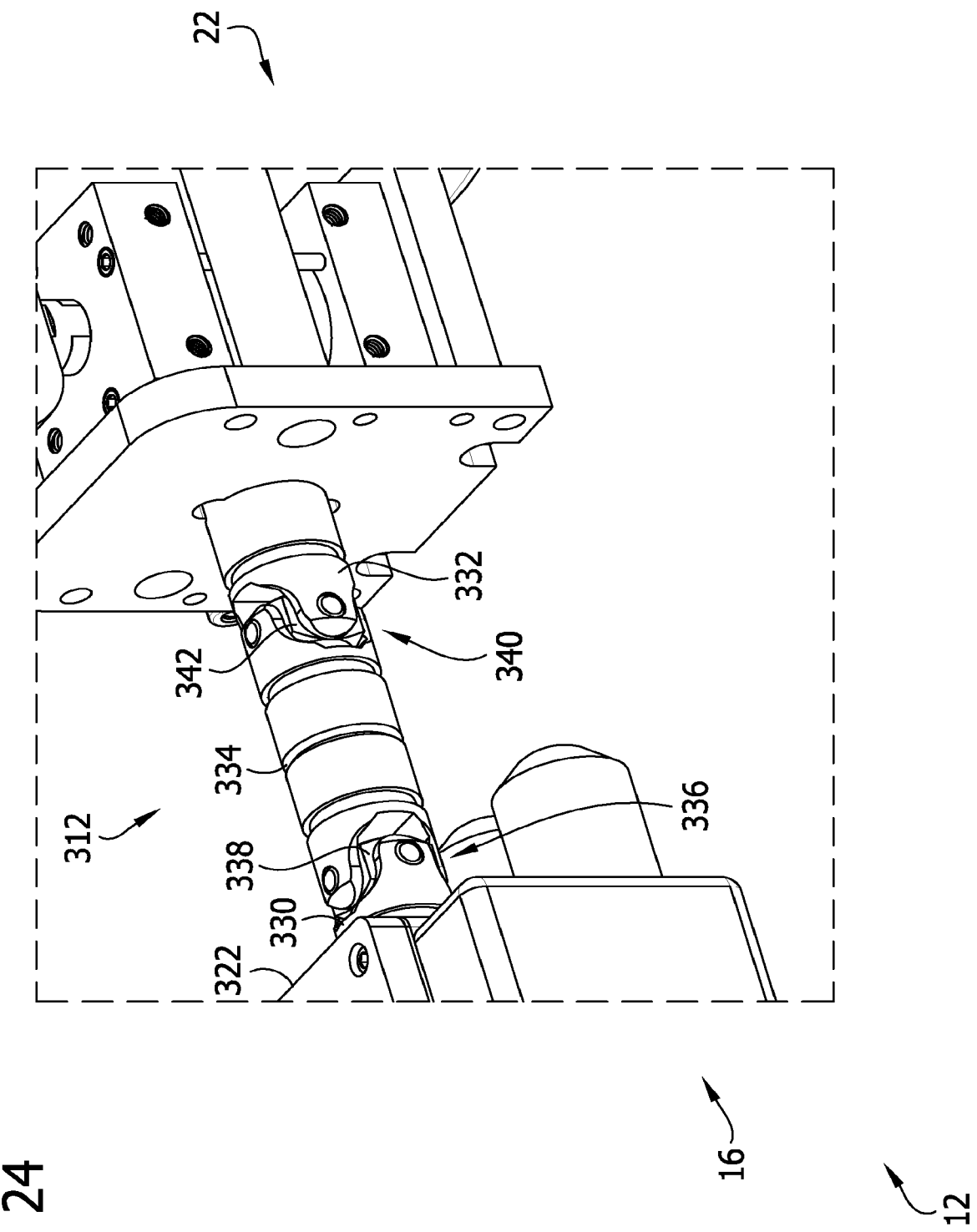
FIG. 24 is an enlarged perspective of a portion of the robot as shown in FIG. 23 that includes a passive linkage connecting a tractor of the robot to the fitting installation tool, wherein a containment sleeve of the robot has been removed.
Figure 25:
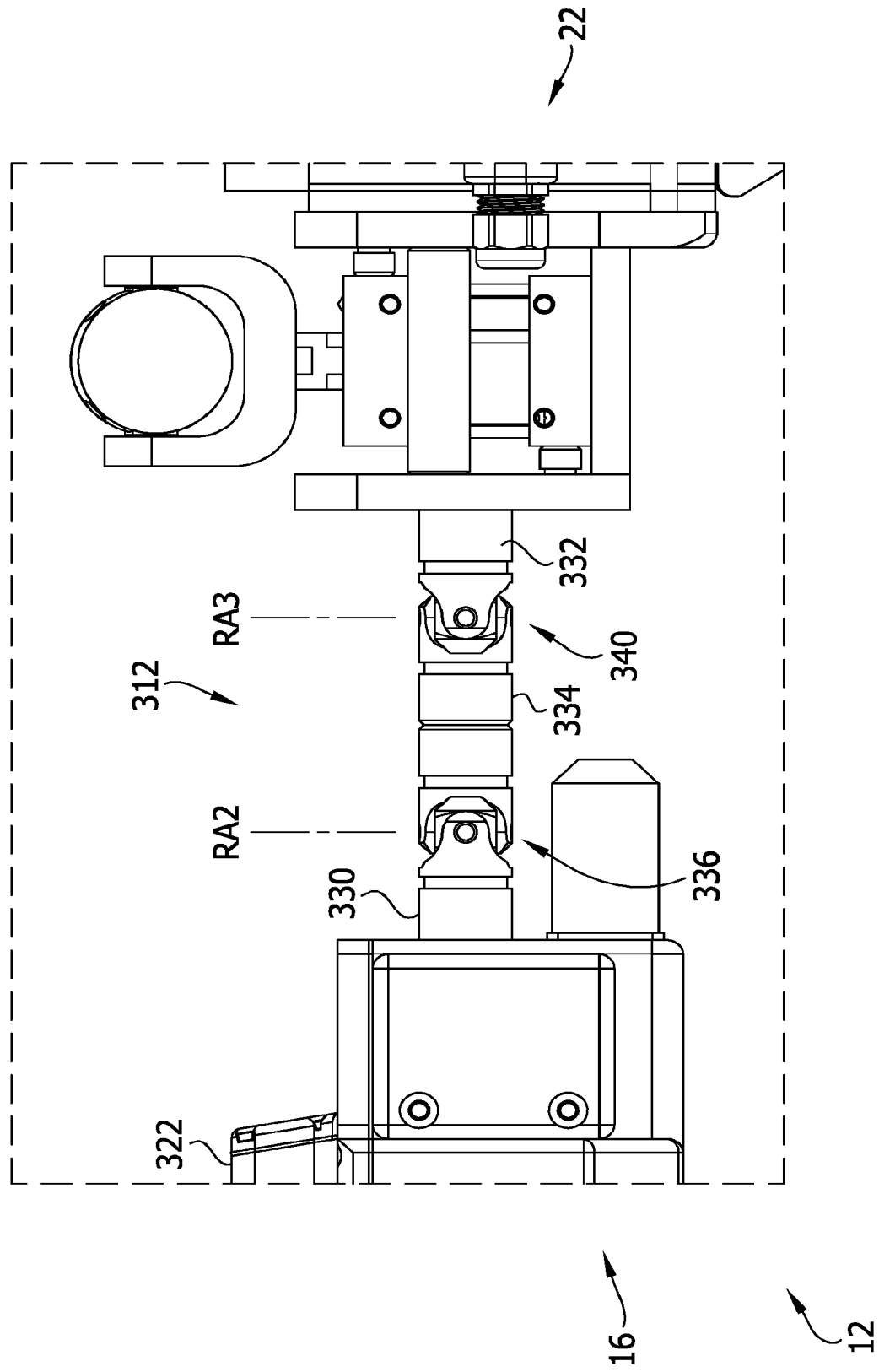
FIG. 25 an elevation of the portion of the robot shown in FIG. 24.
Figure 26:
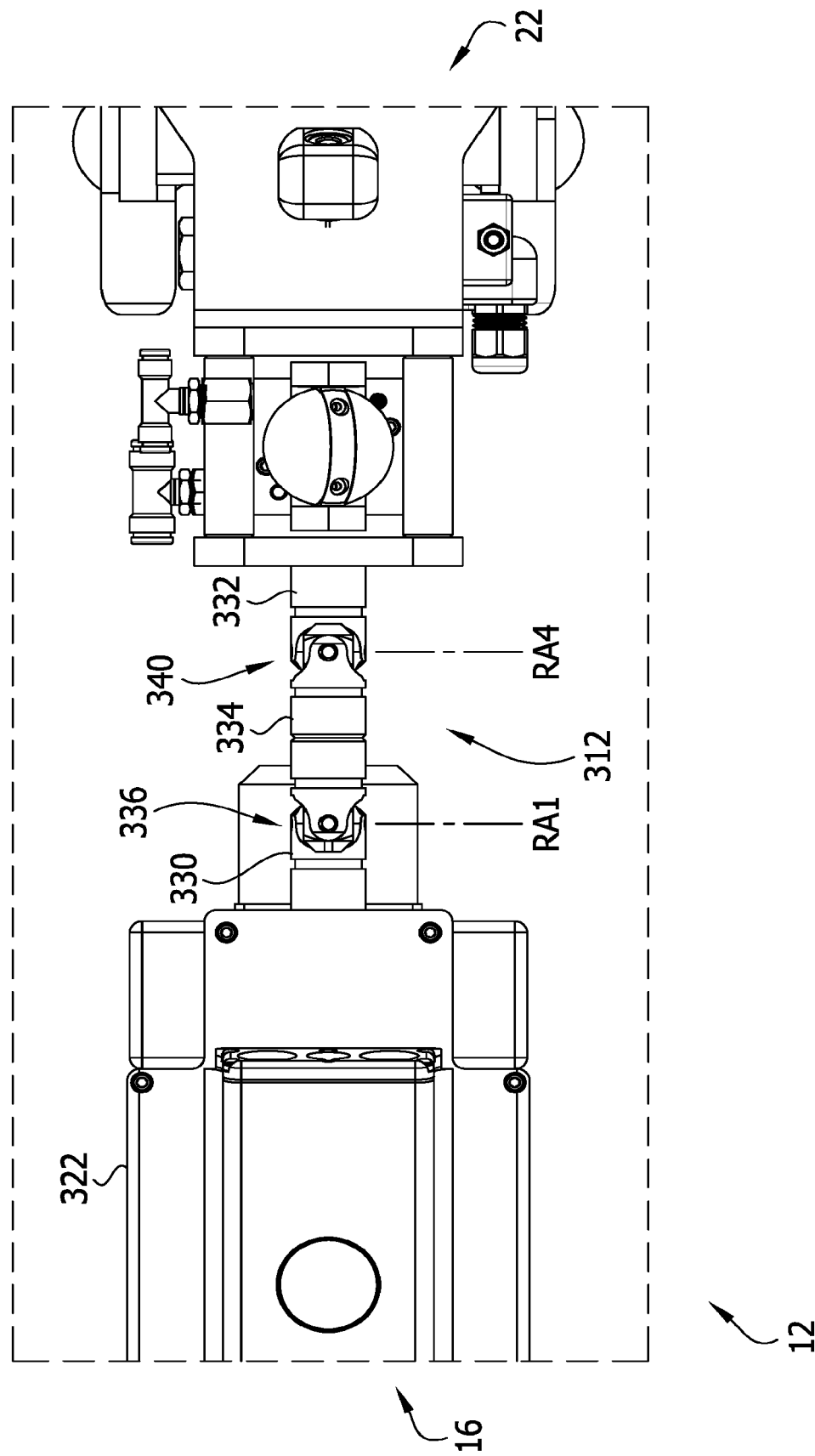
FIG. 26 is a top plan view of the portion of the robot shown in FIG. 24.

Referring to FIGS. 24-26, the passive linkage 312 is generally configured to provide several additional degrees of freedom (e.g., at least three degrees of freedom) between the tractor 14 and the attached tool 20, 22, 24. However, unlike the active drive linkage 310, the passive positioning linkage 312 does not require actuation. Rather, the passive linkage 312 allows the attached tool 20, 22, 24 to move passively with respect to the tractor 14 as the tractor drives the tool along the main pipe M. In the illustrated embodiment, the passive linkage 312 is configured to provide a tool 20, 22, 24 with four rotational degrees of freedom with respect to the tractor 14. However, it will be understood that linkages of other configurations can be provided in one or more embodiments. It can be seen that, In one or more embodiments, the tool positioning mechanism 16, including the active drive linkage 310 and the passive linkage 312, provides at least four degrees of freedom between the tractor 14 and the attached tool 20, 22, 24 (e.g., at least five degrees of freedom, at least six degrees of freedom).

In the illustrated embodiment, the passive linkage 312 comprises a double universal joint linkage. The double universal joint linkage 312 comprises an input shaft 330, an output shaft 332, and a link member 334 connecting the input shaft to the output shaft. The input shaft 330 is connected to the pivot arm 322 such that the input shaft moves conjointly with the pivot arm as the pivot arm rotates about the tractor axis CA. Thus the input shaft 330 functions as a mechanical input (e.g., drive shaft) for the passive linkage 312 because it conveys the motion imparted by the drive motor(s) to the passive linkage.

The input shaft 330 is connected to a first end portion of the link member 334 by a first universal joint 336. Thus, the end portion of the input shaft 330 comprises a yoke that is connected to a first joint member 338 (FIG. 24) for rotation with respect to the first joint member in a limited range of motion about a first rotational axis RA1 (FIG. 26). Similarly, the first end portion of the link member 334 is connected to the first joint member 338 for rotation with respect to the first joint member in a limited range of motion about a second rotational axis RA2 (FIG. 25) oriented transverse (e.g., substantially perpendicular) to the first rotational axis RA1.

Similarly, the second end portion of the link member 334 is connected to the output shaft 332 by a second universal joint 340. Thus, the second end portion of the link member 334 comprises a yoke that is connected to a second joint member 342 (FIG. 24) for rotation with respect to the second joint member in a limited range of motion about a third rotational axis RA3 (FIG. 25). Likewise, the adjacent end portion of the output shaft 332 is connected to the second joint member 342 for rotation with respect to the second joint member 342 in a limited range of motion about a fourth rotational axis RA4 (FIG. 26) oriented transverse (e.g., substantially perpendicular) to the third rotational axis RA3. Suitably the free end portion of the output shaft 332 comprises an integral coupling (e.g., a key, a hitch, a yoke, etc.) for removably attaching each of the pipe rehabilitation tools 20, 22, 24 to the output shaft for generally conjoint movement with the output shaft. Thus, it can be seen that the double universal joint linkage 312 provides the attached tool 20, 22, 24 with a respective degree of freedom about each of the four rotational axes RA1, RA2, RA3, RA4.

The range of motion provided by the passive double universal joint linkage 312 facilitates navigating the robot 12 through bends and curves along the main pipe. As will be explained in further detail below in Sections VI and VII, in certain embodiments, one or more of the pipe rehabilitation tools can be braced against the pipe M so that it rolls along the pipe. As the tractor 14 drives the robot 12 along a bend in the main pipe M, the linkage 312 allows the tool to follow the curvature of the bend even though the tractor is not located along the bend.

Moreover, even when the robot 12 is situated at a bend, the double universal joint linkage 312 is generally configured to convey rotation of the rotor 320 about the tractor axis CA to the connected tool 20, 22, 24 to adjust the angular orientation of the tool about the axis AM of the main pipe M. The input shaft and the output shaft of a double universal joint linkage can be offset from one another such that their axes are non-coaxial or non-parallel and rotation of the input shaft about its axis is still conveyed to the output shaft such that the output shaft rotates about its axis at the same rate of angular rotation as the input shaft. In the illustrated embodiment, the input shaft 330 generally rotates about its axis as the rotor 320 rotates about the tractor axis CA. Accordingly, the rotation of the rotor 320 rotates the input shaft 330 about its axis and thereby causes the output shaft 332 to rotate about its axis by the same amount, regardless of how the output shaft is oriented with respect to the input shaft within the range of motion of the double universal joint linkage 312. Since the connected tool 20, 22, 24 rotates conjointly with the output shaft 332, rotation of the output shaft (driven by rotation of the rotor 320 and the input shaft 330) adjusts the angular orientation of the tool with respect to the main pipe axis AM.

Referring to FIG. 23, in the illustrated embodiment, the tool positioning mechanism 16 comprises a containment sleeve 344 positioned over the double universal joint linkage 312. The containment sleeve 344 is configured to constrain relative motion between the input shaft 330, the link member 334, and the output shaft 332 at the universal joints 336, 340. In one or more embodiments, the containment sleeve 344 is only somewhat flexible. During use, the relatively rigid containment sleeve 344 constrains the double universal joint linkage 312 to prevent the link member 334 from over-rotating about the rotational axes RA1, RA2 with respect to the input shaft 330 and to prevent the output shaft 332 from over-rotating about the rotational axes RA3, RA2 with respect to the link member.

In one or more embodiments, the controller 42 is configured to actuate the drive mechanism of the tractor 14 to move the robot 12 along the main pipe M. In addition, the controller 42 is configured to actuate one or more drivers (not shown) of the positioning mechanism 16 to move the attached tool 20, 22, 24 relative to the tractor 14, for example, to adjust the angular orientation of the tool with respect to the axis AM of the main pipe. The robot 12 can be configured to provide various feedback information to the technician and/or controller 42 about the position of the attached tool 20, 22, 24 within the main pipe (e.g., the position of the attached tool with respect to a corporation stop C). For example, as will be described in further detail below, each tool 20, 22, 24 can comprise a visualization system that captures images of the interior of the main pipe M that are displayed to the technician in real time. In addition, after the plugs 210 have been installed in the corporation stops C, the plug removal tool 24 and the fitting installation tool 22 are each also configured to detect the magnetic fields produced by the locating elements 240, which provides additional feedback of the location of the robot with respect to the corporation stops. Furthermore, the measurement probe 20 can provide stored information about the positions of the corporation stops C (e.g., a mapping) that can be used when positioning the plug removal tool 24 and the fitting installation tool 22. Either the technician or the controller 42 can process the information from one or more of these sources and, based on the information, actuate the drivers to drive movement of the tractor 14 and movement of the tool positioning mechanism 16 to align the attached tool 20, 22, 24 with a corporation stop C for performing a specified operation on the corporation stop.

V. Measurement Probe

Figure 27:
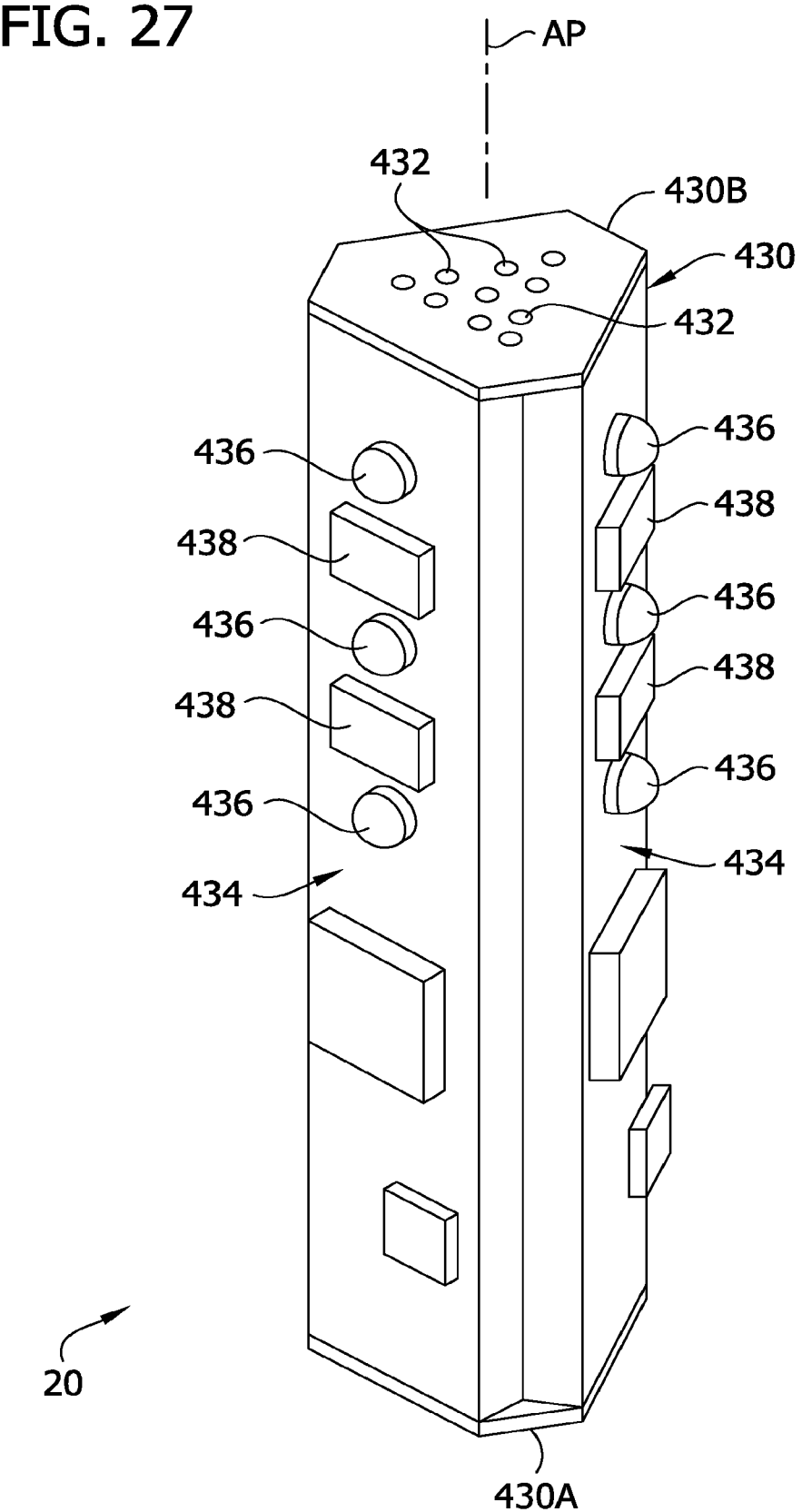
FIG. 27 is a perspective of a measurement probe.

Referring to FIG. 27, the measurement probe 20 comprises a probe body 430 configured to be mounted on the tool positioning mechanism 16 so that the probe can move through the interior of the main pipe M. As will be described in further detail below, the robot 12 is configured to move the probe 20 so that it can be at least partially received in each corporation stop C from inside the main pipe M. The probe 20 generally comprises at least one sensor supported on the probe body 430 that is configured to generate one or more measurement signals related to the corporation stop C when the probe is aligned with the corporation stop. The probe 20 is operatively connected to the processor 42 (e.g., via the umbilical 30) for transmitting the measurement signals to the processor. As will be explained in further detail below, the processor 42 is configured to determine based on the one or more measurement signals at least one of an internal dimension ID (e.g., inner diameter) of the corporation stop C, an angular position of the corporation stop about an axis AM of the main pipe M, and an orientation of an axis AC of the corporation stop (see FIGS. 28 and 29).

In general, the probe body 430 has an elongate shape and a relatively small cross-sectional size so that at least a portion of the probe 20 can be inserted into a corporation stop C. The probe body 430 has a length extending along an axis AP from a proximal end portion 430A to a distal end portion 430B. In the illustrated embodiment, the probe body 430 has a generally triangular cross-sectional shape including three longitudinally extending sides that are spaced apart about a perimeter of the probe body. In other embodiments, the probe body can have other cross-sectional shapes (e.g., have more than three segmented sides, have a curved cross-sectional shape, etc.).

In the illustrated embodiment, the probe 20 comprises three types of sensors. A camera (not shown) is received in the interior of the probe body to capture images inside the main pipe M through openings 432 in the distal end portion 430B. An inclinometer (not shown) is located in the interior of the probe body 430 to generate a probe angle signal indicative of an angular orientation of the probe body. For example, the probe angle signal can represent the angular orientation of a probe body axis AP with respect to the axis AM of the main pipe M. Suitably, probe 20 further comprises at least one proximity sensor 434 configured to generate a proximity signal representative of a distance between the corporation stop and a portion of the probe body 430. It will be understood that a probe can have other sensors without departing from the scope of the invention.

In the illustrated embodiment, the probe 20 comprises one proximity sensor 434 on each side of the probe body 430. (The proximity sensor 434 on the rear side of the probe body 430 is not visible in FIG. 27, but in one or more embodiments it is substantially identical to the two visible proximity sensors.) Hence, the illustrated probe 20 comprises three proximity sensors 434 angularly spaced apart from one another about the axis AP of the probe body 430 by about 120°. In one or more embodiments, each proximity sensor 434 comprises an electronic circuit board mounted on the respective side of the probe body 430. Each proximity sensor suitably comprises at least one emitter 436 configured to emit electromagnetic radiation and at least one detector 438 configured to detect the emitted electromagnetic radiation. For example, each detector 438 is configured to detect the electromagnetic radiation emitted from the emitter 436 after it interacts with (e.g., reflects off of) a surface of the corporation stop C. Each detector 438 is configured to generate a point signal representative of the detected electromagnetic radiation at the location of the detector. In the illustrated embodiment, each emitter 436 comprises a laser generator. In other embodiments, other types of emitters can be used.

In one or more embodiments, each proximity sensor 434 comprises a plurality of emitters 436 and a plurality of detectors 438. In the illustrated embodiment, each proximity sensor comprises three emitters 436 spaced apart along the axis AP of the probe 20 and two detectors 438 spaced apart along the axis of the probe between the emitters. Other proximity sensors can have other arrangements of emitters and detectors. In one or more embodiments, the proximity signal generated by each proximity sensor 434 comprises the discrete point signals of each detector 438. In certain embodiments, the proximity sensor includes onboard circuitry that combines the point signals to generate a combined proximity signal that is transmitted to the processor in addition to or instead of the discrete point signals.

Figure 28:
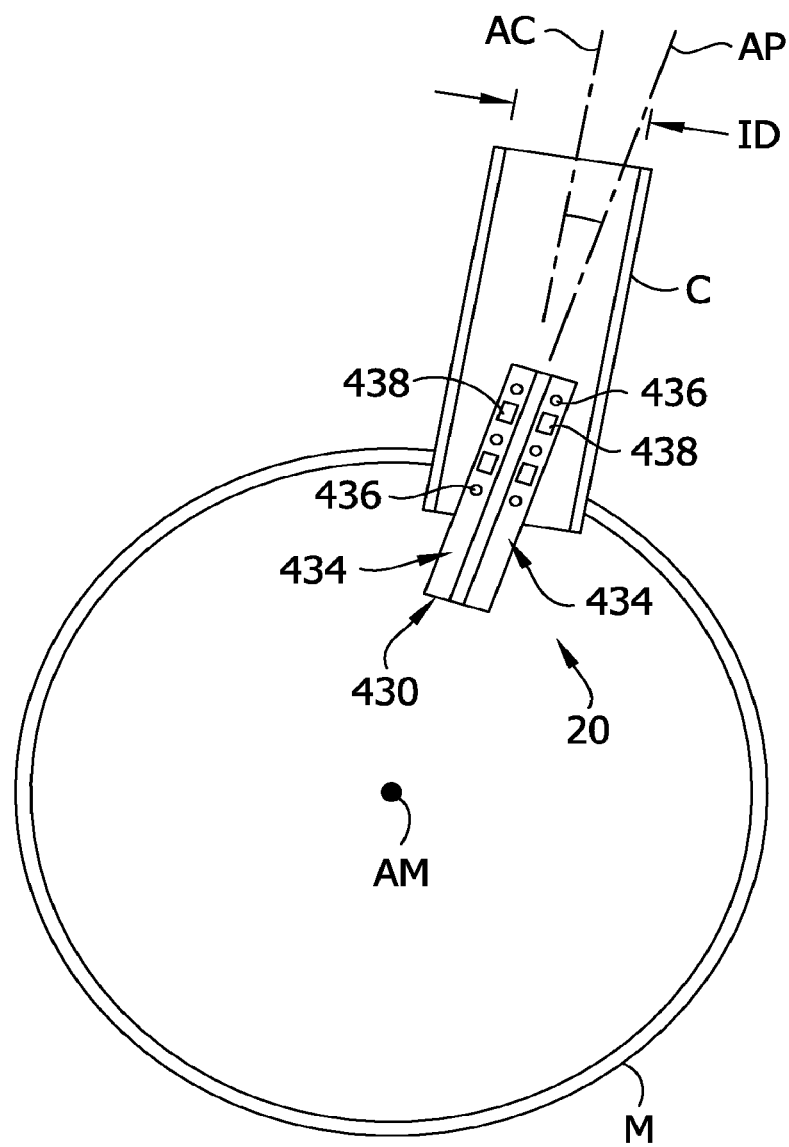
FIG. 28 is a schematic cross section through a radial plane of the main pipe showing the measurement probe inserted into the corporation stop.
Figure 29:
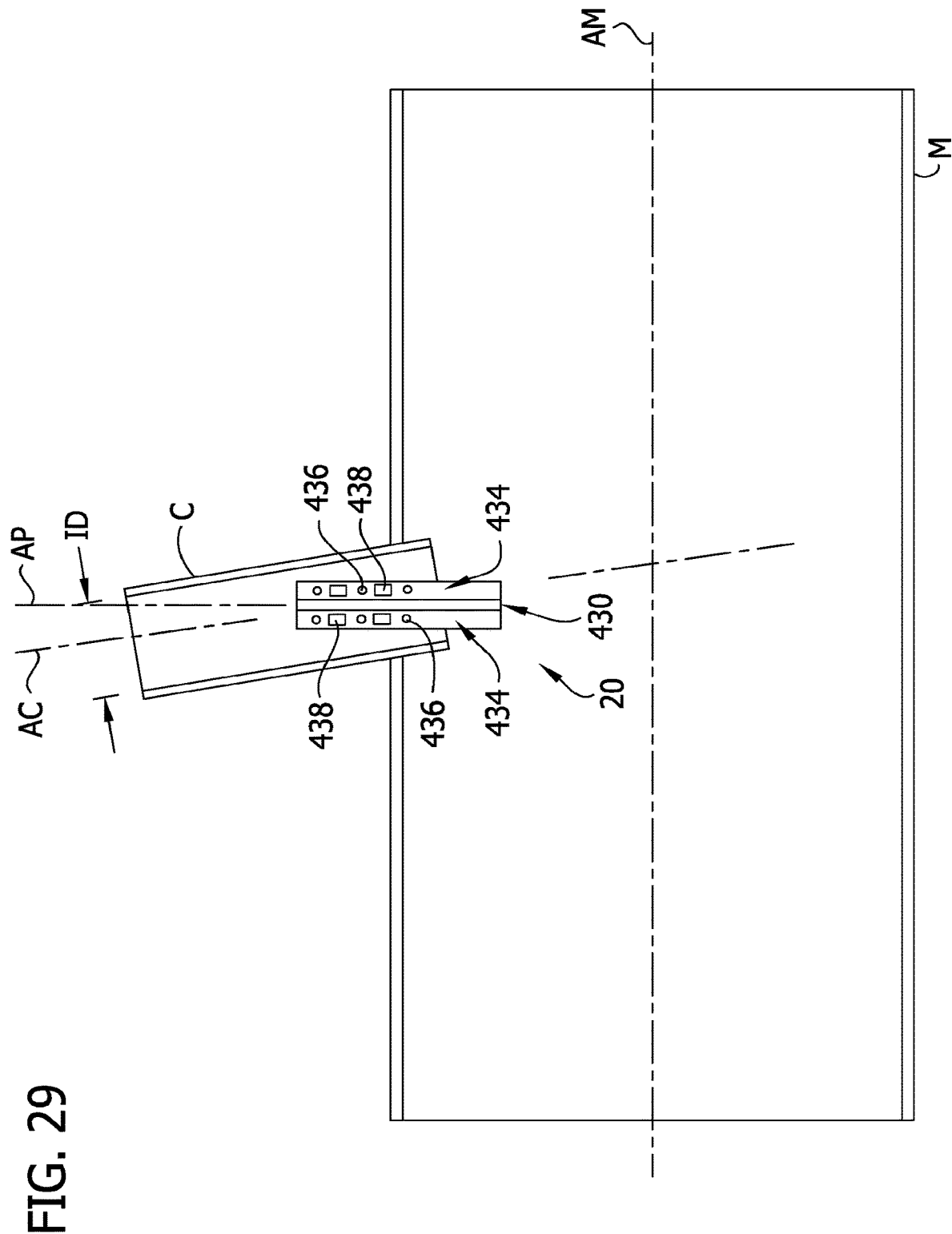
FIG. 29 is a schematic cross section through a longitudinal plane of the main pipe showing the measurement probe inserted into the corporation stop.

Referring to FIGS. 28 and 29, the illustrated probe 20 is configured to take measurements of a corporation stop C when the distal end portion 430B of the probe body 430 is robotically inserted into the corporation stop from inside the main pipe. The probe 20 is configured to be robotically moved to a position in which the distal end portion 430B of the probe body 430 is received in the corporation stop C, and then the probe is configured to generate the probe angle signal using the inclinometer, the proximity signals using the proximity sensors 434, and/or the discrete point signals using the detectors 438. More specifically, the laser generators 436 direct lasers toward the interior surface of the corporation stop C and the detectors 438 detect the laser energy that is reflected from the corporation stop and generate corresponding point signals. The strength of each point signal is indicative of the spacing distance between the respective detector 438 and the interior surface of the corporation stop C.

In an exemplary embodiment, as the probe 20 is moved into position, the tool positioning mechanism 16 is configured to maintain the probe in an orientation in which the probe axis AP is oriented substantially radially of (FIG. 28) and perpendicular to (FIG. 29) the main pipe axis AM. As the probe 20 is moved into position, it is also configured to generate images of the corporation stop C using the camera. The images can be displayed to a technician on a display (not shown) and used to evaluate the condition of the corporation stop C. In one or more embodiments, the displayed images are also used as feedback information for navigating the robot 12 to one or more corporation stops C.

In general, the processor 42 is configured to receive the probe angle signal generated by the inclinometer, the proximity signals generated by the proximity sensors 434, and/or the point signals generated by the discrete detectors 438 and use the received signals to determine at least one of an internal dimension ID of the corporation stop C, an angular position of the corporation stop about an axis AM of the main pipe M, and an orientation of an axis AC of the corporation stop. In one or more embodiments, to determine the internal dimension ID of the corporation stop C the processor 42 is configured to triangulate the proximity signals, since each is indicative of the distance between one side of the probe body 430 and an opposing portion of the interior surface of the corporation stop. For example, in one or more embodiments, the processor 42 can evaluate the strength of the proximity signal produced by the proximity sensor 434 on each side of the probe body to determine the spacing distance between the sides of the probe body and the interior surface of the corporation stop C. The processor 42 can use this information to assess the internal dimension ID of the corporation stop C since the cross-sectional size of the probe body 430 is known. In certain embodiments, the processor 42 is configured to determine the angular position of the corporation stop C about the axis AM of the main pipe M based on the probe angle signal generated by the inclinometer. In some embodiments, the processor 42 is configured to determine the orientation of the axis AC of the corporation stop C using a comparison of the discrete point signals.

As shown in FIGS. 28 and 29, in some instances, corporation stops C are connected to a main pipe M in an orientation in which the axis AC is skewed from radial (indicated at AP in FIG. 28) or perpendicular (indicated at AP in FIG. 29) to the main pipe axis AM. As can be seen, the detectors 438 are arranged in a three-dimensional array centered on the probe axis AP. During use, each point signal is indicative of the distance between the respective point in the three-dimensional array and the interior surface of the corporation stop C. An offset between the probe axis AP and the corporation stop axis AC can thus be detected and measured based on differences in the intensities or strengths of the point signals. Moreover, if the orientation of the probe axis AP relative to the main pipe axis AM is known or can be determined (in this case, the probe axis is maintained to be radial of and perpendicular to the main pipe axis), the orientation of the corporation stop axis AC relative to the main pipe axis can be determined.

Referring to FIG. 3, in an exemplary method of using the system 10, the robot 12 is equipped with the probe 20 before a liner is installed in the main pipe P. The robot 12 is placed in the interior of the main pipe M, and the robot either automatically or by user input moves the probe 20 along the main pipe to each corporation stop C. For example, the user or controller uses the images captured by the camera to navigate the robot 12 to each corporation stop. That is, the camera of the probe 20 or another camera of the robot 12 can be used to visually guide the probe 20 into position in one or more embodiments. At each corporation stop C, the tool positioning mechanism 16 either automatically or by user input inserts the distal end portion of the probe 20 into the corporation stop C. As the probe 20 is moved into position the probe camera captures images that can be used to evaluate the condition of the corporation stop C. At each corporation stop C, when the probe 20 is in position, either automatically or by user input, the probe generates measurement signals and the processor 42 uses the measurement signals to determine the internal dimension ID of the corporation stop, the angular position of the corporation stop about the main pipe axis AM, and the orientation of the corporation stop axis AC as explained above. In one or more embodiments, the robot 12 is also configured to measure and record the distance between adjacent corporation stops C along the axis AM of the pipe M. For example, an encoder (not shown) can detect the number of rotations of the wheels of the tractor 14 as the robot moves from one corporation stop C to the next and correlate the number of rotations to the axial distance between the corporation stops.

In one or more embodiments, the determined characteristics of each corporation stop C are used in subsequent steps of the pipe rehabilitation process, described generally above. For example, the determined internal dimension ID is used to select the size of plugs 210 for sealing the corporation stop C before lining in one or more embodiments. In one or more embodiments, the determined internal dimension ID is used to select the size of the opening that is formed in the liner L by a liner removal tool 24 to restore fluid communication between the corporation stop C and the lined main pipe M. In certain embodiments, the determined internal dimension ID is used to select the size of fitting 110 for connecting the corporation stop C to the liner L. One or both of the determined corporation stop angular position and the determined corporation stop orientation can be used to operatively position or align a robot for any of: installing a plug, forming an opening in a liner L, and installing a fitting to connect the corporation stop C to the liner.

VI. Plug Removal Tool

Referring to FIGS. 30-33, certain aspects of the plug removal tool 24 will now be described in greater detail. In general, the plug removal tool 24 comprises a frame 1012 (broadly, a tool body or base) and a removal mechanism 1022 mounted on the frame that is configured to remove a removable section 212A of the plug 210 from the corporation stop C. Suitably, the frame 1012 is configured to be attached to the tool positioning mechanism 16 so that the tool positioning mechanism can adjust the angular orientation of the plug removal tool 24 with respect to the axis AM of the main pipe M as explained above in Section IV.

In the illustrated embodiment, the removal mechanism 1022 comprises a drill or boring device (broadly, a rotational device). Other removal mechanisms can be used in other embodiments. The drill 1022 comprises a rotatable bit 1024 having an axis BA and a diameter that is about the same as or somewhat less than the diameter of the shaft section 212A of the plug. In certain embodiments, the removal mechanism can comprise an undersized router bit that can be moved in directions transverse to its longitudinal axis to form an enlarged opening of the desired size (e.g., an enlarged opening of the diameter that is about the same as the diameter of the shaft section of the plug). It will be understood that using an undersized router permits removal of plugs of different diameters without changing the bit. The axis BA is oriented radially of the main pipe axis AM when the tool 24 is received in the pipe M. The plug removal tool 24 further comprises an actuator 1026 that is configured to move the bit 1024 generally along the axis BA as the drill 1022 rotates the bit about the axis. Various types of actuators can be used to move the bit 1024 generally along the axis BA. In one more embodiments, the actuator can comprises a linkage mechanism (e.g., a four-bar linkage); in certain embodiments, the actuator can comprise a linear screw mechanism. Other types of actuators can also be used in one or more embodiments.

In use, after a main pipe M is lined with a liner, the illustrated plug removal tool 24 is configured to remove only the removable section 212A of a plug 212. Once the tool 24 is operatively aligned with a plug 210, the linear actuator 1026 extends the bit 1024 as the drill 1022 rotates the bit. The bit 1024 forms a hole through the shaft section 212A of the plug 210 and an overlapping portion of the liner L. The plug removal tool 24 thus removes the removable plug body section 212A without removing the durable plug body section 212B. The hole that is formed restores fluid communication between the corporation stop C and the main pipe M after lining.

In certain embodiments, the drill bit 1024 can be used to remove a first portion of the removable shaft section 212A and then the drill bit can be replaced with a more compliant working element for removing remaining portions of the removable section. For example, in one or more embodiments, after removing first portions of each of the removable shaft sections 212A of the plugs 210, the robot 12 is retrieved and the drill bit 1024 is replaced with a wire brush bit (not shown). The robot 12 is then returned to the main pipe M and the drill 1022 uses the wire brush bit to remove remaining portions of at least some of the removable shaft sections 212A. It may be desirable to use a more compliant working element such as a wire brush bit to remove the portions of the removable shaft section 212A located immediately adjacent to the corporation stop C to minimize the risk of damaging the corporation stop.

In addition to the plug removal mechanism 1022, the plug removal tool 24 comprises a locating assembly 1030 that includes one or more plug locating elements 1032 that are configured to communicate with the locating elements 240 of the plugs 210. In the illustrated embodiment, the locating elements 1032 are mounted on a potted circuit board 1031 that is connected to the frame 1012 such that the locating elements move conjointly with the frame with respect to the main pipe M.

In general, the locating elements 1032 are configured to communicate with the plug locating elements 240 via a locating signal. As explained above in Section III, the illustrated plug locating elements 240 comprise magnets that are configured to generate a magnetic field that is centered with respect to the plug 210 and the corporation stop C in which the plug is installed. Thus, in one or more embodiments, the tool locating elements 1032 comprise magnetic field sensors (e.g., Hall Effect sensors, magneto-resistive sensors, etc.) that are configured to sense the strength of the magnetic field produced by the magnets. In certain embodiments, the magnetic field sensors 1032 are also configured to detect a direction of the magnetic field. In other embodiments, the tool locating elements comprise sensors configured to detect another type of signal produced by a plug locating element. In still other embodiments, the locating elements on the tool comprise signal generating devices (e.g., magnets) configured to generate signals detected by the locating elements in the plug.

Figure 33:
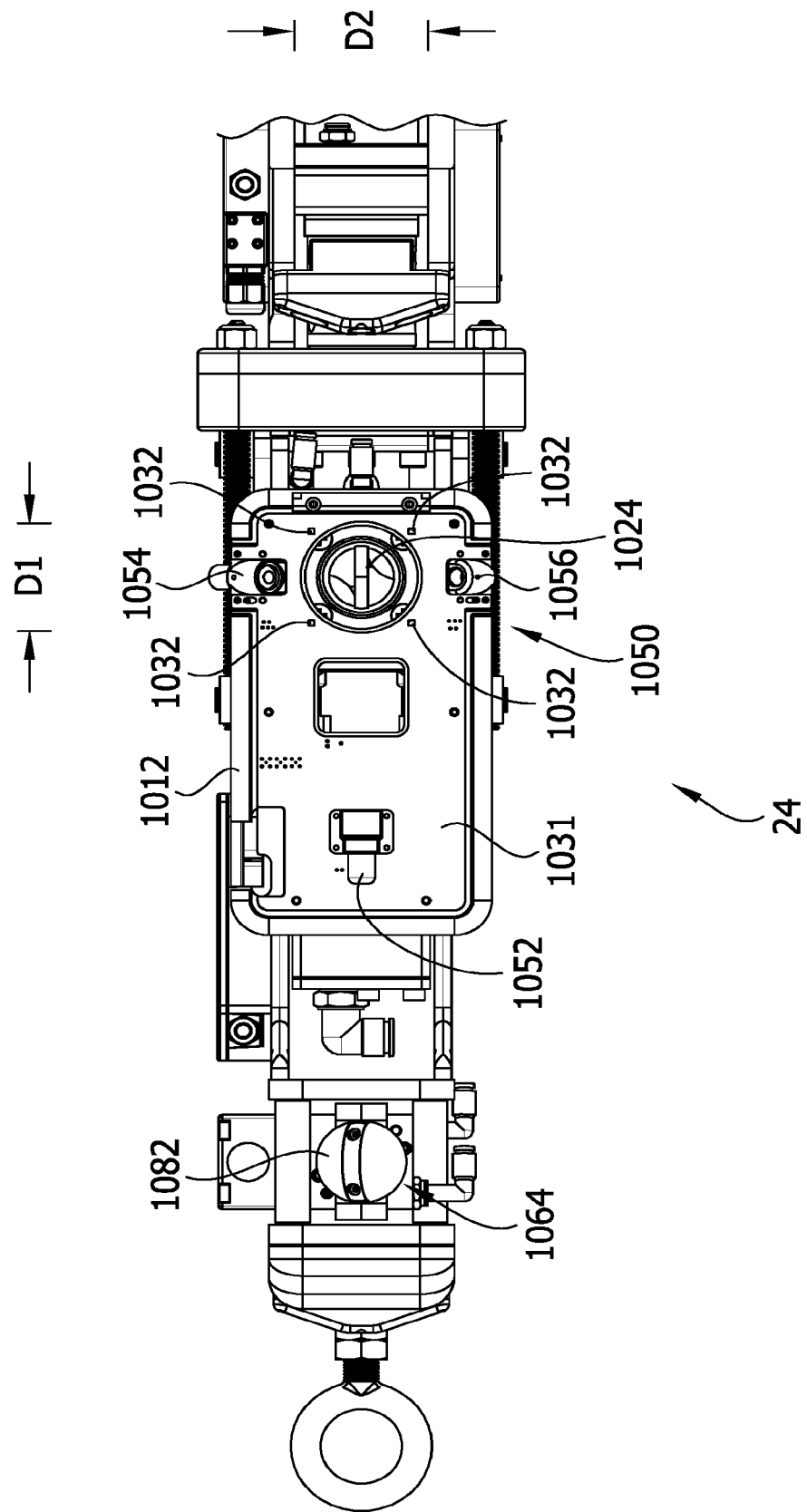
FIG. 33 is a fragmentary top plan view showing the portion of the plug removal tool.

In the illustrated embodiment, the tool locating assembly 1030 comprises a plurality of magnetic field sensors 1032 that are mounted on the circuit board 1031 at spaced apart locations about the axis BA of the drilling bit 1024 (broadly, about the axis of the working element of the pipe rehabilitation tool). Suitably, the tool locating assembly 1030 comprises at least three magnetic field sensors 1032 (broadly, locating sensors) that are arranged on the tool 24 in a two-dimensional grid that is centered on the axis BA of the drilling bit 1024. As shown in FIG. 33, the grid can have a first dimension D1 that is configured to extend general longitudinally along the axis AM of the main pipe M when the robot 12 is received in the main pipe and a second dimension D2 that is configured to extend generally transverse to the axis of the main pipe (e.g., the second dimension D2 is configured to extend generally perpendicular to the pipe axis) when the robot is received in the main pipe. In the illustrated embodiment, the plug removal tool 24 comprises four locating sensors 1032 arranged at the four corners of a rectangular grid that is centered on the drill bit axis BA. The rectangular grid has a pair of spaced apart sides and a pair of spaced apart ends. When the robot 12 is received in the main pipe M, the sides of the rectangular grid are spaced apart from one another generally angularly about the main pipe axis AM and the ends of the rectangular grid are spaced apart from another generally longitudinally along the main pipe axis.

Using a two dimensional grid of magnetic field sensors 1032 centered on the drill bit axis BA of the plug removal tool 24 facilitates aligning the plug removal tool 24 with a corporation stop C in which a plug 210 is installed. Each of the magnetic field sensors 1032 is configured to generate a discrete signal representative of the strength of the magnetic field detected at the respective sensor. In use, as the robot 12 moves along the main pipe 10, a leading pair of the magnetic field sensors 1032 at one end of the rectangular grid detects the magnetic field of a plug 210 before a trailing pair of magnetic field sensors at the opposite end of the rectangular grid, alerting the controller 42 and/or the user that the robot is approaching a plug. Movement of the robot 12 along the axis AM of the main pipe M can then be controlled (by user input or by an automated control routine) until the strength of the magnetic field detected by the pair of sensors 1032 at each end of the rectangular grid is about the same. It can be determined whether the plug removal tool 24 is angularly aligned with the plug 212 and the corporation stop C by determining whether the magnetic field strength at the pair of sensors on each side of the rectangular grid is about the same. If not, the tool positioning mechanism 16 is adjusted (by user input or by an automated control routine) to adjust the angular orientation of the plug removal tool 24 with respect to the axis AM until the strength of the magnetic field detected by the pair of the sensors 1032 at each side of the rectangular grid is about the same. Accordingly, the tool 24 can be operatively aligned with a corporation stop C based on the magnetic field produced by a plug 210 by driving movement of the tractor 14 along the main pipe axis AM and driving movement of the tool generally about the main pipe axis until a magnitude of the locating signal detected by each of the sensors 1032 in the two-dimensional sensor grid is about the same.

Although the illustrated locating assembly 1030 is used to center a drill 1022 on a corporation stop, it will be appreciated that the same type of locating assembly could be used to align the working axis of other types of pipe rehabilitation tools with the axis CA of a corporation stop C after a plug with integrated locating elements has been installed.

Figure 32:
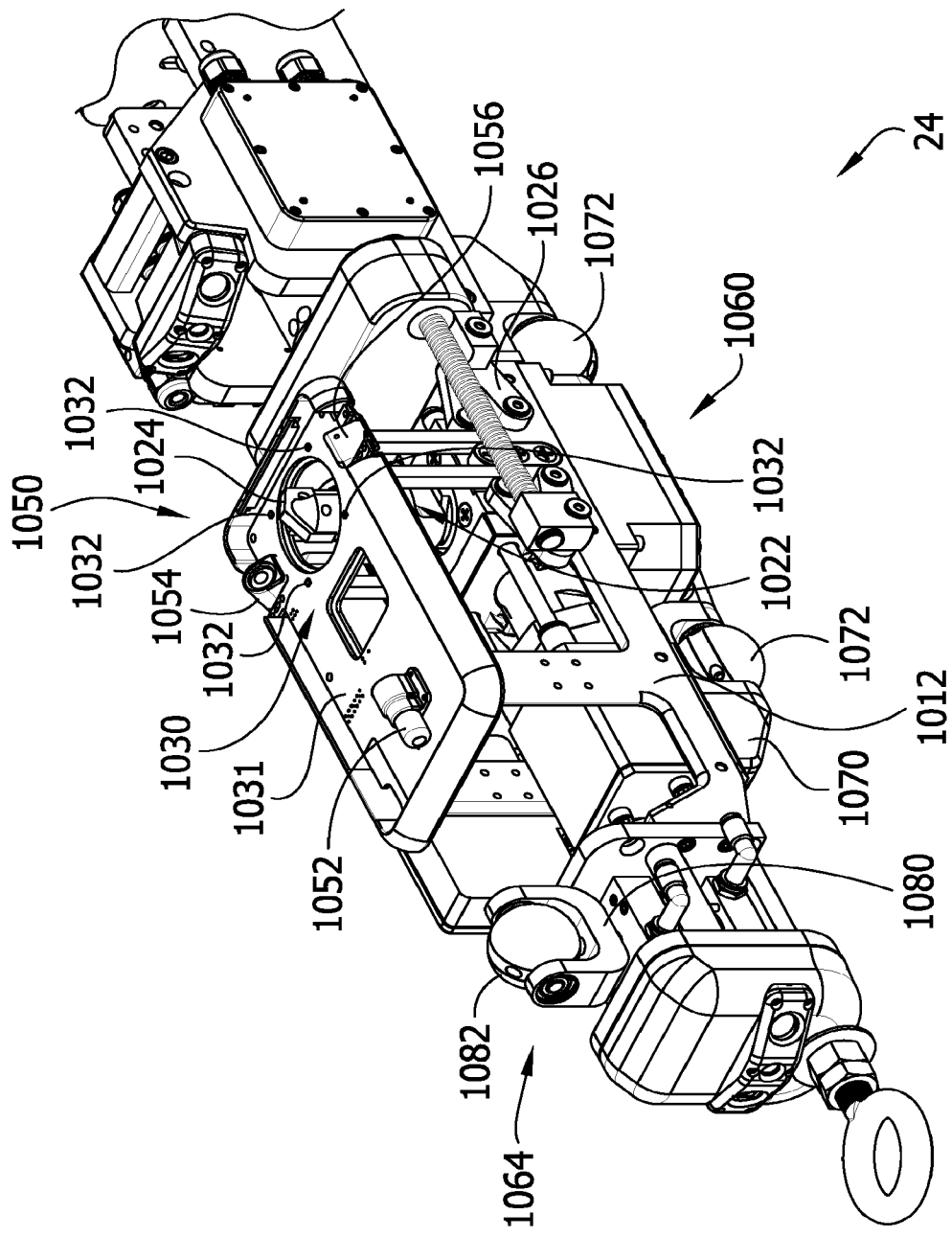
FIG. 32 is a fragmentary perspective showing a portion of the plug removal tool.

Referring to FIGS. 32-33, the illustrated plug removal tool 24 further comprises a pipe visualization system, generally indicated at 1050. The pipe visualization system 1050 comprises a pair of laser generators 1052, 1054 (each, broadly, a projector) configured to project a projected image onto an internal surface of the pipe system and a camera 1056 configured to form a captured image of the internal surface of the pipe system that includes the projected image. In one embodiment, the system 10 is configured to display the captured image on a display at the skid 32 (broadly, a location outside the main pipe) in real time. A technician (or the controller 42 executing an automated control routine) can use the captured image to navigate the robot 12 to each corporation stop during the plug removal process shown schematically in FIG. 5.

Suitably, the visualization system 1050 is generally configured to render the projected image so that it is centered on the axis BA (FIG. 30) of the drill 1022 (broadly, centered on the axis of the working element). The center of the first laser generator and the drill axis BA lie in a first plane. The center of the second laser generator and the drill axis BA lie in a second plane orthogonal to the first plane. Thus, in the illustrated embodiment, the first laser generator 1052 is configured to project a longitudinal line segment (broadly, a first visible line segment) onto the internal surface and the second laser generator 1054 is configured to project a circumferential or transverse line segment (broadly, a second visible line segment) onto the internal surface. The circumferential line segment intersects the longitudinal line segment at an intersection point. In one or more embodiments, the drill axis BA passes through the intersection point between the circumferential line segment and the longitudinal line segment. Thus, the projected image, as it appears in the camera-captured image, shows the location where the drill axis BA will intersect the inner surface of the liner L during use. A technician can therefore use the captured image displayed on the display to ensure proper positioning of the robot 12 and the plug removal tool 24 in the plug removal process shown schematically in FIG. 5.

Figure 30:
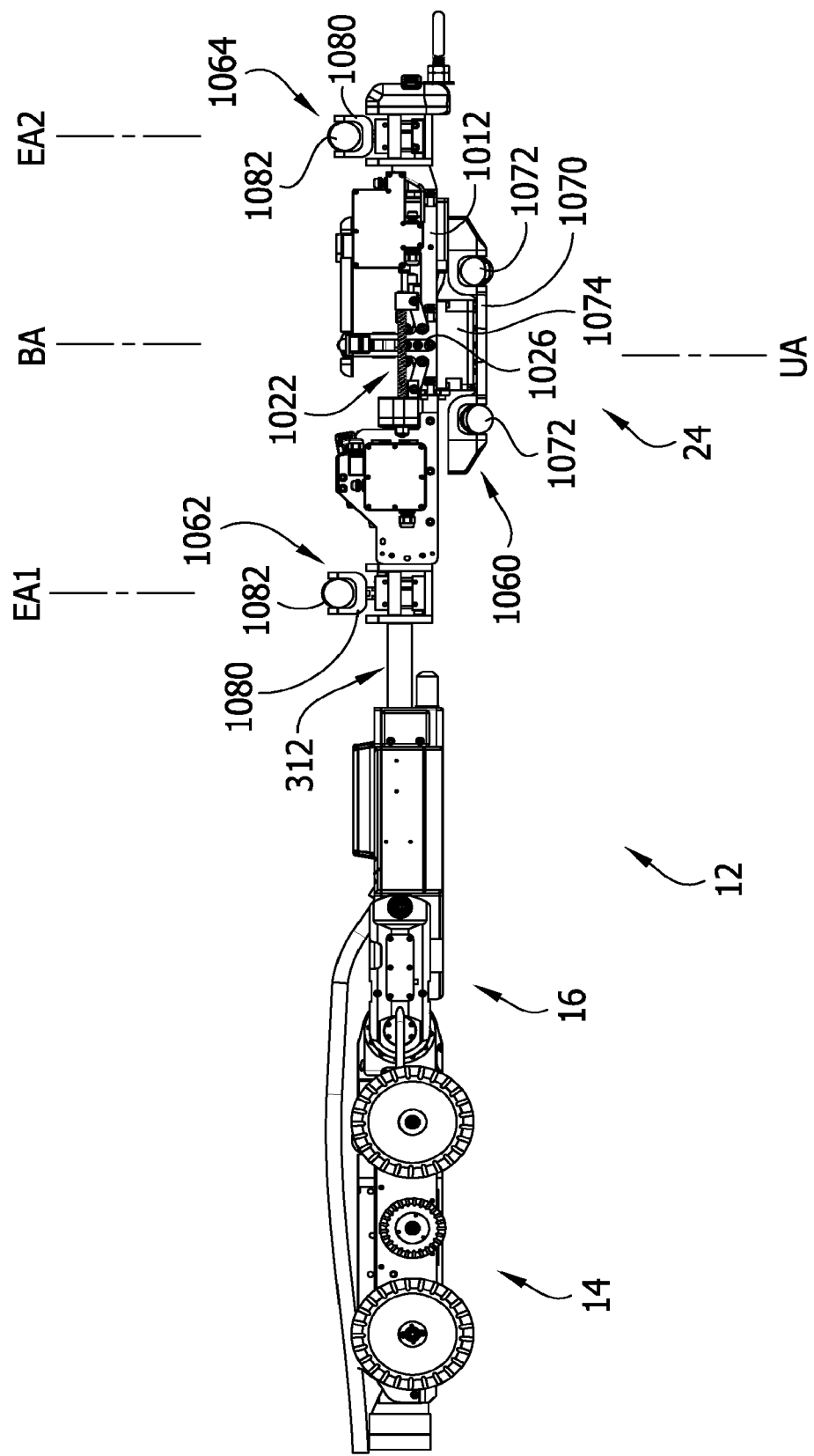
FIG. 30 is a side elevation of the robot with a plug removal tool attached.
Figure 31:
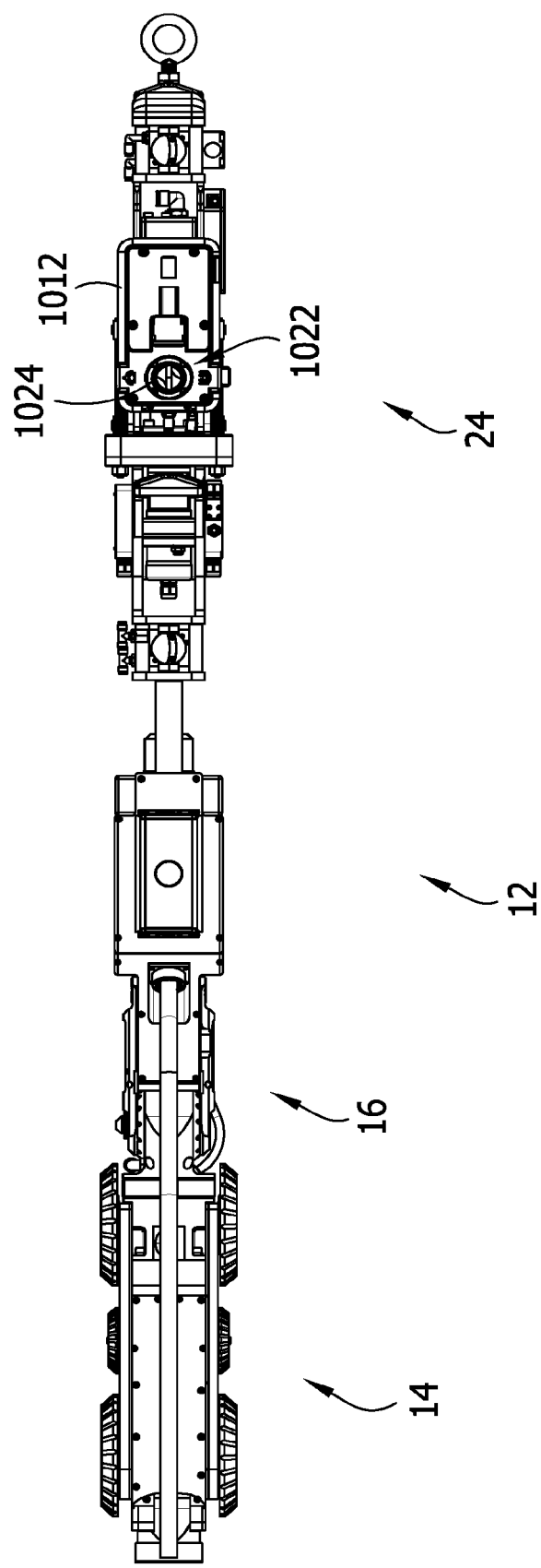
FIG. 31 is a top plan view of the robot as shown in FIG. 30.

Referring to FIG. 30-32, the illustrated plug removal tool 24 is generally configured to support itself within the main pipe M while the tractor 14 is moving the plug removal tool along the main pipe. In other words, the plug removal tool 24 is at least somewhat self-supporting instead of being completely cantilevered from the front end portion of the tractor 14. Further, in one or more embodiments, the plug removal tool 24 is configured to firmly brace itself within the main pipe M while performing a plug removal operation. More specifically, the illustrated plug removal tool 24 comprises an adjustable rolling undercarriage 1060 (broadly, a brace) and a pair of extendable roller arms 1062, 1064 (each, broadly, a brace) that are configured to support and brace the tool during use.

In general, the undercarriage 1060 is configured to roll along the liner L and support the plug removal tool 24 in the pipe M. The undercarriage 1060 comprises a frame 1070 that supports rollers 1072 and a platform 1074 (broadly, an arm) that connects the undercarriage frame to the tool frame 1012. Each roller 1072 is connected to the undercarriage frame 1070 for rotation with respect to the frame and the platform 1074. In the illustrated embodiment, the frame 1070 supports each of the rollers 1072 so that the roller is rotatable with respect to the frame about a first rotational axis oriented substantially perpendicular to the axis AM of the pipe M and a second rotational axis oriented substantially parallel to the axis of the main pipe. Thus, the illustrated rollers 1072 are each configured to rotate with respect to the frame 1070 and platform 1074 about a first axis of rotation and a second axis of rotation oriented transverse to the first axis of rotation.

In one embodiment, the undercarriage 1060 is positioned so that the rollers 1072 contact the interior surface of the liner L (which forms the interior surface of the lined main pipe M) and roll along the interior surface as the plug removal tool 24 moves with respect to the main pipe. Thus, as the tractor 14 drives the plug removal tool 24 along the main pipe M, the rollers 1072 rotate about their first rotational axes and roll along the liner L. As the tool positioning mechanism 16 adjusts the angular orientation of the plug removal tool 24 about the axis AM of the main pipe M, each of the rollers 1072 rotates about the respective second rotational axis to roll along the axis. Thus, the undercarriage 1060 is configured to support the plug removal tool as it is being moved with respect to the main pipe M.

In general, the undercarriage 1060 can function as a brace that is configured to support the frame 1012 in radially spaced apart relationship with the interior surface of the lined main pipe M with respect to the axis AM. In the illustrated embodiment, the undercarriage 1060 is connected to a side of the tool frame 1012 that is generally opposite the drill 1022. In the illustrated embodiment, the platform 1074 extends generally radially with respect to the axis AM and connects the undercarriage frame 1070 to the tool frame 1012. The platform 1074 has a height in the radial direction, which corresponds to an effective radial length of the brace provided by the undercarriage 1060.

In one or more embodiments, the length of the platform 1074 is adjustable to adjust the radial distance between the frame 1012 and the liner L and thereby increase and decrease the effective length of the brace provided by the undercarriage 1060. For example, the illustrated platform 1074 is extendable and retractable to move the undercarriage 1060 relative to the tool frame 1012 along an adjustment axis UA (FIG. 30) oriented generally radially of the axis AM of the main pipe M during use. For example, the platform 1074 is extendable and retractable to adjust a distance between the undercarriage frame 1070 and the tool frame 1012 along the adjustment axis UA. In one or more embodiments, a solenoid, a pneumatic cylinder, a four bar linkage, or another suitable actuator (not shown) can extend and retract the platform 1074. When the plug removal tool 24 is used, the height of the platform 1074 can be adjusted to correspond to the diameter of the main pipe M. For example, the controller 42 can (automatically or by user input) extend the length of the platform 1074 such that tractor 1060 supports the frame 102 so that the drill 1022 is located at a specified radial distance from the liner L. This allows the drill 1022 to remove an entire removable section 212A of the plug 210 in the limited range of motion of the drill bit 1024 along the axis BA. During use of the plug removal tool 24, the height of the platform 1074 can also be adjusted to account for irregularities in the interior of the pipe. For example, in some cases a corporation stop C can protrude into the interior of the main pipe M by a greater than typical amount. In this event, the platform 1074 can be retracted while the robot 12 is situated in the pipe M to draw the drill bit 1024 further away from the corporation stop C in a radial direction before performing a plug removal operation.

Each of the extendable roller arms 1062, 1064 can also be configured to roll along the liner L as the plug removal tool 24 moves during use. Each roller arm 1062, 1064 comprises an extendable arm 1080 that supports a single roller 1082 so that the roller is rotatable with respect to the arm 1080 about a first rotational axis oriented substantially perpendicular to the axis AM of the pipe M and a second rotational axis oriented substantially parallel to the axis of the main pipe. Thus, like the rollers 1072, when the rollers 1082 are positioned to contact the interior surface of the liner L, they roll along the liner as the plug removal tool 24 moves longitudinally and circumferentially with respect to the main pipe M.

Furthermore, like the undercarriage 1060, the roller arms 1062, 1064 are generally configured to support the plug removal tool 24 so that the frame 1012 is radially spaced apart from the liner L with respect to the axis AM of the main pipe M (that is, the roller arms form braces having an effective length in a radial direction with respect to the main pipe axis). In the illustrated embodiment, the roller arms 1062, 1064 are connected to the same side of the frame 1012 as the drill 1022 and the opposite side from the undercarriage 1060. Thus, during use, the undercarriage 1060 is configured to support the tool frame 1012 in radially spaced apart relationship with a first circumferential region of the lined main pipe M on a first side of the tool body and the roller arms 1062, 1064 are configured to support the tool frame in radially spaced apart relationship with a second circumferential region of the interior surface of the main pipe on a second side of the tool frame. The first and second circumferential regions are circumferentially spaced apart about the axis AM of the main pipe M. In one embodiment, the first and second circumferential regions are substantially diametrically opposite one another. The two points of contact at opposed circumferential regions of the main pipe M can allow the plug removal tool 24 to firmly brace itself within the main pipe M while performing a drilling operation.

Each of the arms 1080 has a length in the radial direction with respect to the axis AM during use. The length of the arm 1080 defines the effective length of the brace provided by the respective roller arm unit 1062, 1064 and generally corresponds with the radial distance between the liner L and the side of the frame 1012 on which the drill 1022 is located. In one or more embodiments, the length of each arm 1080 is adjustable to adjust the radial distance between the frame 1012 and the liner L. For example, each arm 1080 is extendable and retractable to adjust a distance between the respective roller 1082 and the tool frame 1012 along a respective adjustment axis EA1, EA2. In certain embodiments, a solenoid, a pneumatic cylinder, a four bar linkage, or another suitable actuator (not shown) can extend and retract each arm 1080. The extendable arms 1080 can be used in generally the same way and as the extendable platform 1074 of the undercarriage 1060 described above. That is, the arms 1080 can be adjusted so that the rollers 1082 roll along the liner L as the plug removal tool 24 moves with respect to the main pipe M and then to radially support the tool as the drill 1022 removes the removable section 212A of the plug 210. In another embodiment, the arms 1080 are substantially retracted while the robot 12 moves along the axis AM of the pipe M to each corporation stop. Then when the plug removal tool 24 arrives at a corporation stop C, the arms 1080 are extended to brace the tool frame 12 at the proper radial position. In either case, when the drill 1022 is being used, the undercarriage 1060 and extendable arms 1062, 1064 can be extended to brace the plug removal tool 24 against opposed circumferential portions of the main pipe M to steady the plug removal tool as it drills. This bracing can enhance the precision of the drill 1022.

Together the extendable arms 1062, 1064 and the extendable undercarriage 1060 can be used to aid in positioning the plug removal tool at the desired position with respect to a corporation stop C. As explained above in Section IV, the tractor 14 and the tool positioning mechanism 16 are typically used to align the drill with the corporation stop C longitudinally along and angularly about the axis AM of the main pipe M. To position the drill 1022 at the desired radial position with respect to a corporation stop C, the extendable arms 1080 can either automatically or by user input) be extended and retracted to adjust the radial position of the tool frame 1012. Furthermore, in one or more embodiments, the extendable arm 1080 of each of the rear and front roller arms 1062, 1064 is independently adjustable. Thus the controller 42 can (either automatically or by user input) extend or retract only one arm 1080 at a time, or extend one arm while retracting the other, to make small adjustments to the pitch of the tool 1024, if it is helpful to better align the drill 1022 with the corporation stop C.

VII. Plug/Fitting Installation Tool

Referring again to FIGS. 23 and 34-36, an exemplary embodiment of an installation tool 22 for installing one or more plugs 210 into corporations stops C before the main pipe is lined with a liner L (see FIG. 4) and/or for installing one or more fittings 110 into respective corporation stops after the plug removal tool 24 restores fluid communication between the corporation stops and the main pipe M (see, FIG. 6) will now be described in greater detail. The following section describes how the installation tool 22 is used for installing a fitting 110 before briefly explaining how the same mechanisms may be adapted for use in installing the plug 210.

In the illustrated embodiment, the installation tool 22 is configured to install one or more fittings 110 in corporation stops C by moving the fitting along a respective installation axis IA oriented transverse to a longitudinal axis LAR of the robot 12. As will be explained in further detail below, the robot 12 is configured to operatively align the installation tool 22 with a corporation stop C such that the installation axis IA is generally coaxial with the axis AC of the corporation stop. The installation tool 22 is then configured to move the fitting 110 along the installation axis IA to insert a portion of the fitting into the corporation stop C. Various mechanisms for moving a fitting along an installation axis may be used without departing from the scope of the invention. For example, it is expressly contemplated that a mechanical linear actuator such as a screw mechanism, a scissor arm, an electronic solenoid, or the like can be used for this purpose. It is further contemplated that the tool can be configured to screw a self-tapping fitting into a corporation stop by rotating the fitting about the installation axis. But in the illustrated embodiment, as will be described in further detail below, the fittings 110 and plugs 210 are driven in linear movement by pressurized fluid (e.g., hydraulic fluid or compressed air). More specifically, the illustrated installation tool 22 operates pneumatically via compressed air delivered from the compressor 36 through the umbilical cord 30 to the installation tool to drive movement of the fitting 110 along the installation axis IA. Vacuum pressure from the vacuum source 38 onboard the robot 12 may also be delivered to the installation tool 22 to control the tool. As will be explained in further detail below, the vacuum source 38 is configured to withdraw the tool 22 away from the fitting 110 after the fitting is installed in the corporation stop C.

In one or more embodiments, the installation tool 22 comprises at least one cylinder block (broadly, a tool body or base), generally indicated at 1136, which is configured for being received in the interior of the main pipe M for movement along the main pipe. In the illustrated embodiment, two cylinder blocks 1136 are coupled end-to-end by a coupling 1137. In certain embodiments, the coupling 1137 is configured to be selectively actuated to establish a rigid connection between the adjacent cylinder 1137 blocks and selectively actuated to establish a flexible connection between the adjacent cylinder blocks. For example, the coupling 1137 can include an articulable joint (not shown) that connects between the front and rear cylinder blocks and a displaceable pin or other locking member (not shown) that can selectively lock the joint in place. The illustrated cylinder blocks 1136 are mounted on the tool positioning mechanism 16 such that the tool positioning mechanism can adjust the angular orientation of the cylinder blocks with respect to the axis AM of the main pipe M as explained above in Section IV.

Figure 37:
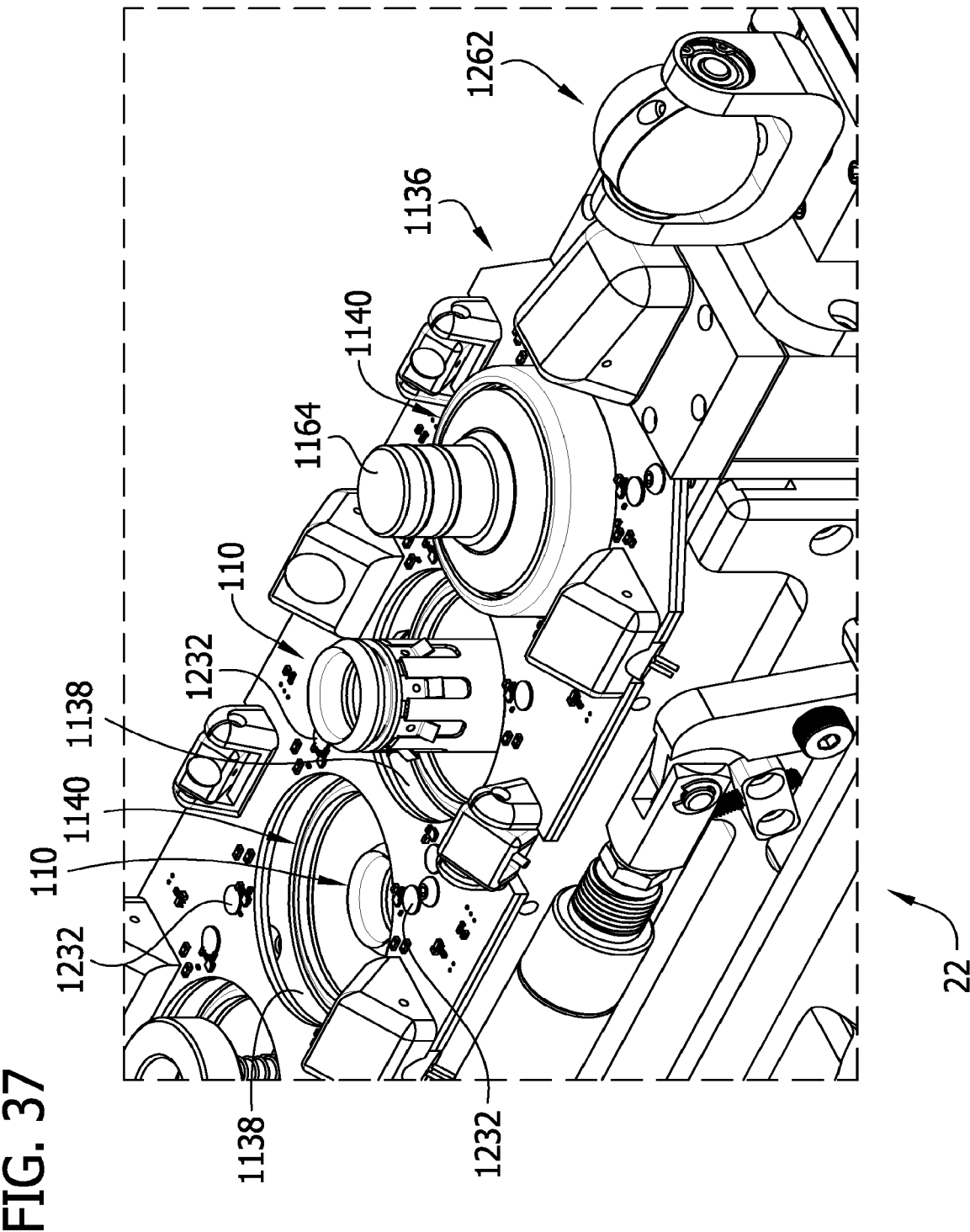
FIG. 37 is an enlarged view of a portion of FIG. 36.
Figure 38:
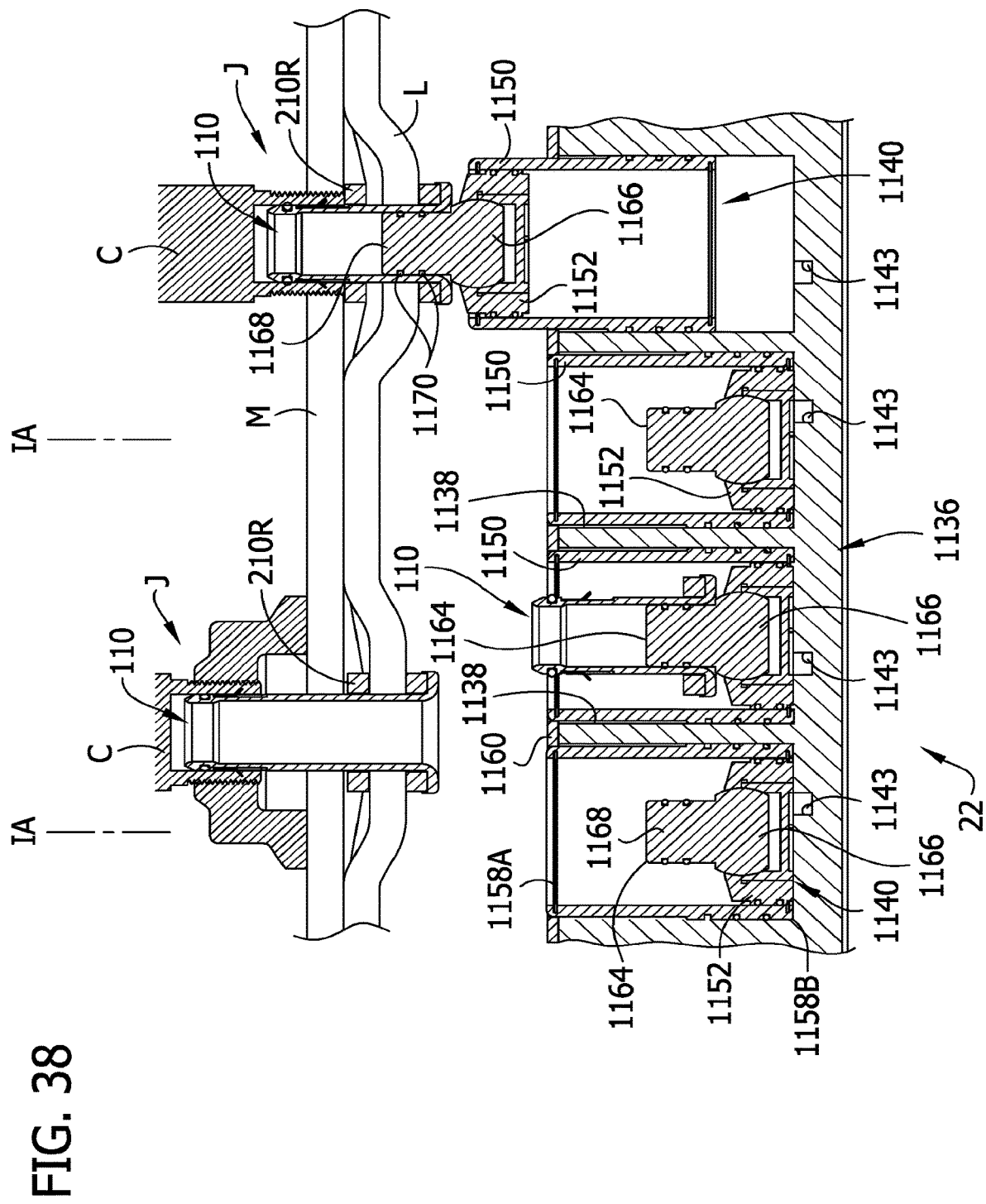
FIG. 38 is a fragmentary longitudinal cross section of the fitting installation tool received in a lined pipe and being used to install a fitting into one of the two corporation stops.
Figure 39:
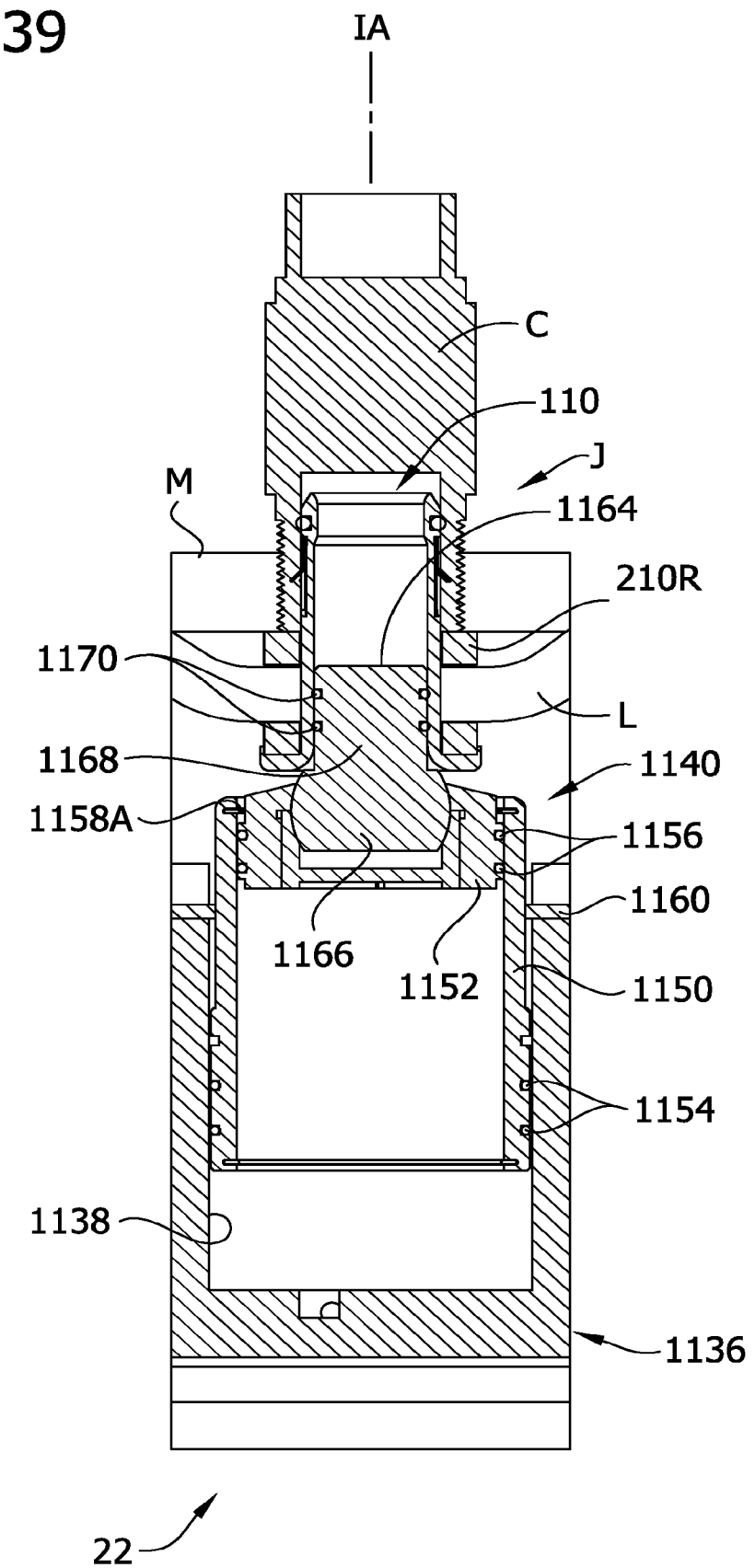
FIG. 39 is a cross section of a cylinder of the fitting installation tool as it is installing a fitting into a corporation stop.

Referring to FIGS. 37-39, each cylinder block 1136 defines one or more cylinders 1138, and each cylinder is shaped and arranged for slidably receiving a piston assembly therein, generally indicated at 1140. The term "cylinder" is used in this disclosure to broadly refer to a fluid-containment recess configured to slidably receive a piston therein. Unless otherwise specified, "cylinder" does not specify shape or geometry in this disclosure. Thus, while the illustrated cylinders 1138 are generally cylindrical in shape ("cylindrical" is used here in the geometric sense of the term) and the illustrated piston assemblies 1140 have generally circular cross-sectional shapes, other embodiments can have cylinders and pistons of other shapes. As will be explained in further detail below, each piston assembly 1140 is configured to be extended and retracted along the installation axis IA of the respective cylinder 1138. Further, each piston assembly 1140 is configured to be connected to a fitting 110 such that the fitting is extended along the installation axis IA with the piston assembly. Thus when the cylinder is operatively aligned with a corporation stop C, extension of the piston assembly 1140 inserts the fitting 110 into the corporation stop. As will be further explained below, when the piston assembly 1140 is subsequently retracted it can be disconnected from the fitting 110 if the fitting establishes an operative connection with the corporation stop C.

Referring again to FIGS. 23 and 34-36, in the illustrated embodiment, the installation tool 22 comprises four piston assemblies 1140 per cylinder block 136. Thus the illustrated installation tool 22 has a total of eight spaced apart cylinders 1138. It will be understood that in other embodiments, the tool can define other numbers of cylinders and the tool can include other numbers (e.g., one or more) of pistons. However, in certain embodiments, it may be desirable for one or more cylinder blocks 1136 to define a plurality of cylinders 1138, each configured to slidably receive a respective piston assembly 1140 therein, because the plurality of cylinders and piston assemblies 1140 enable the installation tool to operably hold a plurality of fittings 110 at the same time. Thus, the robot 12 can be used to install several fittings 110 in a corresponding number of corporation stops C in a single pass of the robot along the main pipe M, without exiting the pipe to reload the tool with fittings.

Referring again to FIG. 2, each of the cylinders 1138 is selectively connectable to the air compressor 36 and the vacuum source 38 of the installation system 10. The umbilical cord 30 includes passaging (e.g., a hose) that provides fluid communication between the air compressor 36 and each cylinder 1138 and also includes passaging (e.g., a hose) that provides fluid communication between the vacuum source 38 and each cylinder. Suitably, the installation system 1110 comprises one or more control valves 40 that are configured to selectively control fluid communication between the air compressor 36 and the cylinders 1138. In addition, the vacuum source 38 can be selectively actuated to adjust the cylinders 1138 in one or more embodiments. In FIG. 3, the control valve 40 is schematically illustrated as being external to the robot 12 near the skid 32, but it will be understood that the robot 12 (e.g., the tool 22) can include onboard fluid valves for controlling fluid communication between the cylinders 1138 and one or both of the air compressor 36 and the vacuum source 38. For example, one or more control valves can be located on the pivot arm 322 of the tool positioning mechanism 16 as explained above in Section IV. It is further understood that a source of pressurized fluid may be mounted onboard the robot in certain embodiments. Likewise, the vacuum source may be a remote vacuum source that is connected to the robot via the umbilical cord in one or more embodiments. Valves and passaging on the cylinder block may be used to permit individual control of the each cylinder 1138.

Referring to FIG. 38, the installation tool 22 comprises a respective single fluid coupling 1143 for each of the cylinders 1138 in each cylinder block 1136. Thus each coupling 1143 is configured to connect the respective cylinder 1138 to each of the air compressor 36 and the vacuum source 38. In other embodiments each cylinder can comprise a separate coupling for the air compressor and the vacuum source. In certain embodiments, the vacuum source can be omitted and pressure can be released from the cylinders by respective vents. When any of the cylinders 1138 is fluidly connected to the air compressor 36, compressed air from the air compressor is imparted into the cylinder. Likewise, when any of the cylinders 1138 is fluidly connected to the vacuum source 38, the vacuum source draws a vacuum in the respective cylinder. As will be explained in further detail below, each piston assembly 1140 is sealingly engaged with the cylinder block 1136 such that, when compressed air is imparted into the respective cylinder beneath the piston assembly 1140, the air drives movement of the piston outward along the respective installation axis IA of the cylinder (broadly, the piston assembly is extended); and when a vacuum is drawn in the respective cylinder, the vacuum pressure drives movement of the piston inward along the respective axis (broadly, the piston is retracted).

Figure 40:
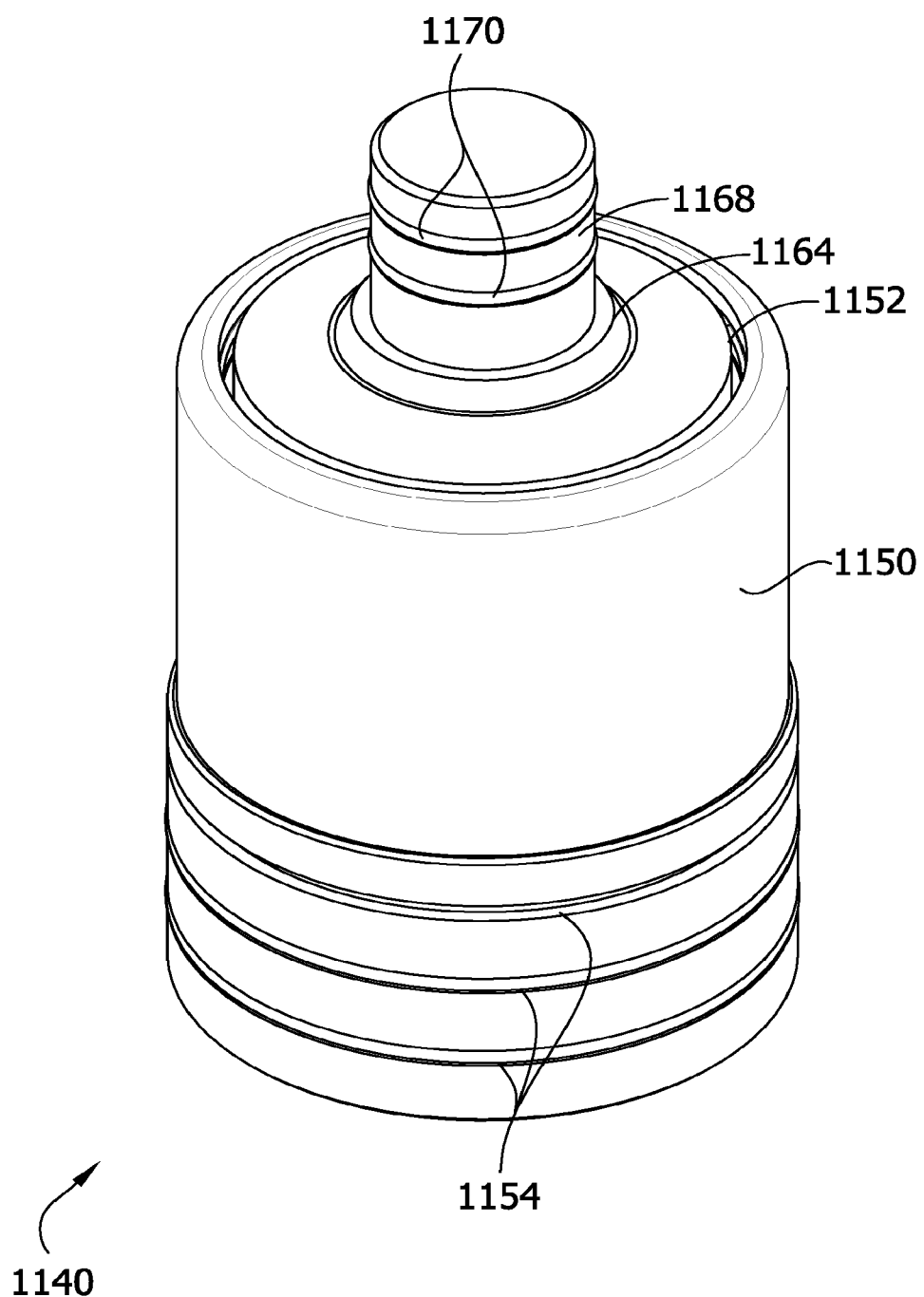
FIG. 40 is a perspective of a piston assembly of the installation tool.
Figure 41:
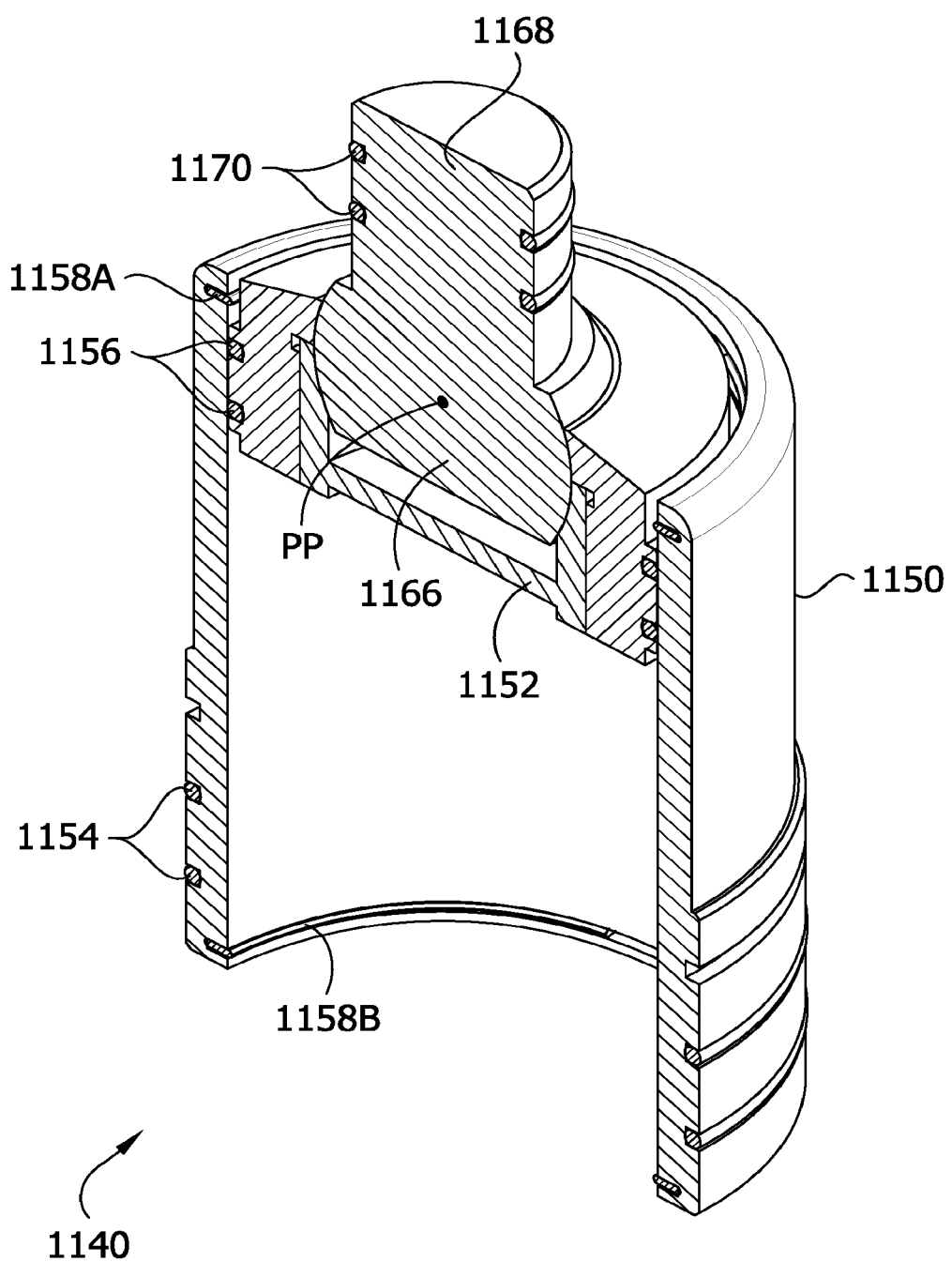
FIG. 41 is a perspective longitudinal section of the piston assembly.

Referring to FIGS. 39-41, in one or more embodiments, the piston assembly 1140 is a telescoping piston assembly that comprises at least an outer piston member 1150 and an inner piston member 1152 that is extendable and retractable with respect to the outer piston member. In the illustrated embodiment, the outer piston member 1150 comprises a tube having an outer perimeter that is sized and arranged to be slidably received in the cylinder 1138 and an inner perimeter that is sized and arranged to slidably receive the inner piston member 1152. Gaskets 1154 extend circumferentially about the outer piston member 1150 in channels formed in the outer perimeter to provide pneumatic fluid seals between the outer piston member and the cylinder block 1138. Similarly gaskets 1156 extend circumferentially about the inner piston member 1152 to provide pneumatic fluid seals between the inner piston member and the outer piston member 1150. A single inner piston member 1152 seals the pneumatic chamber defined in the interior of the outer piston member 1150 in the illustrated embodiment. In other embodiments, a plurality of nested, telescoping inner piston members could seal the outer piston member. In still other embodiments, the piston assembly can comprise a single, non-telescoping piston. However, using a telescoping piston assembly provides a greater range of motion for cylinders of comparable length.

During use of the installation tool 22, pressurized air in a cylinder 1138 acts against the inboard surface of the inner piston member 1152, thereby imparting a force on the piston assembly 1140 oriented outward along the installation axis IA. The outward force causes the inner piston member 1152 to slide outward along the outer piston member 1150 and/or causes the outer piston member to slide outward along the cylinder 1138. As the inner piston member 1152 slides outward along the outer piston member 1150, it engages a stop 1158A of the outer piston member that prevents the inner piston member from sliding out of the outer piston member. A stop 1158B is provided on the opposite end portion of the outer piston member 1150 to prevent the inner piston member 1152 from sliding out of the outer piston member during retraction. Similarly, the outer piston member 1150 engages a stop 1160 of the cylinder block 1136 at the outer end of travel along the installation axis IA to retain the outer piston member in the cylinder 1138.

In the illustrated embodiment, the inner piston member 1152 has an alignment feature that aids in aligning the fitting 110 with a corporation stop C as will be described in further detail below. A fitting mount 1164 configured to be connected to a fitting 110 is connected to the remainder of the inner fitting member 1152 (broadly, a "member") for pivoting with respect to the remainder of the inner fitting member 1152 about a pivot point PP (FIG. 41). The illustrated fitting mount 1164 comprises an enlarged, bearing portion 1166, which in the illustrated embodiment has in part the shape of a section of sphere, and a stud portion 1168 extending from the spherical bearing portion. In the illustrated embodiment, the stud portion 1166 is configured to be received in the fitting 110 when the fitting is supported on or connected to the fitting mount 1164; but in other embodiments, the fitting can be supported on or connected to the fitting mount in other ways without departing from the scope of the invention. The bearing portion 1166 is pivotably engaged with the remainder of the inner fitting member 1152 such that the fitting mount can pivot about the pivot point PP in any direction as the piston assembly 1140 is extended and retracted. More specifically, the spherical portion 1166 is operably received in the remainder of the inner fitting member 1152 such that the fitting mount 1164 and the remainder of the inner fitting member form a ball joint. Because the fitting mount 1164 is located at the end of the piston assembly 1140, the pivot point PP moves with the piston assembly as it is extended and retracted.

When the piston assembly 1140 is extended to insert a fitting 110 into a corporation stop C, the fitting mount 1164 can pivot about the pivot point PP to more precisely align the fitting with the corporation stop C. For example, as the fitting mount 1164 is extended, an end portion (e.g., a tapered end portion) of the fitting 110 engages the inner perimeter edge portion of the corporation stop C. The ball joint allows the fitting mount 1164 to simultaneously pivot freely about the pivot point PP in two perpendicular planes in response to the engagement of the fitting end with the corporation stop 110. This allows the fitting 110 to self-center in the corporation stop, correcting slight misalignments that may still be present after the robot 12 generally aligns the cylinder 1138 and piston assembly 1140 with the corporation stop C. It is expressly contemplated that this aspect of the disclosure will also be used with fitting mounts that are moved toward and away from a branch conduit using mechanisms other than pneumatic cylinders.

Referring to FIGS. 38 and 39, in the illustrated embodiment, the fitting mount 1164 is configured to be connected to the fitting 110 such that, when the fitting mount is retracted after being extended to insert the fitting into a corporation stop C, the fitting remains connected to the fitting mount such that the fitting is retracted with the fitting mount and withdrawn from the corporation stop unless a tight connection is established between the fitting and the corporation stop. When the fitting 110 is used to seal the junction J between a corporation stop C and a liner L, it may be desirable to ensure that the strength of the connection between the fitting and the corporation stop is strong enough to withstand the forces that may be imparted on the fitting during use of the pipeline system. In the illustrated embodiment, the connection between the fitting mount 1164 and the fitting 110 is configured so that the fitting mount imparts withdrawal forces on the fitting as it is retracted that are as great or greater than the withdrawal forces that the fitting is likely to experience when the pipeline system is in use. The fitting mount 1164 will not separate from the fitting 110 unless the connection strength between the fitting and the corporation stop C is greater than the connection strength between the fitting mount and the fitting. If the fitting mount 1164 separates from the fitting 110 as it is retracted, the technician has evidence that an operable connection between the fitting and the corporation stop has been established. It is expressly contemplated that this aspect of the disclosure will also be used with fitting mounts that are moved toward and away from a branch conduit using mechanisms other than pneumatic cylinders.

To facilitate the strong connection between the fitting mount 1164 and the fitting 110, in the illustrated embodiment, the fitting mount 1164 comprises two compressible gaskets 1170 (each, broadly, a resilient connection member) that extend around the perimeter of the stud portion 1168. Each gasket 1170 is formed from resiliently compressible material, and the gaskets are arranged to be compressed (broadly, resiliently deformed) by connection of the fitting 110 with the fitting mount 1164 (e.g., by the stud portion 1168 being received in the fitting). After being compressed, the gaskets 1170 impart a resilient biasing force radially outwardly on the fitting 110 that secures the fitting to the support 1164. In the illustrated embodiment, the resilient biasing force is manifested by increased frictional force between the stud portion 1168 and the fitting 110 that resists the fitting being pulled off the stud portion. During retraction of the fitting mount 1164, the fitting 110 will be withdrawn from the corporation stop C with the fitting mount unless the connection between the fitting and the corporation stop can withstand a withdrawal force on the fitting that is greater than the resilient biasing force of the gaskets 1170. In certain embodiments, the connection between the fitting mount 1164 and the fitting 110 can withstand a separation force of greater than about 20 lbsf (89 N).

To facilitate the use of a single installation tool 22 for pipeline systems having corporation stops of different sizes, in certain embodiments, the fitting mount 1164 is a replaceable component (e.g., an individually replaceable component or a component of a replaceable assembly). The installation tool 22 can comprise a set of exchangeable fitting mounts 1164 comprising stud portions 1168 having different diameters and lengths for use with different size fittings.

Figure 42:
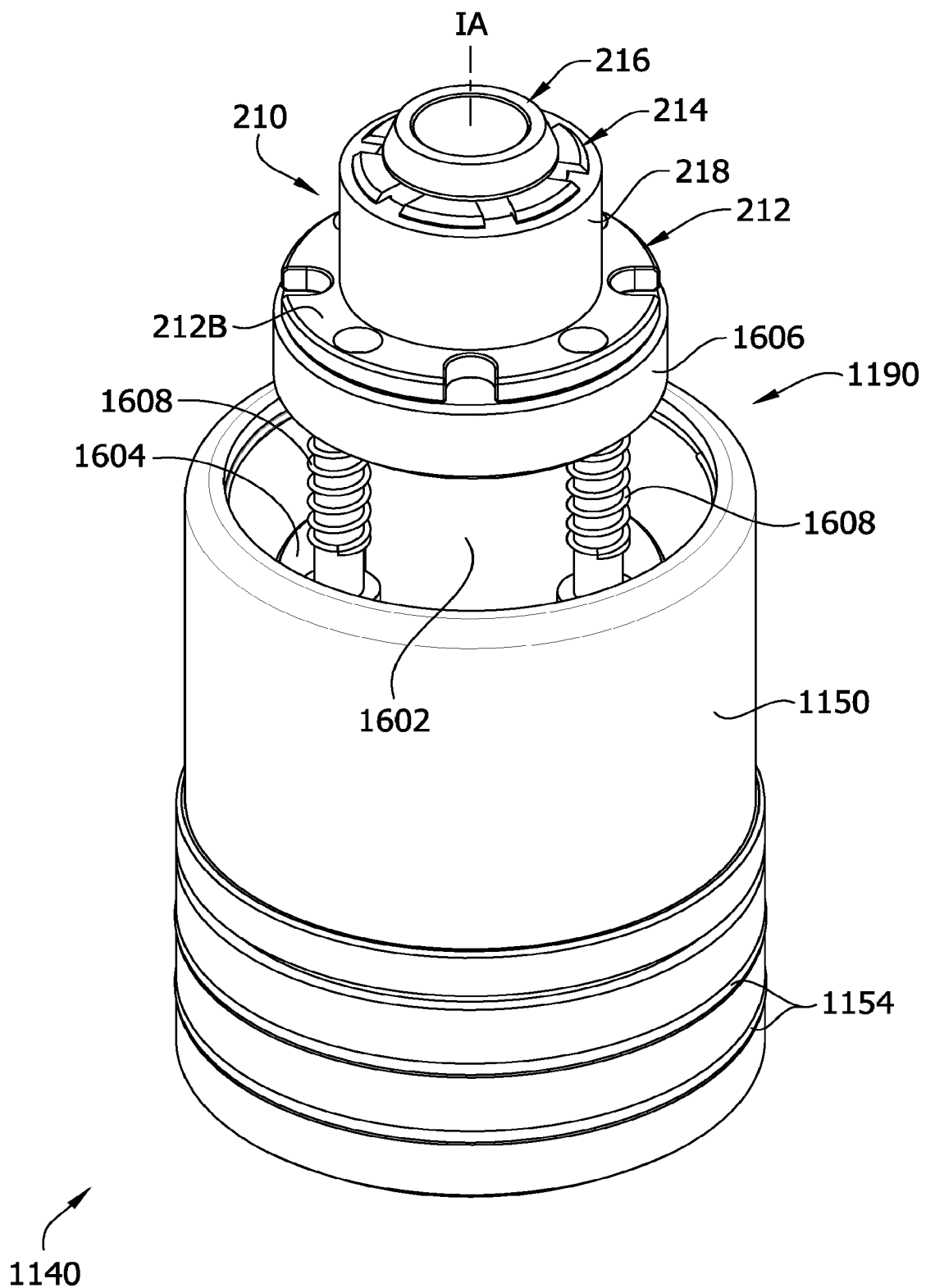
FIG. 42 is a perspective of the piston assembly of the installation tool similar to FIG. 40, but in which a fitting mount shown in FIG. 40 is replaced with a plug mount and a plug supported thereon.
Figure 43:
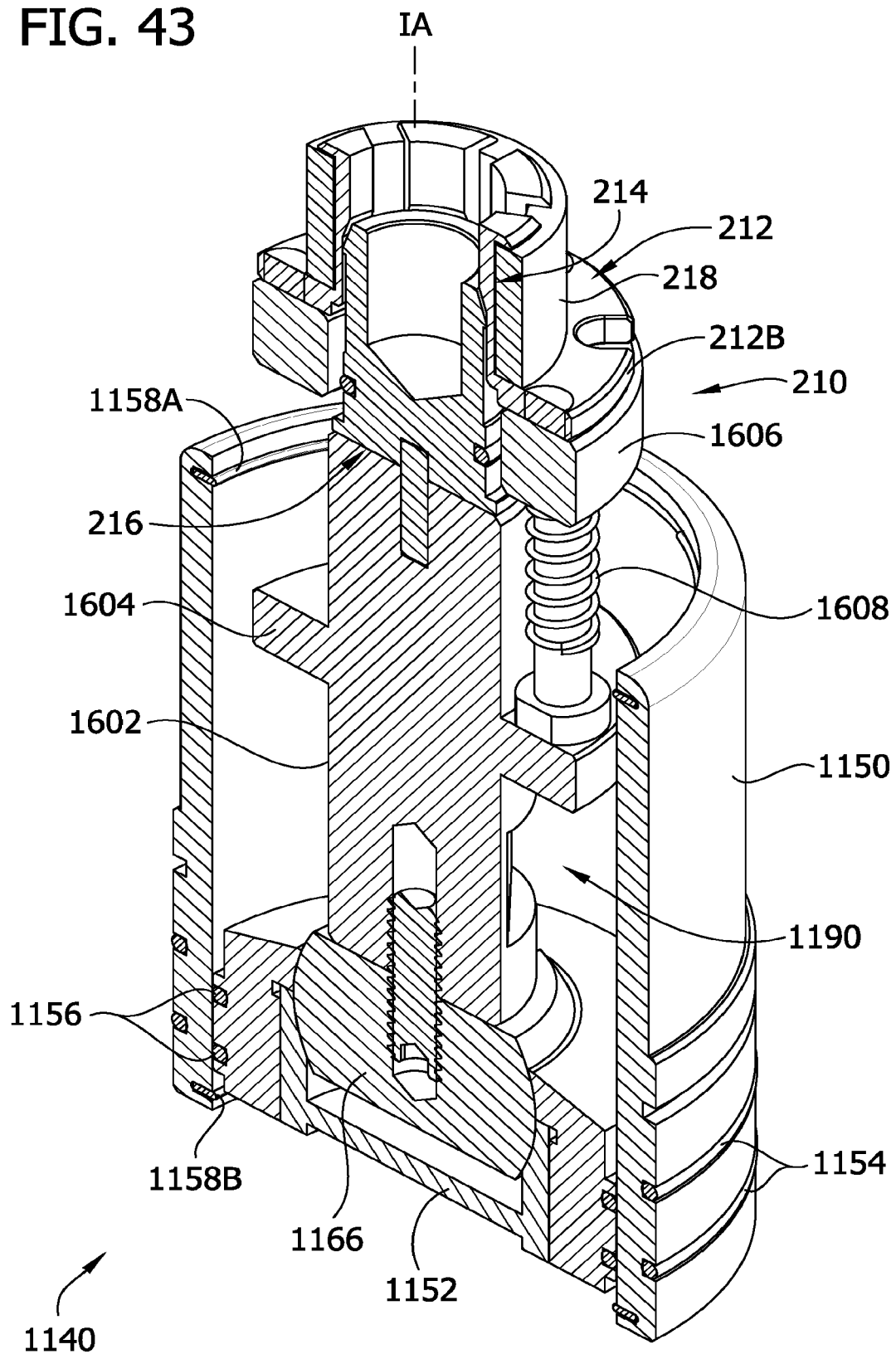
FIG. 43 is a longitudinal section of the piston assembly with the plug mount installed and the plug supported on the plug mount.

Referring to FIGS. 42 and 43, in one or more embodiments the fitting mounts 1164 are interchangeable with plug mounts 1190. Each plug mount 1190 is generally configured to support a plug 210 by engaging the inner end portion of the plunger member 216. Thus, after properly aligning the installation tool 22 with a corporation stop C, extending the piston assembly 1140 carries out the two-step plug installation step that is described above. That is, along a first segment of the extension stroke of the piston assembly 1140, the plug mount 1190 moves the plug body 212 in unitary fashion radially outward of the main pipe axis AM into the corporation stop C; and along a second segment of the extension stroke of the piston assembly, the plug mount moves the plunger member 216 relative to the expandable fitting member 214 to expand the plug body 212 and seal the corporation stop C.

In the illustrated embodiment, the plug mount 1190 comprises a stud 1602 that is configured to replace the stud 1162 of the fitting mount 1164. The stud 1602 has a free end configured to engage the inner end portion of the plunger member 216. In addition, the stud 1602 comprises a flange 1604 that supports a platform 1606 on springs 1608 (broadly, yieldable biasing members). The springs 1608 are configured so that, when the platform 1606 is urged toward the flange 1604, with sufficient force the springs will yield, allowing the platform to move toward the flange along the installation axis IA with respect to the stud 1602. As shown, the platform 1606 is configured to engage and support the inner end of the expandable fitting member 214 during use.

When a piston assembly 1140 is extended to install a plug 210, initially the plunger member 216 and the expandable fitting member 214 move conjointly with the stud 1602 as the plug body 212 is inserted into the corporation stop C. That is, the platform 1606 moves conjointly with the stud 1602 and the springs 1608 do not yield. When the flange section 212B engages the main pipe M, the engagement stops further movement of the expandable fitting member 214 and the platform 1606. The springs 1608 begin to yield, and the stud advances the plunger member 216 relative to the expandable fitting member 214 and the platform 1606. As explained above, this expands the annular gasket 218 to form a seal between the plug 210 and the corporation stop C.

Referring again to FIG. 36, the installation tool 22 can be equipped with various sensors that aid in navigating the robot 12 through the main pipe M and operatively aligning the cylinders 1138 with the corporation stops C. In the illustrated embodiment, the installation tool 22 comprises a sensor head 1180 on the leading end. The sensor head 1180 can include one or more imaging sensors (e.g., a camera) and/or positioning sensors (e.g., an accelerometer, a gyroscope, etc.) that aid in positioning the installation tool within the main pipe M. In addition, each cylinder 1138 can be associated with one or more cameras that aid in identifying the location and/or orientation of the corporation stops C.

Figure 36:
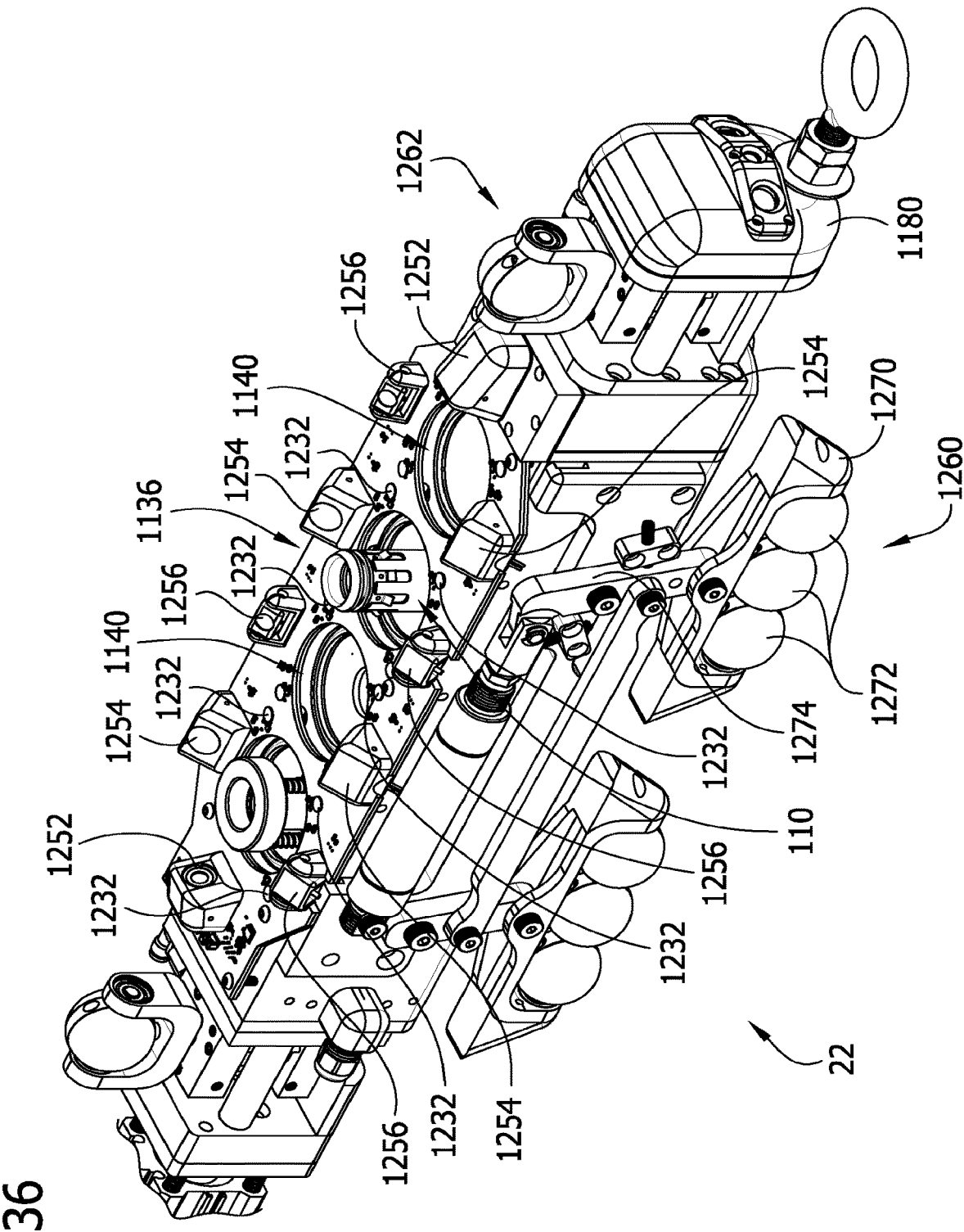
FIG. 36 is a fragmentary perspective showing a portion of the fitting installation tool.

Referring to FIGS. 36 and 37, the illustrated installation tool 22 comprises at least one plug locating element 1232 associated with each of the pistons 1140. Generally, the locating elements 1232 are configured to communicate with the locating elements 240 in the remnants 210R of the plug 210 during the process of installing the fittings 110 illustrated schematically in FIG. 6. More particularly, the locating element(s) 1232 for each piston 1140 are configured to communicate with the locating elements 240 in the plug remnants 210R to facilitate guiding the robot 12 to operatively align the respective piston assembly 1140 with a corporation stop C so that the each fitting 110 is installed in the respective corporation stop when the piston extends the fitting mount 1164 relative to the cylinder block 1136. Like the plug removal tool 24, the locating elements 1232 of the installation tool 22 comprise magnetic field sensors configured to detect the magnetic field generated by the magnets 240 in the plug remnants 210R. Other of installation tools could have other types of locating elements without departing from the scope of the invention.

In the illustrated embodiment, the installation tool 22 comprises magnetic field sensors 1232 that define rectangular grids (broadly, two-dimensional grids) centered on each installation axis IA of the tool. In the illustrated embodiment, each piston 1140 has one set of four magnetic field sensors 1232 arranged in a rectangular grid centered on the installation axis IA. Other installation tools can have other arrangements of locating elements. The two-dimensional grid of magnetic field sensors 1232 for each piston 1140 can be used to operatively align the piston with a corporation stop C in the same manner that the magnetic field sensors 1032 are used to align the drill bit 1024 of the plug removal tool 24 with a corporation stop. Because the installation tool 22 includes a two-dimensional grid of magnetic field sensors 1232 centered on each installation axis IA, the robot 22 can accurately align each fitting mount 1164 with a corporation stop C so that the fitting 110 is inserted into the corporation stop when the piston 1140 is extended.

Referring to FIG. 36, the illustrated installation tool 22 further comprises a pipe visualization system. Like the pipe visualization system 1050 of the plug removal tool 24, the pipe visualization system of the installation tool 22 is configured to project a projected image onto the interior surface of the pipe M. More particularly, in one or more embodiments, the pipe visualization system of the installation tool 22 is configured to project a respective projected image for each of the piston assemblies 1140 that is centered on the respective installation axis IA. To that end, each cylinder block 1136 comprises a pair of longitudinal laser generators 1252 the centers of which are co-planar with the installation axes IA. The longitudinal lasers 1252 together are configured to project a single longitudinal line segment onto the interior of the pipe M that extends along the length of the respective cylinder block and intersects the installation axis IA of each of the piston assemblies 1140. Further, for each piston assembly 1140, a respective transverse laser generator 1254 lies in a plane including the installation axis IA of a respective piston assembly, which plane is perpendicular to the plane of the longitudinal laser generators 1252. Each transverse laser generator 1254 is configured to project a transverse (circumferential) line segment onto the interior of the pipe M that intersects the respective installation axis IA. Thus, for each piston assembly 1140, the laser generators 1252, 1254 project a pair of intersecting line segments that intersect at an intersection point, and the respective installation axis IA crosses the projected image at the intersection point. The visualization system further comprises a camera 1256 for each piston assembly 1140 that is configured to form a captured image of the internal surface of the pipe M that includes the projected image. Thus, a technician (or the controller 42 executing an automated control routine) can use the captured image to navigate the robot 12 to each corporation stop C during the installation processes shown schematically in FIGS. 4 and 6. Specifically, when installing a plug 210 or a fitting 110, the technician (or the controller 42 executing an automated control routine) can use the captured image to center the projected intersection point on the center of the corporation stop C before extending the piston assembly to install the plug or fitting.

Figure 34:
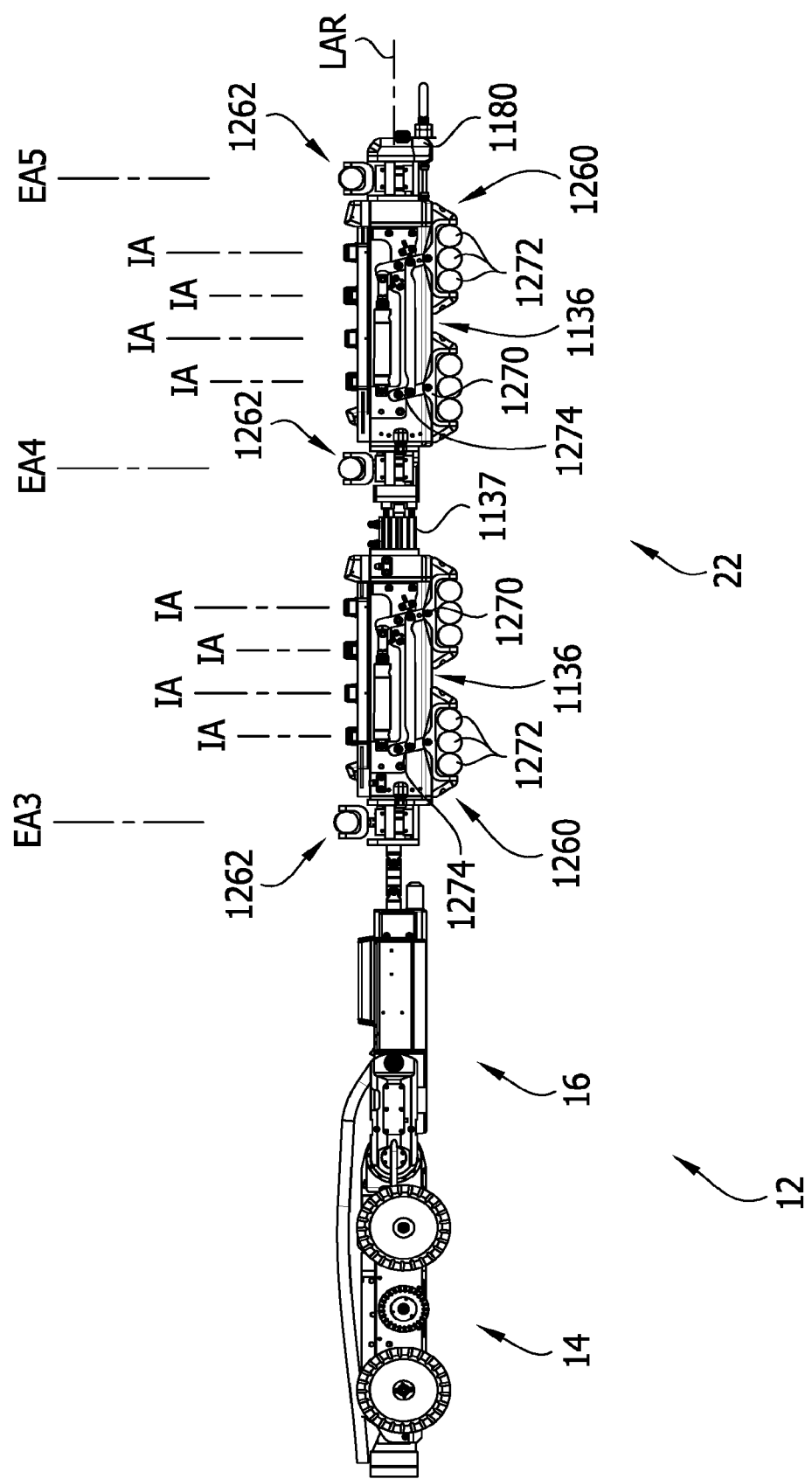
FIG. 34 is a side elevation of the robot as shown in FIG. 23.

Referring to FIGS. 23, 34, and 36, like the plug removal tool 24, the illustrated installation tool 22 is configured to support itself within the main pipe M as it moves along the main pipe and installs plugs 210 or fittings 110. More particularly, each cylinder block 1136 is fitted with an undercarriage 1260 (broadly, a brace) that functions in a similar manner to the undercarriage 1060 of the plug removal tool 24 to support the cylinder block such that the side of the cylinder block opposite the piston assemblies 1140 is radially spaced apart from the surface of the main pipe M (either the unrestored surface of the main pipe when installing plugs 210 as shown in FIG. 4 or the lined surface of the main pipe when installing fittings 110 as shown in FIG. 6). In addition, the installation tool 22 comprises three roller arms 1262 that function similarly to the roller arms 1062 of the plug removal tool 24 to support and brace the side of the cylinder blocks 1136 from which the piston assemblies 1140 are extended.

In general, each undercarriage 1260 is configured to roll along the interior surface of the main pipe M and support the respective cylinder block 1136. Each undercarriage 1260 comprises at least one frame 1270 that supports at least one roller 1272 and a linkage 1274 (broadly, at least one arm) that connects the undercarriage frame to the respective cylinder block 1136. In the illustrated embodiment, each undercarriage 1260 comprises four frames 1270, each supporting three rollers, with a pair of front and back undercarriage frames connected to the left side (broadly, a first side) of the cylinder block 1136 and another pair of front and back undercarriage frames connected to the right side (broadly a second side). The two undercarriages 1260 on the right side of each cylinder block 1136 are not visible in these drawings. Each roller 1272 is connected to the respective undercarriage frame 1270 for rotation with respect to the frame and the linkage 1274. In the illustrated embodiment, the frame 1270 supports each of the rollers 1272 so that the roller is rotatable with respect to the frame about a first rotational axis oriented substantially perpendicular to the axis AM of the pipe M and a second rotational axis oriented substantially parallel to the axis of the main pipe. Thus, as explained above in Section VI in regard to the undercarriage 1060, each undercarriage 1260 is configured to contact the interior surface of the main pipe P and roll along the interior surface as the robot 12 moves longitudinally and circumferentially to align the installation tool 22 with the corporation stops C. Furthermore, like the undercarriage 1060, each undercarriage 1260 functions as a brace that supports the side of the cylinder block 1136 opposite the piston assemblies 1140 in radially spaced apart relationship with the interior surface of the pipe M with respect to the axis AM.

In the illustrated embodiment of the undercarriage 1260, each linkage 1274 is configured to selectively raise and lower the cylinder block 1136 with respect to the roller frames 1270 to adjust the radial height at which the cylinder block is supported on main pipe M with respect to the main pipe axis AM. On each lateral side of the cylinder block 1136, a respective linkage 1274 comprises a rear rocker arm 1502 that pivotably connects the rear roller frame 1270 to the cylinder block 1136 and a front rocker arm 1504 that pivotably connects the front roller frame to the cylinder block. The rear rocker arm 1502 has an upper end portion and a lower end portion spaced apart along a rear rocker axis RRA, and the front rocker arm 1504 has an upper end portion and a lower end portion spaced apart along front rocker axis FRA. A first pin 1506 connects an upper end portion of the rear rocker arm 1502 to the cylinder block 1136 for rotation with respect to the cylinder block about the axis of the first pin. A second pin 1508 connects a lower end portion of the rear rocker arm 1502 to the rear roller frame 1270 for rotation with respect to the rear roller frame about the axis of the second pin. A third pin 1510 connects a middle portion of the front rocker arm 1504 to the cylinder block 1136 for rotation with respect to the cylinder block about the axis of the third pin. A fourth pin 1512 connects a lower end portion of the front rocker arm 1504 to the front roller frame 1270 for rotation with respect to the front roller frame about the axis of the fourth pin.

A connecting link 1514 connects the rear rocker arm 1502 to the front rocker arm 1504 such that the front and rear rocker arms have a fixed relative orientation along the entire range of motion of the linkage 1274. In the illustrated embodiment, the connecting link 1514 connects the front and rear rocker arms 1502, 1504 so that their axes RRA, FRA are substantially parallel along the range of motion. The connecting link 1514 has a first end portion connected to the rear rocker arm 1502 and a second end portion connected to the front rocker arm 1504. A fifth pin 1516 connects the first end portion of the connecting link 1514 to the rear rocker arm at a location spaced apart between the first pin 1506 and the second pin 1508. The connecting link 1514 is configured to rotate with respect to the rear rocker arm 1502 about the fifth pin 1516. A sixth pin 1518 connects the second end portion of the connecting link 1514 to the front rocker arm 1504 at a location spaced apart between the third pin 1510 and the fourth pin 1512. The connecting link 1514 is configured to rotate with respect to the front rocker arm 1504 about the axis of the sixth pin 1518.

The linkage 1274 further comprises a pneumatic cylinder 1520 (broadly, a linear actuator) that is configured to be selectively actuated to move the linkage along its range of motion. It will be appreciated that other types of actuators besides pneumatic cylinders may be used to drive movement of the linkage in one or more embodiments. The pneumatic cylinder 1520 has a cylinder member 1522 that is fixedly connected to the cylinder block 1136 and a piston 1524 that is extendable and retractable with respect to the cylinder member along an axis PCA. A free end portion of the piston 1524 is pivotably connected to an upper end portion of the front rocker arm 1504 by a seventh pin 1526. Accordingly, the rocker arm 1504 is configured to rotate with respect to the piston 1524 as the cylinder 1520 extends and retracts the piston along the axis PCA.

Figure 34A:
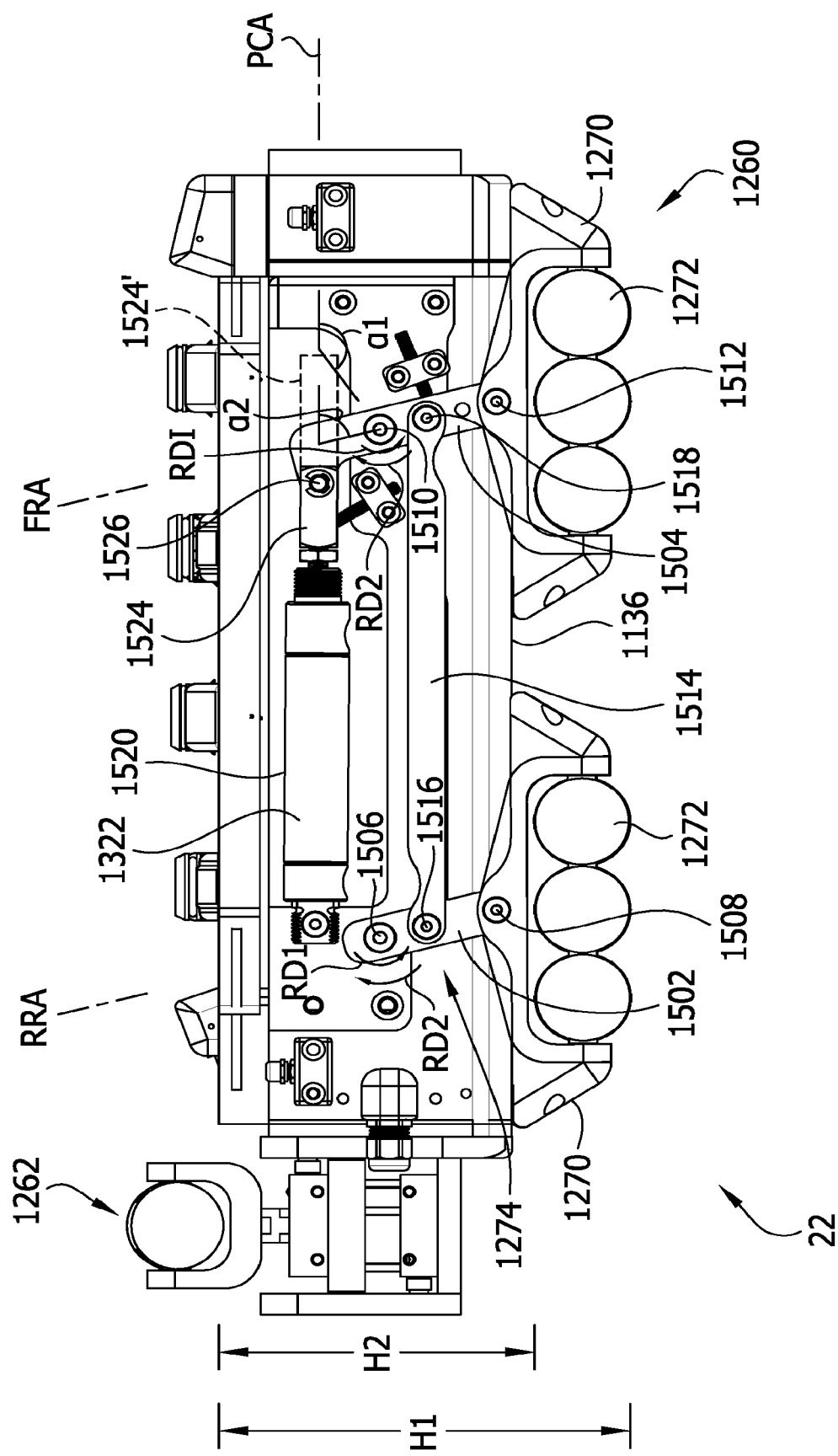
FIG. 34A is a side elevation of a portion of the fitting installation tool.
Figure 35:
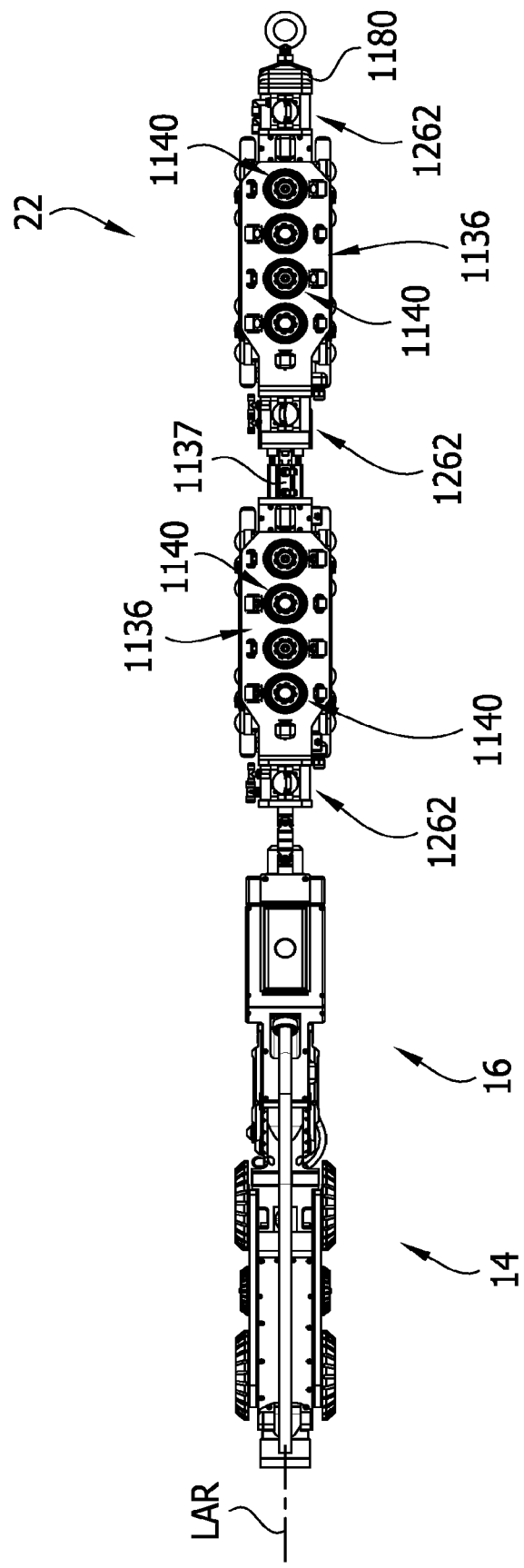
FIG. 35 is a top plan view of the robot as shown in FIG. 23.

FIG. 34A depicts the linkage at one end of its range of motion, when the pneumatic cylinder 1520 is fully retracted. As will be explained in further detail below, this position is a deployed position at which the tool 24 can be positioned while installing plugs 210 or fittings 110. When the pneumatic cylinder 1520 is fully retracted, the length of the pneumatic cylinder 1520 cannot further decrease. Thus, the pneumatic cylinder provides a hard stop against the rocker arms 1502, 1504 rotating about the pins 1506, 1510 in a first rotational direction RD1. When the pneumatic cylinder 1520 is fully retracted, the linkage 1274 positions the rocker arms 1502, 1504 at the illustrated position so that the top of the cylinder block 134 is located at a height H1 above the bottoms of the rollers 1272. The pneumatic cylinder 1520 is extendable from the fully retracted position to a fully extended position, indicated in broken line at reference number 1524'. As the pneumatic cylinder 1520 extends, the rocker arms 1502, 1504 rotate about the pins 1506, 1510 in a second rotational direction RD2 opposite the first rotational direction RD1. In general, the robot 12 is configured so that extending the pneumatic cylinder decreases the height of the cylinder block 1136. For example, in the fully extended position indicated at 1524', the linkage 1274 positions the rocker arms 1502, 1504 so that the axes RRA, FRA of the rocker arms are oriented at an angle α1 (only the angle of the front rocker arm is shown, but it is understood that the rear rocker arm has the same angle). In this orientation, the linkage 1274 supports the cylinder block 1136 on the rollers 1272 so that the top of the cylinder block 134 is located a height H2 above the bottoms of the rollers 1272. The height H2 is less than the height H1.

Again, the rocker arms 1502, 1504 are oriented at a first angle α1 with respect to the axis PCA of the pneumatic cylinder 1520 when the pneumatic cylinder is extended. As shown in FIG. 34A, the rocker arms 1502, 1504 are oriented instead at a second angle α2 with respect the axis PCA when the pneumatic cylinder 1520 is fully retracted. In one or more embodiments, the first angle α1 is greater than 90° and the second angle α2 is less than 90°. Thus, the linkage 1274 is configured to be moved through a range of motion that extends from first end position in which the rocker arms 1502, 1504 are oriented at an angle α1 of greater than 90° with respect to the axis PCA of the pneumatic cylinder to a second end position in which the rocker arms 1502, 1504 are oriented at an angle α2 of less than 90° with respect to the axis. This configuration allows the linkage to cross over a center position at which the axes RRA, FRA of the rocker arms 1502, 1504 are oriented perpendicular to the axis PCA of the pneumatic cylinder 1520. In other words, the linkage 1274 provides an over-center toggle mechanism for adjusting the height at which the cylinder block 1136 is supported on the rollers 1272.

In one or more embodiments, during use the installation tool-equipped robot 12 drives along the axis AM of the main pipe M with each pneumatic cylinder 1520 extended. This decreases the height of each cylinder block 1136, making the robot more maneuverable in the pipe M. After moving along the pipe M to align a desired one of the piston assemblies 1140 with a corporation stop C, the pneumatic cylinder 1520 is retracted to the fully retracted position. This rotates the rocker arms in the first rotational direction RD1 and increases the height of the cylinder block 1136 to the height H1. At the height H1, the top of the cylinder block is located relatively close to the corporation stop C so that a plug 210 or fitting 110 can be installed by extending a piston assembly 1140. Moreover, fully retracting the pneumatic cylinder 1520 causes the rocker arms 1502, 1504 to rotate in the first rotational direction RD1 from a first orientation in which the rocker arms are oriented at the angle $\alpha 1$ of greater than 90° to a second orientation in which the rocker arms are oriented at the angle $\alpha 2$ of less than 90°. This is advantageous because reaction forces acting on the cylinder block 1136 as the installation tool 22 is inserts a plug 210 or fitting 110 into a corporation stop C urge the cylinder block downward or radially away from the corporation stop with respect to the main pipe axis AM. When the rocker arms 1502, 1504 are oriented at the acute angle $\alpha 2$, downward forces on the cylinder block 1136 urge the rocker arms to rotate further in the first rotational direction RD1 about the pins 1506, 1510. However, further rotation is prevented because the fully retracted pneumatic cylinder 1520 provides a hard stop against rotation of the rocker arms 1502, 1504 in the first rotational direction RD1. Thus, the over-center toggle mechanism provided by the linkage 1274 allows for selectively extending the height of the tool 22 to bring the cylinder block 1136 closer to the corporation stop C during installation, while still strongly resisting collapse of the undercarriage 1260 as a fitting or plug is inserted.

Thus, it can be seen that the linkages 1274 are configured to support the cylinder blocks 1136 on the interior surface of the pipe M and to adjust a radial spacing distance with respect to the axis AM between a fixed reference point on the cylinder block (e.g., the bottom or top of the cylinder block) and the point of contact between the rollers 1272 and the pipe. More specifically, rotation of the rockers 1502, 1504 about the axes of the respective pins 1506, 1510 is configured to adjust the spacing distance. When the pneumatic cylinder 1520 is extended to the position indicated at 1524', the rockers 1502, 1504 each have a first rotational position (e.g., the angle $\alpha 1$ between the rockers and the pneumatic cylinder axis PCA is greater than 90°); when the pneumatic cylinder is fully retracted, the rockers each have a second rotational position (e.g., the angle $\alpha 1$ between the rockers and the pneumatic cylinder axis PCA is less than 90°); and at a middle point along the throw of the pneumatic cylinder, the rockers each have a third rotational position in which the angle between the rockers and the cylinder axis is 90°. In the first rotational positions of the rockers 1502, 1504, the spacing distance is a first dimension; in the second rotational positions of the rockers, the spacing distance is a second dimension that is greater than the first dimension; and in the third rotational positions of the rockers, the spacing distance is a third dimension that is greater than the second dimension. This provides an over-center locking toggle that braces the tool 22 in the main pipe when the undercarriages 1260 are extended for installing a plug 210 or a fitting 110.

In addition to the cylinder-driven linkages 1274, in one or more embodiments, the height of the installation tool 22 can be adjusted by replacing the rocker arms 1502, 1504 for another pair of rocker arms from a set of interchangeable rocker arms of different lengths. Thus, in one or more embodiments, the robot 12 comprises a plurality of interchangeable arms (broadly, a set of interchangeable braces) of different lengths and the cylinder block 1136 (broadly, a tool body) comprises brace mounts (e.g., screw holes for threadably receiving threaded pins 1506, 1510) that form structures for releasably attaching the interchangeable arms to the cylinder block. The interchangeable rocker arms 1502, 1504 can be replaced to change the radial distance at which the cylinder blocks 1136 are spaced from the interior surface of the pipe when supported on the undercarriages 1260 along the entire range of motion of the linkage 1274. In one embodiment, the frames 1270 and the rollers 1272 are removably attached to the rocker arms 1502, 1504 so that the same set of frames and rollers can be used with any of the interchangeable rocker arms. In another embodiment, each interchangeable rocker arm has one or more integrated rollers so that the frames and rollers do not need to be removed and reattached each time the arms are replaced.

In one or more embodiments, each of the extendable roller arms 1262 functions in essentially the same way as the extendable roller arms 1062, 1064 of the plug removal tool 24. Thus, when the rollers on the arms 1262 are in contact the interior surface of the liner L, they can rotate about a pair of transverse rotational axes to roll along the pipe surface as the installation tool 22 moves longitudinally and circumferentially with respect to the main pipe M. Furthermore, the roller arms 1262 are configured to contact the pipe surface on the opposite side from the undercarriage 1260. In addition, the roller arms 1262 are extendable and retractable along respective adjustment axes EA3, EA4, EA5 to adjust the radial distance at which the side of each cylinder block 1136 from which the piston assemblies 1140 extend when the extendable roller arms brace the installation tool 22 against the pipe. As explained above, this allows the roller arms 1262 to adjust to different pipe sizes and conditions and also allows the installation tool 22 to firmly brace itself in the pipe M between opposed points of contact at the undercarriage 1260 and the extendable roller arms.

In an exemplary method of rehabilitating a main pipe M, during the step of installing the plugs 210 as shown in FIG. 4, the plug mounts 1190 are installed on the pistons 1140, and plugs of the appropriate size are connected to the plug mounts. The appropriate size may be determined by information gathered from the measurement probe 20 before installing the plugs. The visualization system of the installation tool may be used to position the robot 12 so that a respective piston 1140 is aligned with each of the corporation stops. At each corporation stop C a respective piston 1140 is extended to install the respective plug 210 by first positioning the plug body as a unit in the corporation stop C and then advancing the plunger member 216 to expand the plug. The installation tool 22 thereby seals each of the corporation stops prior to lining.

After the pipe M is lined with the liner L and fluid communication with the corporation stops C is restored using the plug removal tool 24 as shown in FIG. 5, the fittings can be installed as shown schematically in FIG. 6. The plug mounts 1190 are replaced with the fitting mounts 1164 and the fitting installation tool 22 replaces the plug removal tool 24 on the robot. The installation tool-equipped robot is placed in the lined pipe M, and the robot 12, either automatically or by user input, drives along the main pipe M until the leading pair of magnetic field sensors 1232 associated with one of the fitting mounts 1164 detects a magnetic field emanating from locating elements 240 in a plug remnant 210R. The robot 12, either automatically or by user input, drives along the pipe axis AM and rotates the fitting installation tool 22 about the pipe axis until the magnetic field strength detected at each of the magnetic field sensors associated with the fitting mount 1164 is about the same. This aligns the installation axis IA for the respective piston 1140 with the axis of the corporation stop C. The visualization system of the installation tool 22 can also be used to assist with positioning the robot 12 at each of the corporation stops.

When the piston 1138 is operatively aligned with the corporation stop C, the robot 12, either automatically or by user input, adjusts a control valve 40 to impart compressed air from the compressor 36 into the aligned cylinder. In response, the piston assembly 1140 extends along the installation axis IA as described above and the fitting mount 1164 and fitting 110 move conjointly toward the corporation stop C. The end of the fitting 110 engages the corporation stop C, and the fitting mount 1164 pivots about the pivot point PP as needed to self-center the fitting in the corporation stop.

After the installation tool 22 fully inserts the fitting 110, the robot 12 adjusts the control valves 40, either automatically or by user input, to fluidly connect the cylinder 1138 to the vacuum source 38. The vacuum source 38 creates a vacuum pressure in the cylinder 1138, which causes the piston assembly 1140 to telescopically retract, moving the fitting mount 1164 inward along the installation axis IA. If the connection between the fitting 110 and the corporation stop C is properly established, the fitting mount 1164 separates from the fitting 110 and is withdrawn into the cylinder 1138. If not, the fitting 110 is withdrawn from the corporation stop C with the fitting mount 1164, providing an indication that the connection was not properly made.

In one or more embodiments, the process described above is repeated to install all of a plurality of (e.g., eight) fittings 110 in respective corporation stops C without removing the robot 12 from the interior of the liner L. Upon completion, the robot is removed from the main pipe M and service is restored to the main pipe and corporation stops C.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A robot for use inside a main pipe with at least one branch conduit extending therefrom, the robot comprising:
   a tractor configured for movement along an axis of the main pipe;
   a tool connected to the tractor such that the tool is movable with the tractor along the axis of the main pipe, the tool being selectively rotatable with respect to the tractor generally angularly about the axis of the main pipe; and
   at least three locating sensors configured to detect a locating signal associated with the branch conduit, the at least three locating sensors being arranged on the tool such that the at least three sensors are spaced apart in a grid that has a first dimension extending generally longitudinally along the axis and a second dimension extending generally transverse to the axis when the robot is received in the main pipe.

2. The robot as set forth in claim 1, wherein the at least three locating sensors comprise four locating sensors arranged at respective corners of a rectangle having opposite sides that are spaced apart from one another transverse of the axis and opposite ends that are spaced apart from one another longitudinally along the axis.

3. The robot as set forth in claim 2 wherein the tool comprises a drill bit having an axis of rotation, the rectangle on which the four locating sensors are arranged is centered on the axis of rotation of the drill bit.

4. The robot as set forth in claim 1, further comprising a controller coupled to the at least three locating sensors and configured to operatively align the tool with the branch conduit by automatically driving movement of the tractor along the axis of the main pipe and driving movement of the robotic implement about the axis of the main pipe until a magnitude of the locating signal detected by each of the at least three locating sensors is about the same.

5. The robot as set forth in claim 1 wherein the locating sensors comprise magnetic field sensors.

6. The robot as set forth in claim 1 wherein the at least three locating sensors are operatively connected to the tractor and configured to control movement of the tractor.

7. The robot as set forth in claim 6 wherein the movement controlled by the tractor includes movement along the axis of the main pipe and rotationally about the axis of the main pipe.

8. The robot as set forth in claim 1 further comprising a pipe visualization system, the pipe visualization system comprising a projector configured to project a projected image onto an internal surface of the main pipe and a camera configured to form a captured image of the internal surface of the main pipe that includes the projected image.

9. The robot as set forth in claim 8, further comprising a display configured to display the captured image in real time at a location outside the main pipe.

10. The robot as set forth in either of claim 8, wherein the projector comprises at least one laser generator.

11. The robot as set forth in claim 10, wherein the at least one laser comprises a first laser generator configured to project a first visible line segment onto the internal surface and a second laser generator configured to project a second visible line segment onto the internal surface that intersects the first line segment at an intersection point.

12. The robot as set forth in claim 1 further comprising a fitting installation tool including:
   a cylinder block configured for being received in an interior of the main pipe for movement along the main pipe, the cylinder block defining a cylinder having an axis, the cylinder block being positionable in the main pipe at an installation position in which the cylinder is generally aligned with the branch conduit, the cylinder being selectively connectable to a source of pressurized fluid; and
   a piston slidably received in the cylinder and sealingly engaged with the cylinder block such that pressurized fluid imparted into the cylinder from the source drives movement of the piston outward along the axis of the cylinder with respect to the cylinder block, the piston being configured to support the fitting such that the fitting is inserted from the interior of the main pipe outwardly into the branch conduit as the piston moves outwardly when the cylinder block is in the installation position.

13. The robot as set forth in claim 1 further comprising a tool positioning mechanism at a first end portion of the tractor, the tool positioning mechanism comprising a linkage configured to connect a pipe rehabilitation tool to the tractor such that the pipe rehabilitation tool has at least three degrees of freedom with respect to the tractor.

14. The robot as set forth in claim 13 further comprising a pipe rehabilitation tool, the linkage of the tool positioning mechanism being configured to connect the pipe rehabilitation tool to the tractor.

15. The robot as set forth in claim 1 further comprising a pipe rehabilitation tool connected to a first end portion of the tractor, the pipe rehabilitation tool comprising a tool body and a brace connected to the tool body for supporting the tool body in radially spaced apart relationship with an interior surface of the main pipe, the brace comprising an arm and a roller connected the arm for rotation with respect to the arm about a first axis of rotation and a second axis of rotation transverse to the first axis of rotation, the roller configured to roll along the interior surface of the main pipe as the tool moves along the axis of the main pipe and as the tool moves such that the angular orientation of the tool with respect to the axis of the main pipe changes.

16. The robot as set forth in claim 1 further comprising a tool for installing a fitting in a branch conduit from an interior of a main pipe, the tool comprising:
 a base configured for being received in the interior of the main pipe for movement along the main pipe; and
 a fitting mount movably connected to the base and configured to be connected to the fitting such that the fitting is movable with the fitting mount relative to the base, the fitting mount being configured to be extended relative to the base in an insertion direction and the fitting mount being pivotable about a pivot point with respect to the base as the fitting mount is extended, wherein when the fitting mount is connected to the fitting and the base is operatively aligned with the branch conduit in the interior of the main pipe, the fitting mount being extended relative to the base moves the fitting toward the branch conduit and pivoting of the fitting mount about the pivot point can align the fitting with the branch conduit as the fitting mount is extended.

17. The robot as set forth in claim 16, wherein the fitting mount is simultaneously pivotable about the pivot point with respect to the base in any direction.

18. The robot as set forth in claim 1 further comprising a probe including a probe body operatively connected to the tractor, at least one sensor supported on the probe body and configured to generate one or more measurement signals related to the branch conduit when the probe body is aligned with the branch conduit.

19. A method of repairing a main pipe comprising:
 lining the main pipe with a liner carrying curable resin;
 curing the curable resin;
 inserting a robot into the lined main pipe to travel down the pipe, the robot including a drill bit for cutting through the liner to reestablish communication between the main pipe and a branch conduit;
 detecting the branch conduit using an array of locating sensors configured for centering the drill bit on the conduit;
 aligning the drill bit with the branch conduit using the array of sensors; and
 cutting through the liner with the drill bit to reestablish communication of the branch conduit with the main pipe.

20. The method of claim 19 wherein the steps of detecting the branch conduit and aligning the drill bit include the step of sensing with the sensors magnets located in a pre-placed plug in the branch conduit.

* * * * *